(12) United States Patent
McWhirter

(10) Patent No.: US 9,221,093 B2
(45) Date of Patent: Dec. 29, 2015

(54) HEAT EXCHANGER, METHODS THEREFOR AND A NUCLEAR FISSION REACTOR SYSTEM

(71) Applicant: TerraPower, LLC, Bellevue, WA (US)

(72) Inventor: Jon D. McWhirter, Kirkland, WA (US)

(73) Assignee: TerraPower, LLC, Bellevue, WA (US)

( * ) Notice: Subject to any disclaimer, the term of this patent is extended or adjusted under 35 U.S.C. 154(b) by 0 days.

(21) Appl. No.: 14/100,118

(22) Filed: Dec. 9, 2013

(65) Prior Publication Data

US 2014/0090249 A1    Apr. 3, 2014

Related U.S. Application Data

(60) Division of application No. 12/653,653, filed on Dec. 15, 2009, now abandoned, which is a continuation of application No. 12/586,741, filed on Sep. 25, 2009, now abandoned.

(51) Int. Cl.
*B21D 53/02* (2006.01)
*F28D 1/06* (2006.01)
(Continued)

(52) U.S. Cl.
CPC .............. *B21D 53/02* (2013.01); *F28D 1/0213* (2013.01); *F28D 1/05366* (2013.01); *F28D 1/06* (2013.01);
(Continued)

(58) Field of Classification Search
CPC ......... B21D 53/02; F22B 1/023; F22B 1/025; F22B 1/026; F22B 1/063; F28D 1/0213; F28D 1/0246; F28D 1/05316; F28D 1/05366; F28D 1/06; F28D 7/0041; F28D 7/1615; F28D 2021/0054; G21C 1/03; G21C 1/326; G21C 15/04; G21C 15/12; G21C 15/247; G21C 15/26
See application file for complete search history.

(56) References Cited

U.S. PATENT DOCUMENTS 3,498,880 A    3/1970  Gollion
3,800,868 A    4/1974  Berkowitz et al.
(Continued)

FOREIGN PATENT DOCUMENTS

CN    1140507 A    1/1997
CN    1599858 A    3/2005
(Continued)

OTHER PUBLICATIONS

European Patent Office; Extended European Search Report; App. No. EP 10 83 9920; Jan. 21, 2013 (received by our agent on Jan. 30, 2013); pp. 1-2.
(Continued)

*Primary Examiner* — Ryan J Walters
*Assistant Examiner* — Matthew P Travers

(57) ABSTRACT

The heat exchanger comprises a heat exchanger body defining an exit plenum chamber shaped for uniform flow of a hot primary heat transfer fluid through the chamber. A plurality of adjacent heat transfer members are connected to the heat exchanger body define a plurality of flow passages between the heat transfer members and open into the exit plenum chamber. Spacing of the heat transfer members by a predetermined distance evenly distributes flow of the primary heat transfer fluid through the flow passages, across the surfaces of the heat transfer members and into the exit plenum chamber. Heat transfer occurs from the hot primary heat transfer fluid to the cooler secondary heat transfer fluid as the primary heat transfer fluid flows through the chamber and as the secondary heat transfer fluid simultaneously flows through the flow channel of each heat transfer member.

7 Claims, 60 Drawing Sheets

(51) Int. Cl.
*F28D 1/053* (2006.01)
*F28D 1/02* (2006.01)
*G21C 15/26* (2006.01)
*G21C 1/03* (2006.01)
*G21C 1/32* (2006.01)
*F28D 7/00* (2006.01)
*F28D 7/16* (2006.01)
*F28F 1/04* (2006.01)
*F28F 1/26* (2006.01)
*F28F 1/40* (2006.01)
*G21C 1/02* (2006.01)
*F22B 1/02* (2006.01)
*F22B 1/06* (2006.01)
*F28D 21/00* (2006.01)
*F28F 1/02* (2006.01)

(52) U.S. Cl.
CPC ............ *F28D 7/0041* (2013.01); *F28D 7/1615* (2013.01); *F28F 1/04* (2013.01); *F28F 1/26* (2013.01); *F28F 1/40* (2013.01); *G21C 1/026* (2013.01); *G21C 1/03* (2013.01); *G21C 1/326* (2013.01); *G21C 15/26* (2013.01); *F22B 1/023* (2013.01); *F22B 1/063* (2013.01); *F28D 2021/0054* (2013.01); *F28F 2001/027* (2013.01); *F28F 2215/04* (2013.01); *Y02E 30/34* (2013.01); *Y02E 30/35* (2013.01); *Y10T 29/49391* (2015.01)

(56) References Cited

U.S. PATENT DOCUMENTS

| | | | |
|---|---|---|---|
| 3,842,904 | A | 10/1974 | Gardenier |
| 4,294,658 | A | 10/1981 | Humphreys et al. |
| 4,324,617 | A | 4/1982 | Sowers et al. |
| 4,508,677 | A | 4/1985 | Craig et al. |
| 4,560,533 | A | 12/1985 | Huebotter et al. |
| 4,737,337 | A | 4/1988 | Garabedian et al. |
| 4,842,054 | A | 6/1989 | Nathenson et al. |
| 4,983,353 | A | 1/1991 | Boardman et al. |
| 5,499,277 | A | 3/1996 | Hunsbedt |
| 5,694,442 | A * | 12/1997 | Cinotti et al. ............... 376/298 |
| 5,823,247 | A | 10/1998 | Weibler |
| 6,916,430 | B1 | 7/2005 | Qu |
| 7,258,844 | B1 | 8/2007 | Symonds |
| 2004/0247067 | A1 | 12/2004 | Hattori et al. |
| 2008/0123797 | A1 | 5/2008 | Hyde et al. |
| 2009/0232268 | A1 | 9/2009 | Ahlfeld et al. |

FOREIGN PATENT DOCUMENTS

| | | |
|---|---|---|
| CN | 101149990 A | 3/2008 |
| FR | 2 350 566 A1 | 12/1977 |
| FR | 2 524 687 A1 | 10/1983 |
| GB | 1 322 221 A | 7/1973 |
| JP | 59-035782 | 2/1984 |

OTHER PUBLICATIONS

PCT International Search Report; International App. No. PCT/US10/02602; Jun. 10, 2011; pp. 1-2.
PCT International Search Report; International App. No. PCT/US10/02603; Jun. 10, 2011; pp. 1-2.
PCT International Search Report; International App. No. PCT/US10/02604; Jun. 10, 2011; pp. 1-2.
Russian Office Action; App. No. 2012113145/20(019839); received by our agent on Jul. 24, 2012; pp. 1-3 (1 page machine translation).
Teller, Edward; Ishikawa, Muriel; Wood, Jr., Lowell; Hyde, Roderick; Nuckolls, John. "Completely Automated Nuclear Reactors for Long-Term Operation II: Toward a Concept-Level Point-Design of a High-Temperature, Gas-Cooled Central Power Station System"; University of California Lawrence Livermore National Laboratory Publication UCRL-JC-122708 Pt 2; submitted to the 1996 International Conference on Emerging Nuclear Energy Systems (ICENES '96), Obninsk, Russian Federation on Jun. 24-28, 1996.
Teller, Edward; Ishikawa, Muriel; Wood, Jr., Lowell; Hyde, Roderick; Nuckolls, John. "Completely Automated Nuclear Power Reactors For Long-Term Operation: III. Enabling Technology for Large-Scale, Low-Risk, Affordable Nuclear Electricity"; University of California Lawrence Livermore National Laboratory Publication UCRL-JRNL-122708; presented at the Jul. 2003 Workshop of the Aspen Global Change Institute.

* cited by examiner

HEAT EXCHANGER, METHODS THEREFOR AND A NUCLEAR FISSION REACTOR SYSTEM

BACKGROUND

This application generally relates to induced nuclear reactions, including systems, processes and elements which implement such processes, such as a reactor core, primary heat exchanger, or pump, immersed in a liquid coolant in a vessel and more particularly relates to a heat exchanger, methods therefor and a nuclear fission reactor system.

It is known that, in an operating nuclear fission reactor, neutrons of a known energy are absorbed by nuclides having a high atomic mass. The resulting compound nucleus separates into fission products that include two lower atomic mass fission fragments and also decay products. Nuclides known to undergo such fission by neutrons of all energies include uranium-233, uranium-235 and plutonium-239, which are fissile nuclides. For example, thermal neutrons having a kinetic energy of 0.0253 eV (electron volts) can be used to fission U-235 nuclei. Thorium-232 and uranium-238, which are fertile nuclides, will not undergo induced fission, except with fast neutrons that have a kinetic energy of at least 1 MeV (million electron volts). The total kinetic energy released from each fission event is about 200 MeV. This kinetic energy is transformed into heat.

In nuclear reactors, the afore-mentioned fissile and/or fertile material is typically housed in a plurality of closely packed together fuel assemblies, which define a nuclear reactor core. The fissile and/or fertile material may be a mixture of oxides of plutonium and uranium in the form of fuel pellets housed in fuel rods spaced apart by spacer or wire wound helically around each fuel rod In addition, in a commercial nuclear power reactor, the fission heat is converted into electricity. In this regard, reactor primary coolant is pumped through the reactor fuel assemblies that define the reactor core and is heated by the fission process. In some reactor designs, the heated primary coolant is carried to a steam generator where the heated primary coolant surrenders its heat to a secondary coolant (i.e., water) disposed in the steam generator. The primary coolant then returns to the reactor core. A portion of the water that receives the heat of the primary coolant vaporizes to steam, which travels to a turbine-generator set to generate electricity. The steam that has passed through the turbine-generator set flows to a condenser that condenses the steam to water, which is then returned to the steam generator.

A type of nuclear fission reactor capable of safely generating electricity is a pool-type liquid sodium fast breeder reactor. In this regard, uranium-238 may be used as a fertile material. The uranium-238 absorbs neutrons and transmutes to fissionable plutonium-239 by means of beta decay. When plutonium-239 in turn absorbs a neutron, fission occurs to produce heat. In a fast breeder reactor, moderating materials, such as water, may not be desired as coolant. Rather, in such a pool-type liquid sodium fast breeder nuclear reactor, sodium is the coolant of choice because sodium does not significantly thermalize neutrons. Also, due to the heat transfer characteristics of sodium, the reactor core can operate at higher power densities so that size of the reactor may be reduced. In addition, sodium melts at about 100° C. (about 212° F.) and boils at about 900° C. (about 1650° F.). Thus, sodium can be used at high temperatures without boiling, thereby allowing high temperature and high pressure steam to be generated. This in turn provides increased power plant thermal efficiency.

However, the sodium coolant circulating through the reactor core becomes radioactive due to absorption of neutrons. Due to this radioactivity, reactor designers utilize intermediate heat exchange loops between the primary sodium coolant loop(s) and the steam generation loop. This lowers the of risk radioactive contamination of the turbine generator. In addition, steam generator pipe leaks may occur. If a leak were to occur in the piping carrying the sodium through the steam generator, the hot radioactive sodium passing through the steam generator will vigorously chemically react with the water and steam in the steam generator. This would radioactively contaminate the water and steam in the steam generator, thereby increasing risk of radioactive contamination of the surrounding biosphere. For all the reasons hereinabove, reactor designers incorporate use of an intermediate heat exchanger between the reactor core and the steam generator to avoid direct contact of the sodium in the core with the steam generator or turbine generator.

Thus, in the pool-type liquid sodium fast breeder nuclear reactor mentioned hereinabove, the intermediate heat exchanger forms a boundary between radioactive primary sodium in the reactor pool and nonradioactive secondary sodium in the steam generator. In other words, the intermediate heat exchanger, which is disposed in the pool of liquid sodium together with the reactor core, is typically used to remove heat from the fast breeder reactor core and transfer that heat to the external steam generator.

Attempts have been made to provide adequate removal of heat from a fast fission nuclear reactor core by use of intermediate heat exchangers. U.S. Pat. No. 4,294,658, issued Oct. 13, 1981 in the names of Peter Humphreys et al. and titled "Nuclear Reactors" discloses an intermediate heat exchange module comprising a tube-in-shell intermediate exchanger and an electromagnetic flow coupler disposed in the base region of the module for driving primary coolant through the heat exchanger. This patent addresses severe thermal shock occasioned to an intermediate heat exchanger when there is an interruption in the flow of coolant in the relevant secondary coolant circuit, for example, as caused by a failure of the secondary coolant pump. According to this patent, an object of the invention is to reduce the thermal shock occasioned to the intermediate heat exchanger of a liquid metal cooled nuclear reactor of the pool kind in such an emergency wherein there is an interruption in flow in the secondary coolant circuit.

Another attempt to provide adequate removal of heat from a fast fission nuclear reactor core by use of intermediate heat exchangers is disclosed in U.S. Pat. No. 4,324,617, issued Apr. 13, 1982 in the names of Michael G. Sowers et al. and titled "Intermediate Heat Exchanger For A Liquid Metal Cooled Nuclear Reactor And Method." This patent discloses a heat exchanger that is used in a multi-pool, liquid metal cooled, nuclear reactor. This patent addresses accommodating differential thermal expansion between the structural components of the heat exchanger. According to this patent, the shell of the heat exchanger is heated to a temperature substantially greater than the temperature of the tubes in the heat exchanger by thermal communication with the hot pool and tensioning said tubes during operation by said heating of the shell and thereby accommodating differential thermal expansion in the heat exchanger.

Although the art recited hereinabove may disclose devices and methods that adequately serve their intended purposes, none of the art recited hereinabove appears to disclose a heat exchanger, methods therefor and a nuclear fission reactor system, as described and claimed herein.

SUMMARY

According to an aspect of the disclosure there is provided, for use in association with a pool-type nuclear fission reactor capable of generating heat, a heat exchanger capable of being disposed in a pool fluid residing in the pool-type nuclear fission reactor, the heat exchanger capable of being disposed in proximity to an interior periphery of a pool wall confining the pool fluid, the heat exchanger comprising: a heat exchanger body; and means integrally formed with said heat exchanger body for removal of the heat.

According to an additional aspect of this disclosure, there is provided, for use in association with a pool-type nuclear fission reactor capable of generating heat, a heat exchanger capable of being disposed in a pool fluid residing in the pool-type nuclear fission reactor, the heat exchanger capable of being disposed in proximity to an interior periphery of a pool wall confining the pool fluid, the heat exchanger comprising a heat exchanger body having a surface formed thereon defining a portion of a plenum volume.

According to a further aspect of this disclosure, there is provided, for use in association with a pool-type nuclear fission reactor capable of generating heat, a heat exchanger capable of being disposed in a pool fluid residing in the pool-type nuclear fission reactor, the heat exchanger capable of being disposed in proximity to an interior periphery of a pool wall confining the pool fluid, the heat exchanger comprising: a heat exchanger body defining a plenum volume therein shaped for a predetermined flow of a heat transfer fluid into the plenum volume, said heat exchanger body having a surface formed thereon defining a portion of the plenum volume; and a heat transfer member coupled to said heat exchanger body, said heat transfer member defining a flow channel therethrough.

According to an additional aspect of this disclosure, there is provided, for use in association with a pool-type nuclear fission reactor capable of generating heat, a heat exchanger capable of being disposed in a pool fluid residing in the pool-type nuclear fission reactor, the heat exchanger capable of being disposed in proximity to an interior periphery of a pool wall confining the pool fluid, the heat exchanger comprising: a heat exchanger body having a surface formed thereon defining a portion of a plenum volume shaped for a predetermined flow of a heat transfer fluid into the portion of the plenum volume; and a plurality of adjacent heat transfer members connected to said heat exchanger body and spaced apart by a predetermined distance defining a plurality of flow passages between opposing ones of said plurality of adjacent heat transfer members for distributing flow of the heat transfer fluid through the plurality of flow passages.

According to an aspect of this disclosure, there is provided a system for use in association with a pool-type nuclear fission reactor, comprising: a nuclear fission reactor core capable of generating heat; a heat exchanger body associated with said nuclear fission reactor core, said heat exchanger body capable of being disposed in a pool fluid and in proximity to an interior periphery of a pool wall confining the pool fluid; and means in heat transfer communication with said nuclear fission reactor core and associated with said heat exchanger body for removal of the heat.

According to another aspect of this disclosure, there is provided a system for use in association with a pool-type nuclear fission reactor, comprising: a vessel defining a pool wall having an interior periphery, the pool wall being configured to confine a pool fluid therein; a nuclear fission reactor core capable of being disposed in said vessel and capable of generating heat; a heat exchanger body capable of being in heat transfer communication with said nuclear fission reactor core, said heat exchanger body capable of being disposed in the pool fluid in proximity to the interior periphery of the pool wall, said heat exchanger body having a surface formed thereon defining a portion of a plenum volume shaped for achieving a predetermined flow of a heat transfer fluid into the plenum volume; and means in heat transfer communication with said nuclear fission reactor core and associated with said heat exchanger body for removal of the heat.

According to an additional aspect of this disclosure, there is provided a system for use in association with a pool-type nuclear fission reactor, comprising: a pressure vessel defining a pool wall having an interior periphery, the pool wall being configured to confine a pool fluid therein; a nuclear fission reactor core disposed in said pressure vessel and capable of generating heat; a heat exchanger body capable of being in heat transfer communication with said nuclear fission reactor core, said heat exchanger body capable of being disposed in the pool fluid in proximity to the interior periphery of the pool wall, said heat exchanger body having a surface formed thereon defining a portion of a plenum volume therein shaped for predetermined flow of a heat transfer fluid into the plenum volume; and a plurality of adjacent heat transfer members coupled to said heat exchanger body and spaced apart by a predetermined distance for defining a plurality of flow passages between opposing ones of said plurality of adjacent heat transfer members for distributing flow of a heat transfer fluid through the plurality of flow passages.

According to a further aspect of this disclosure, there is provided, for use in association with a pool-type nuclear fission reactor capable of generating heat, a method of assembling a heat exchanger capable of being disposed in a pool fluid residing in the pool-type nuclear fission reactor, the heat exchanger capable of being disposed in proximity to an interior periphery of a pool wall confining the pool fluid, the method comprising: receiving a heat exchanger body; and coupling means to the heat exchanger body for removal of the heat.

According to an aspect of this disclosure, there is provided, for use in association with a pool-type nuclear fission reactor, a method of assembling a heat exchanger capable of being disposed in a pool fluid residing in the pool-type nuclear fission reactor, the heat exchanger capable of being disposed in proximity to an interior periphery of a pool wall confining the pool fluid, the method comprising receiving a heat exchanger body having a surface formed thereon defining a portion of a plenum volume.

According to an aspect of this disclosure, there is provided, for use in association with a pool-type nuclear fission reactor capable of generating heat, a method of assembling a heat exchanger capable of being disposed in a pool fluid residing in the pool-type nuclear fission reactor, the heat exchanger capable of being disposed in proximity to an interior periphery of a pool wall confining the pool fluid, the method comprising: receiving a heat exchanger body defining a plenum volume therein shaped for a predetermined flow of a heat transfer fluid into the plenum volume, the heat exchanger body having a surface formed thereon defining a portion of the plenum volume; and coupling a heat transfer member to the heat exchanger body, the heat transfer member defining a flow channel therethrough.

According to another aspect of this disclosure, there is provided, for use in association with a pool-type nuclear fission reactor capable of generating heat, a method of assembling a heat exchanger capable of being disposed in a pool fluid residing in the pool-type nuclear fission reactor, the heat exchanger capable of being disposed in proximity to an interior periphery of a pool wall confining the pool fluid, the method comprising: receiving a heat exchanger body having a surface formed thereon defining a portion of a plenum volume shaped for a predetermined flow of a heat transfer fluid into the plenum volume; and connecting a plurality of adjacent heat transfer members to the heat exchanger body, the plurality of adjacent heat transfer members being spaced apart by a predetermined distance for defining a plurality of flow passages between opposing ones of the plurality of adjacent heat transfer members for distributing flow of the heat transfer fluid through the plurality of flow passages.

A feature of the present disclosure is the provision of a heat exchanger body defining a chamber therein shaped for uniform flow of a heat transfer fluid through the chamber.

Another feature of the present disclosure is the provision of a plurality of adjacent heat transfer members connected to the heat exchanger body and spaced apart by a predetermined distance for defining a plurality of flow passages between respective ones of the plurality of adjacent heat transfer members in order to evenly distribute flow of a heat transfer fluid through the plurality of flow passages.

In addition to the foregoing, various other method and/or device aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

While the specification concludes with claims particularly pointing out and distinctly claiming the subject matter of the present disclosure, it is believed the disclosure will be better understood from the following detailed description when taken in conjunction with the accompanying drawings. In addition, the use of the same symbols in different drawings will typically indicate similar or identical items.

DETAILED DESCRIPTION

Figure 1:
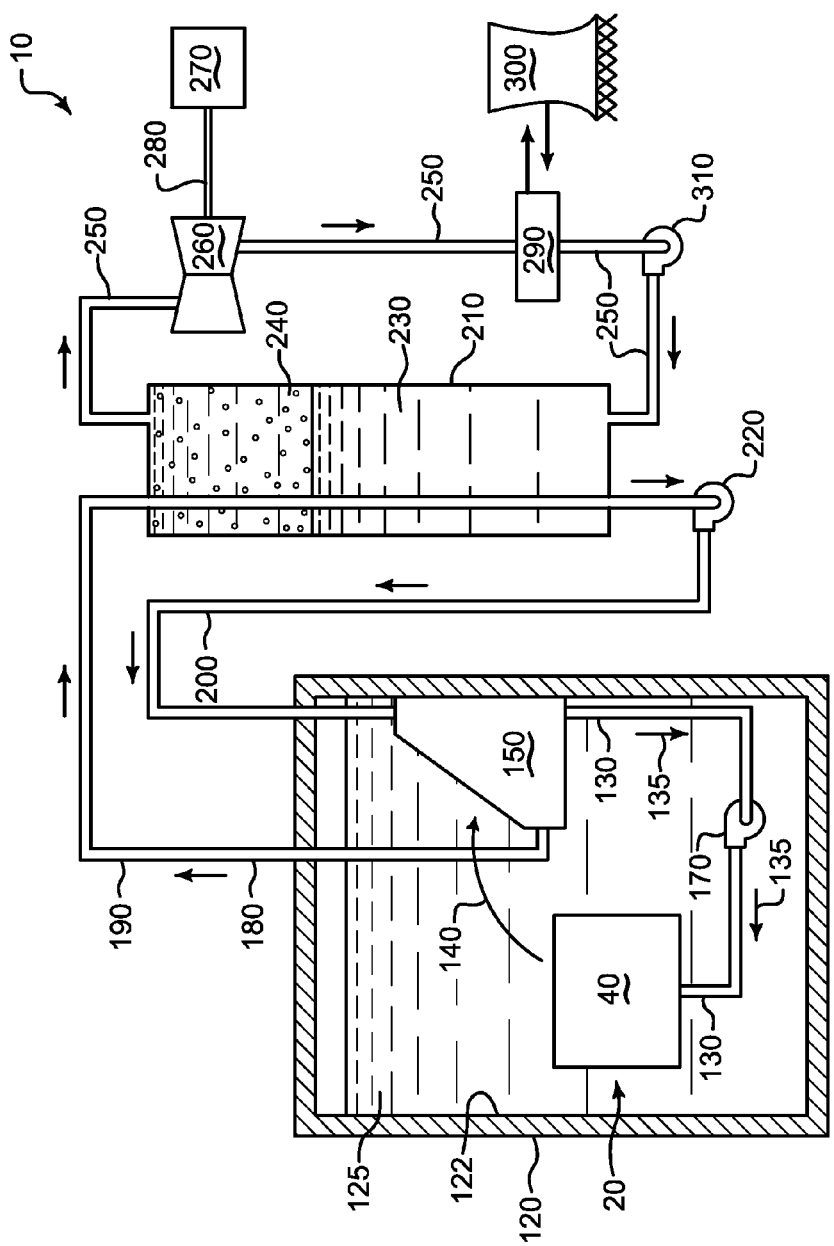
FIG. 1 is a schematic representation of a nuclear fission reactor system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein.

In addition, the present application uses formal outline headings for clarity of presentation. However, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings; and/or descriptions of single topics may span two or more topic headings). Hence, the use of the formal outline headings is not intended to be in any way limiting.

Moreover, the herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

Therefore, referring to FIG. 1, by way of example only and not by way of limitation, there is shown a pool-type fast neutron nuclear fission reactor and system, generally referred to as 10. As described more fully hereinbelow, nuclear fission reactor system 10 may be a "traveling wave" nuclear fission reactor system. Nuclear fission reactor system 10 generates electricity that is transmitted over a plurality of transmission lines (not shown) to users of the electricity. Nuclear fission reactor system 10 alternatively may be used to conduct tests, such as tests to determine effects of temperature on reactor materials.

Figure 2:
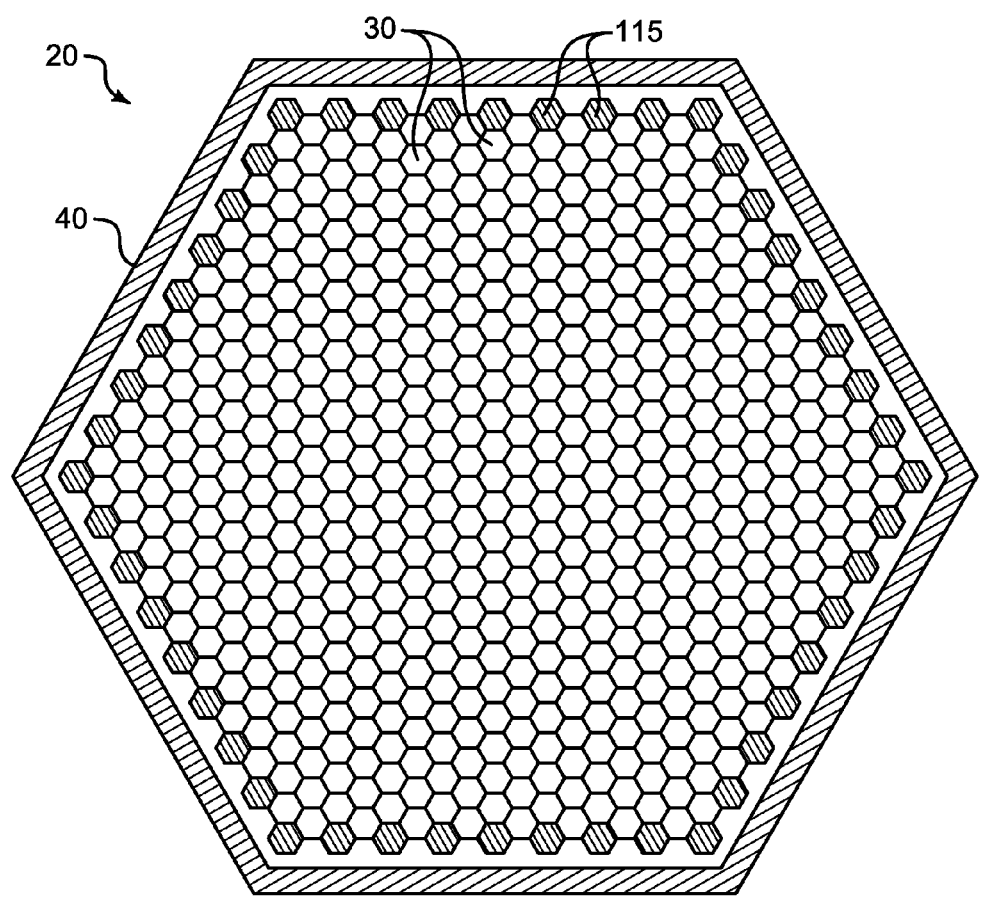
FIG. 2 is a view in horizontal section of an hexagonally-shaped nuclear fission reactor core containing a plurality of nuclear fission reactor modules and breeder fuel modules.
Figure 3:
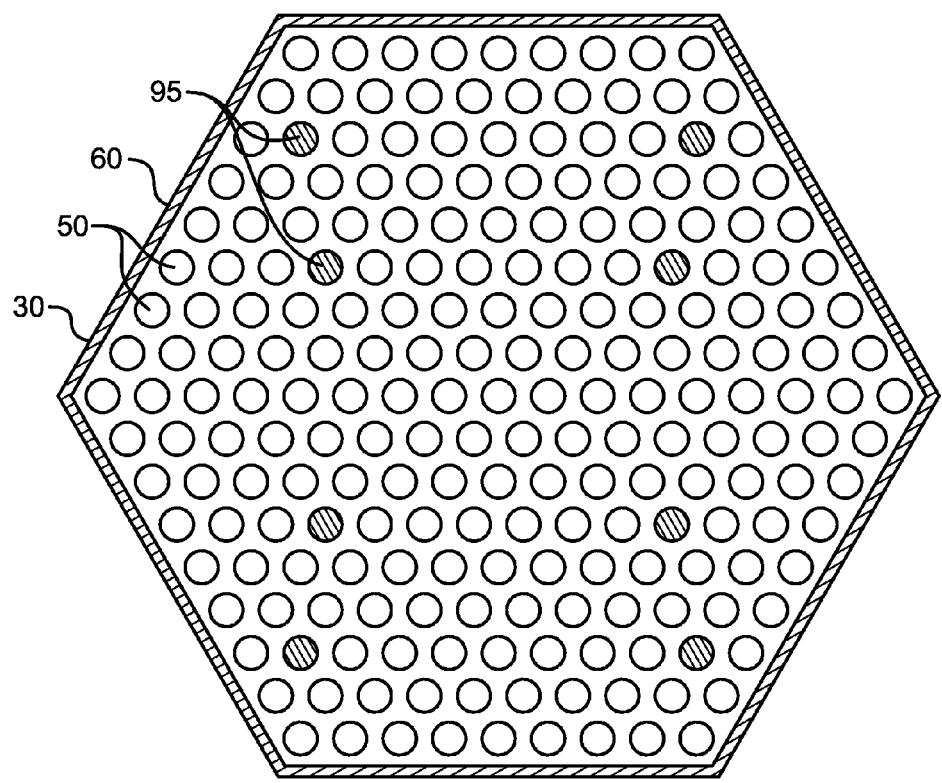
FIG. 3 is view in horizontal section of one of the plurality of nuclear fission reactor modules and a plurality of control rods therein.

Referring to FIGS. 1, 2 and 3, nuclear fission reactor system 10 comprises a nuclear fission reactor core, generally referred to as 20, that includes a plurality of nuclear fission fuel assemblies or, as also referred to herein, nuclear fission modules 30. Nuclear fission reactor core 20 is sealingly housed within a reactor core enclosure 40. By way of example only and not by way of limitation, each nuclear fission module 30 may form a hexagonally-shaped structure in transverse cross-section, as shown, so that more nuclear fission modules 30 may be closely packed together within reactor core 20, as compared to other shapes for nuclear fission module 30, such as cylindrical or spherical shapes. Each nuclear fission module 30 comprises a plurality of fuel rods 50 for generating heat due to the aforementioned nuclear fission chain reaction process. The plurality of fuel rods 50 may be surrounded by a fuel rod canister 60, if desired, for adding structural rigidity to nuclear fission modules 30 and for segregating nuclear fission modules 30 one from another when nuclear fission modules 30 are disposed in nuclear fission reactor core 20. Segregating nuclear fission modules 30 one from another avoids transverse coolant cross flow between fuel rods 50. Avoiding transverse coolant cross flow prevents transverse vibration of fuel rods 50. Such transverse vibration might otherwise increase risk of damage to fuel rods 50. In addition, segregating nuclear fission modules 30 one from another can allow control of coolant flow on an individual module-by-module basis. Controlling coolant flow to individual nuclear fission modules 30 efficiently manages coolant flow within reactor core 20, such as by directing coolant flow substantially according to the nonuniform temperature distribution in reactor core 20. In other words, more coolant may be directed to those nuclear fission modules 30 having higher temperature in order to provide a substantially uniform temperature distribution across reactor core 20. The coolant may have an average nominal volumetric flow rate of approximately 5.5 m$^3$/sec (i.e., approximately 194 cubic ft$^3$/sec) and an average nominal velocity of approximately 2.3 msec (i.e., approximately 7.55 ft/sec) in the case of an exemplary sodium cooled reactor during normal operation. Fuel rods 50 are adjacent one to another and define a fuel rod coolant flow channel 80 (see FIG. 6) therebetween for allowing flow of coolant along the exterior of fuel rods 50. Canister 60 may include means (not shown) for supporting and for tying fuel rods 50 together. Thus, fuel rods 50 are bundled together within canister 60 so as to form the previously mentioned hexagonal nuclear fission module 30. Although fuel rods 50 are adjacent to each other, fuel rods 50 are nonetheless maintained in a spaced-apart relationship by a wire wrapper 90 (see FIG. 6) that surrounds and extends spirally along the length of each fuel rod 50 in a serpentine fashion, as well known by persons of ordinary skill in the art of nuclear power reactor design.

Referring to FIG. 3, a plurality of spaced-apart, longitudinally extending and longitudinally movable control rods 95 (only some of which are shown) are each disposed within a control rod guide tube or cladding (not shown). Control rods 95 are symmetrically disposed within selected nuclear fission modules 30 and extend the length of a predetermined number of nuclear fission modules 30. Control rods 95, which are shown disposed in a predetermined number of the hexagonally-shaped nuclear fission modules 30, control the neutron fission reaction occurring in nuclear fission modules 30. In other words, control rods 95 comprise a suitable neutron absorber material having an acceptably high neutron absorption cross-section. In this regard, the absorber material may be a metal or metalloid selected from the group consisting essentially of lithium, silver, indium, cadmium, boron, cobalt, hafnium, dysprosium, gadolinium, samarium, erbium, europium and mixtures thereof. Alternatively, the absorber material may be a compound or alloy selected from the group consisting essentially of silver-indium-cadmium, boron carbide, zirconium diboride, titanium diboride, hafnium diboride, gadolinium titanate, dysprosium titanate and mixtures thereof. Control rods 95 will controllably supply negative reactivity to reactor core 20. Thus, control rods 95 provide a reactivity management capability to reactor core 20. In other words, control rods 95 are capable of controlling the neutron flux profile across nuclear fission reactor core 20 and thus influence the temperature within nuclear fission reactor core 20.

Figure 4:
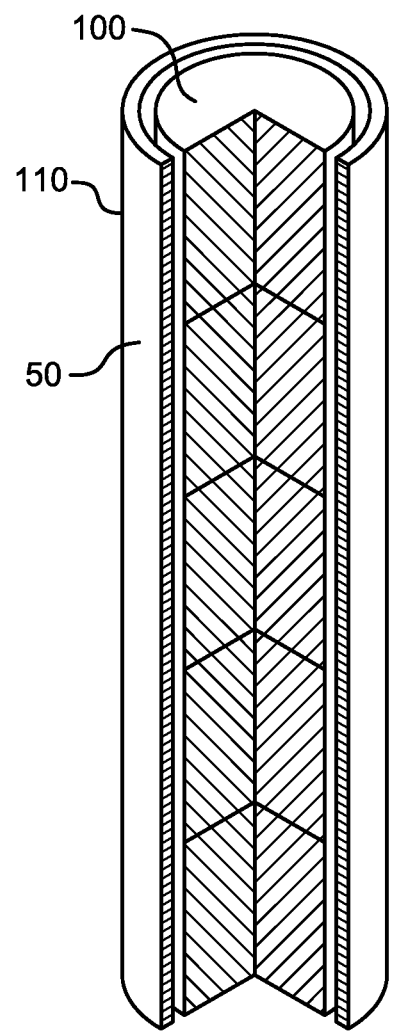
FIG. 4 is an isometric view of a nuclear fuel rod, with parts removed for clarity.

With particular reference to FIGS. 2, 3 and 4, each fuel rod 50 has a plurality of nuclear fuel pellets 100 stacked end-to-end therein, which nuclear fuel pellets 100 are sealingly surrounded by a fuel rod cladding material 110. Nuclear fuel pellets 100 comprise the afore-mentioned fissile nuclide, such as uranium-235, uranium-233 or plutonium-239. Alternatively, nuclear fuel pellets 100 may comprise a fertile nuclide, such as thorium-232 and/or uranium-238 which may be transmuted via neutron capture during the fission process into the fissile nuclides mentioned immediately hereinabove. Such fertile nuclide material may be housed in breeder rods disposed in specially designated breeder fuel modules 115. Such breeder fuel modules 115 may be arranged as a "breeding blanket" around the interior periphery of nuclear fission reactor core 20 for breeding nuclear fuel, as well known in the art of fast neutron breeder reactor design. A further alternative is that nuclear fuel pellets 100 may comprise a predetermined mixture of fissile and fertile nuclides.

Referring to FIG. 4, by way of example only and not by way of limitation, nuclear fuel pellets 100 may be made from an oxide selected from the group consisting essentially of uranium monoxide (UO), uranium dioxide ($UO_2$), thorium dioxide ($ThO_2$) (also referred to as thorium oxide), uranium trioxide ($UO_3$), uranium oxide-plutonium oxide (UO—PuO), triuranium octoxide ($U_3O_8$) and mixtures thereof. Alternatively, nuclear fuel pellets 100 may substantially comprise uranium either alloyed or unalloyed with other metals, such as, but not limited to, zirconium or thorium metal. As yet another alternative, nuclear fuel pellets 100 may substantially comprise a carbide of uranium ($UC_x$) or a carbide of thorium ($ThC_x$). For example, nuclear fuel pellets 100 may be made from a carbide selected from the group consisting essentially of uranium monocarbide (UC), uranium dicarbide ($UC_2$), uranium sesquicarbide ($U_2C_3$), thorium dicarbide ($ThC_2$), thorium carbide (ThC) and mixtures thereof. As another non-limiting example, nuclear fuel pellets 100 may be made from a nitride selected from the group consisting essentially of uranium nitride ($U_3N_2$), uranium nitride-zirconium nitride ($U_3N_2Zr_3N_4$), uranium-plutonium nitride ((U—Pu)N), thorium nitride (ThN) and mixtures thereof. Fuel rod cladding material 110, which sealingly surrounds the stack of nuclear fuel pellets 100, may be a suitable zirconium alloy, such as ZIRCOLOY™ (trademark of the Westinghouse Electric Corporation), which has known resistance to corrosion and cracking. Cladding material 110 may be made from other materials, as well, such as ferritic martensitic steels.

Returning to FIG. 1, nuclear fission reactor core 20 is disposed within a vault or reactor pressure vessel 120 for preventing leakage of radioactive materials, gasses or liquids from reactor core 20 to the surrounding biosphere. For reasons provided hereinbelow, pressure vessel 120, which has an interior wall surface 122, is substantially filled with a pool of fluid or coolant 125, such as liquid sodium, to the extent nuclear fission reactor core 20 is submerged in the pool of coolant. Pressure vessel 120 may be steel, concrete or other material of suitable size and thickness to reduce risk of such radiation leakage and to support required pressure loads. In addition, there may be a containment vessel (not shown) sealingly surrounding parts of nuclear fission reactor system 10 for added assurance that leakage of radioactive particles, gasses or liquids from reactor core 20 to the surrounding biosphere is prevented.

Referring again to FIG. 1, a primary loop coolant pipe 130 is coupled to nuclear fission reactor core 20 for allowing a suitable coolant to flow through reactor core 20 along directional arrow 135 in order to cool nuclear fission reactor core 20. Primary loop coolant pipe 130 may be made from any suitable material, such as stainless steel. It may be appreciated that, if desired, primary loop coolant pipe 130 may be made not only from ferrous alloys, but also from non-ferrous alloys, zirconium-based alloys or other suitable structural materials or composites. The coolant carried by primary loop coolant pipe 130 may be a liquid metal selected from the group consisting essentially of sodium, potassium, lithium, lead and mixtures thereof. On the other hand, the coolant may be a metal alloy, such as lead-bismuth (Pb—Bi). Alternatively, in the exemplary embodiment contemplated herein, the coolant is a liquid sodium (Na) metal or sodium metal mixture, such as sodium-potassium (Na—K). Depending on the particular reactor core design and operating history, normal operating temperature of a sodium-cooled reactor core may be relatively high. For example, in the case of a 500 to 1,500 MWe sodium-cooled reactor with mixed uranium-plutonium oxide fuel, the reactor core outlet temperature during normal operation may range from approximately 510° Celsius (i.e., 950° Fahrenheit) to approximately 550° Celsius (i.e., 1,020° Fahrenheit). On the other hand, during a LOCA (Loss Of Coolant Accident) or LOFTA (Loss of Flow Transient Accident) peak fuel cladding temperatures may reach about 600° Celsius (i.e. 1,110° Fahrenheit) or more, depending on reactor core design and operating history. Moreover, decay heat build-up during post-LOCA or post-LOFTA scenarios and also during suspension of reactor operations may produce unacceptable heat accumulation. In some cases, therefore, it is appropriate to remove heat produced by nuclear fission reactor core 20 during both normal operation and post accident scenarios.

Still referring to FIG. 1, the heat-bearing coolant generated by nuclear fission reactor core 20 flows along a coolant flow stream or flow path 140 to an intermediate heat exchanger 150 that is also submerged in coolant pool 125. Intermediate heat exchanger 150 may be made from any convenient material resistant to the heat and corrosive effects of the sodium coolant in coolant pool 125, such as a suitable stainless steel. The coolant flowing along coolant flow path 140 flows through intermediate heat exchanger 150, as described more fully hereinbelow, and continues through primary loop coolant pipe 130. It may be appreciated that the coolant leaving intermediate heat exchanger 150 has been cooled due to the heat transfer occurring in intermediate heat exchanger 150, as disclosed more fully hereinbelow. A first pump 170, which may be an electro-mechanical pump, is coupled to primary loop pipe 130, and is in fluid communication with the reactor coolant carried by primary loop coolant pipe 130, for pumping the reactor coolant through primary loop pipe 130, through reactor core 20, along coolant flow path 140 and into intermediate heat exchanger 150.

Referring again to FIG. 1, a secondary loop pipe 180 is provided for removing heat from intermediate heat exchanger 150. Secondary loop pipe 180 comprises a secondary "hot" leg pipe segment 190 and a secondary "cold" leg pipe segment 200. Secondary hot leg pipe segment 190 and secondary cold leg pipe segment 200 are integrally connected to intermediate heat exchanger 150. Secondary loop pipe 180, which includes hot leg pipe segment 190 and cold leg pipe segment 200, contains a fluid, such as a liquid metal selected from the group consisting essentially of sodium, potassium, lithium, lead and mixtures thereof. On the other hand, the fluid may be a metal alloy, such as lead-bismuth (Pb—Bi). Alternatively, in the exemplary embodiment contemplated herein, the fluid may suitably be a liquid sodium (Na) metal or sodium metal mixture, such as sodium-potassium (Na—K). Secondary hot leg pipe segment 190 extends from intermediate heat exchanger 150 to a steam generator and superheater combination 210 (hereinafter referred to as "steam generator 210"), for reasons described momentarily. In this regard, after passing through steam generator 210, the coolant flowing through secondary loop pipe 180 and exiting steam generator 210 is at a lower temperature and enthalpy than before entering steam generator 210 due to the heat transfer occurring within steam generator 210. After passing through steam generator 210, the coolant is pumped, such as by means of a second pump 220, which may be an electro-mechanical pump, along "cold" leg pipe segment 200, which extends into intermediate heat exchanger 150 for providing the previously mentioned heat transfer. The manner in which steam generator 210 generates steam is generally described immediately hereinbelow.

Referring yet again to FIG. 1, disposed in steam generator 210 is a body of water 230 having a predetermined temperature and pressure. The fluid flowing through secondary hot leg pipe segment 190 will transfer its heat by means of conduction to body of water 230, which is at a lower temperature than the fluid flowing through secondary hot leg pipe segment 190. As the fluid flowing through secondary hot leg pipe segment 190 transfers its heat to body of water 230, a portion of body of water 230 will vaporize to steam 240 according to the predetermined temperature and pressure within steam generator 210. Steam 240 will then travel through a steam line 250 which has one end thereof in vapor communication with steam 240 and another end thereof in liquid communication with body of water 230. A rotatable turbine 260 is coupled to steam line 250, such that turbine 260 rotates as steam 240 passes therethrough. An electrical generator 270, which is coupled to turbine 260, such as by a rotatable turbine shaft 280, generates electricity as turbine 260 rotates. In addition, a condenser 290 is coupled to steam line 250 and receives the steam passing through turbine 260. Condenser 290 condenses the steam to liquid water and passes any waste heat to a heat sink, such as a cooling tower 300, which is associated with condenser 290. The liquid water condensed by condenser 290 is pumped along steam line 250 from condenser 290 to steam generator 210 by means of a third pump 310, which may be an electro-mechanical pump, interposed between condenser 290 and steam generator 210.

Figure 5:
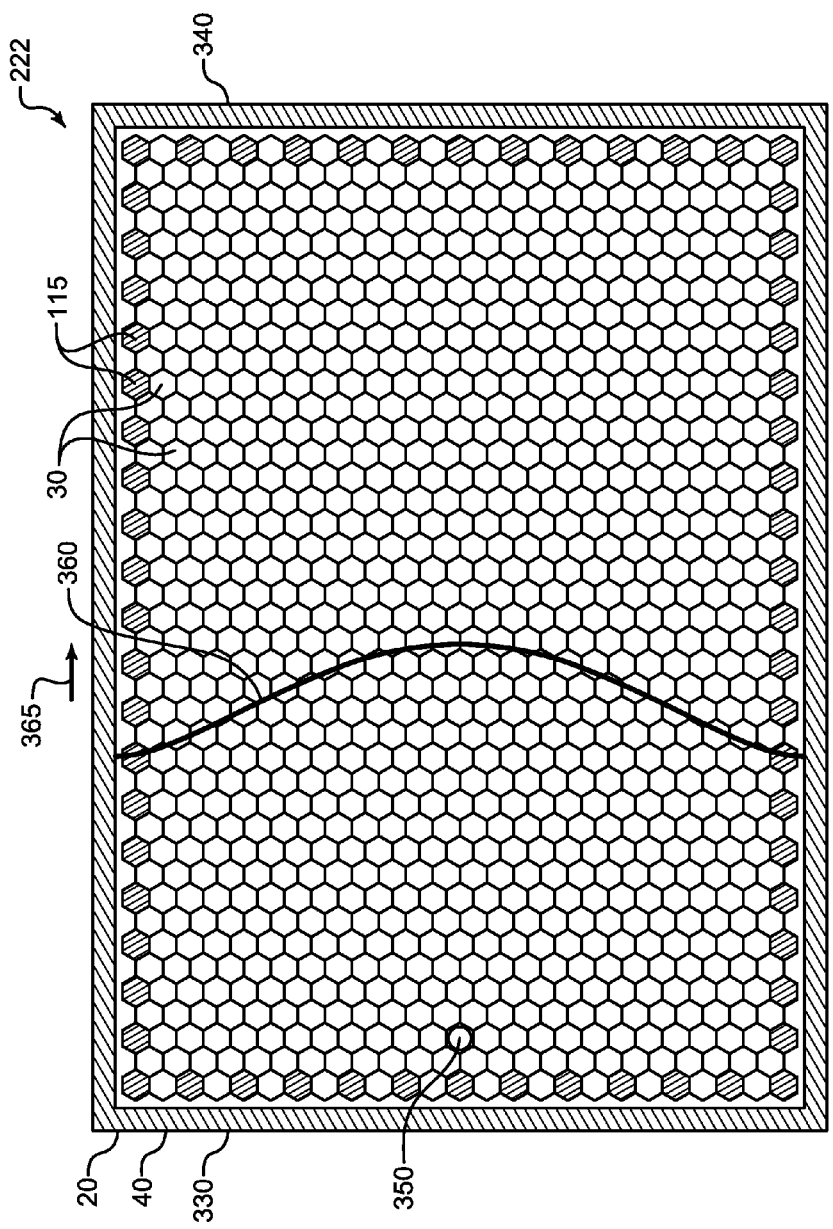
FIG. 5 is a view in horizontal section of a parallelepiped-shaped nuclear fission reactor core containing a plurality of the nuclear fission reactor modules and breeder fuel modules.

As best seen in FIG. 5, nuclear fission modules 30 may be arranged to define a parallelepiped-shaped nuclear fission reactor core configuration, generally referred to as 222 rather than the previously mentioned hexagonally-shaped configuration. In this regard, reactor core enclosure 40 of nuclear fission reactor core 222 defines a first end 330 and a second end 340, for reasons provided hereinbelow.

Referring again to FIG. 5, regardless of the configuration selected for the nuclear fission reactor core, the nuclear fission reactor core 20 or 222 may be configured as a traveling wave nuclear fission reactor core. In this regard, a comparatively small and removable nuclear fission igniter 350, which may include isotopic enrichment of nuclear fissionable material, such as, without limitation, U-233, U-235 or Pu-239, is suitably located in reactor core 222. By way of example only and not by way of limitation, igniter 350 may be located near first end 330 that is opposite second end 340 of reactor core 340. Neutrons are released by igniter 350. The neutrons that are released by igniter 350 are captured by fissile and/or fertile material within nuclear fission modules 30 to initiate the fission chain reaction. Igniter 350 may be removed once the fission chain reaction becomes self-sustaining, if desired.

Still referring to FIG. 5, igniter 350 initiates a three-dimensional, traveling deflagration wave or "burn wave" 360. When igniter 350 releases its neutrons to cause "ignition", burn wave 360 travels outwardly from igniter 350 that is near first end 330 and toward second end 340 of reactor core 222, so as to form the traveling or propagating burn wave 360. In other words, each nuclear fission module 30 is capable of accepting at least a portion of traveling burn wave 360 as burn wave 360 propagates through reactor core 222. Speed of the traveling burn wave 360 may be constant or non-constant. Thus, the speed at which burn wave 360 propagates can be controlled. For example, longitudinal movement of the previously mentioned control rods 95 (see FIG. 3) in a predetermined or programmed manner can drive down or lower neutronic reactivity of fuel rods 50 that are disposed in nuclear fission modules 30. In this manner, neutronic reactivity of fuel rods 50 that are presently being burned at the location of burn wave 360 is driven down or lowered relative to neutronic reactivity of "unburned" fuel rods 50 ahead of burn wave 360. This result gives the burn wave propagation direction indicated by directional arrow 365. Controlling reactivity in this manner maximizes the propagation rate of burn wave 360 subject to operating constraints for reactor core 220. For example, maximizing the propagation rate of burn wave 360 provides means to control burn-up above a minimum value needed for propagation and a maximum value set, in part, by neutron fluence limitations of reactor core structural materials.

The basic principles of such a traveling wave nuclear fission reactor are disclosed in more detail in co-pending U.S. patent application Ser. No. 11/605,943 filed Nov. 28, 2006 in the names of Roderick A. Hyde, et al. and titled "Automated Nuclear Power Reactor For Long-Term Operation", which application is assigned to the assignee of the present application, the entire disclosure of which is hereby incorporated by reference.

Figure 6:
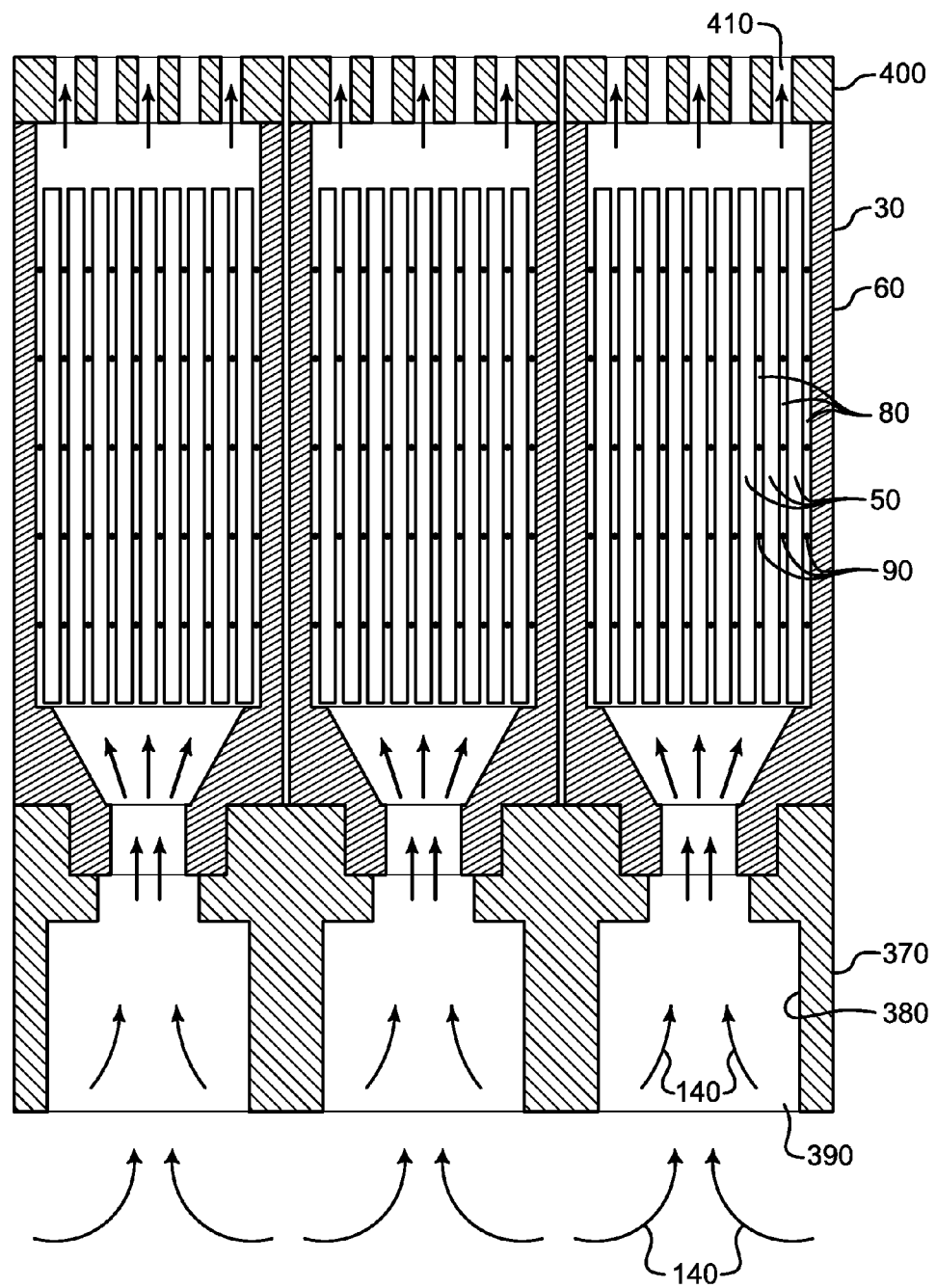
FIG. 6 is a view in vertical section of three exemplary nuclear reactor fission modules with parts removed for clarity.
Figure 7:
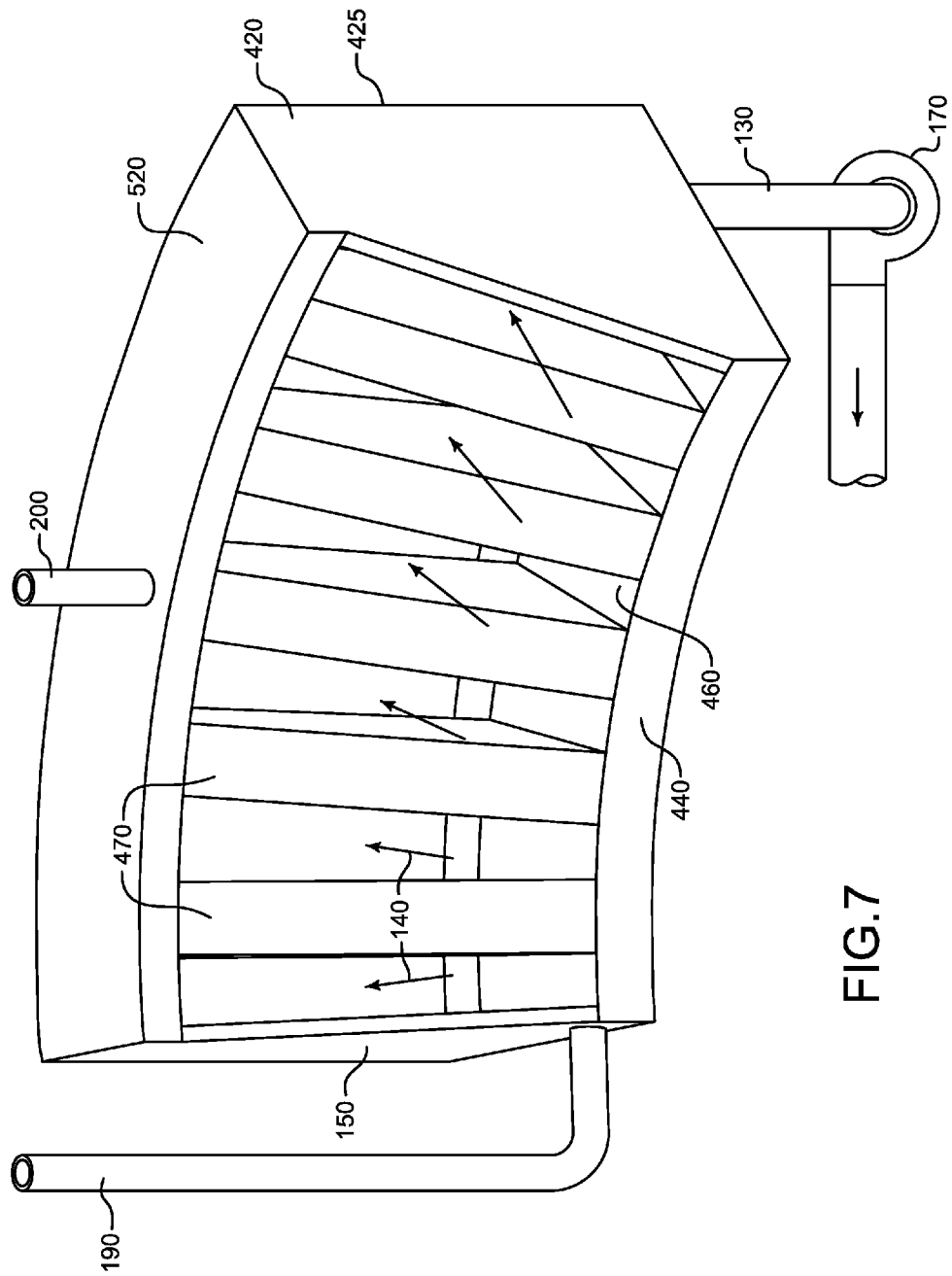
FIG. 7 is an isometric view of a heat exchanger.

Referring to FIG. 6, there are shown upright, adjacent hexagonally-shaped nuclear fission modules 30. Only three adjacent nuclear fission modules 30 are shown, it being understood that a greater number of nuclear fission modules 30 are present in reactor core 20. Each nuclear fission module 30 is mounted on a horizontally extending reactor core lower support plate 370. Reactor core lower support plate 370 suitably extends across a bottom end portion of all nuclear fission modules 30. Reactor core lower support plate 370 has a counter bore 380 therethrough for reasons provided hereinbelow. Counter bore 380 has an open end 390 for allowing flow of coolant thereinto. Horizontally extending across a top end portion or exit portion of all nuclear fission modules 30 and removably connected to nuclear fission modules 30 is a reactor core upper support plate 400 that caps all nuclear fission modules 30. Reactor core upper support plate 400 also defines a plurality of flow slots 410 for allowing flow of coolant therethrough. Primary loop pipe 130 and first pump 170 (see FIG. 1) deliver reactor coolant to nuclear fission modules 30 along a coolant flow path or fluid stream indicated by directional arrows 140. The primary coolant then continues along coolant flow path 140 and through open end 390 that is formed in lower support plate 370.

As previously mentioned, it is important to remove the heat produced by nuclear fission reactor core 20 and the nuclear fission modules 30 therein, regardless of the configuration selected for nuclear fission reactor core 20. Proper heat removal is important for several reasons. For example, heat damage may occur to reactor core structural materials if the peak temperature exceeds material limits. Such peak temperatures may undesirably reduce the operational life of structures subjected to peak temperatures by altering the mechanical properties of the structures, particularly those properties relating to thermal creep. Also, reactor power density is limited by the ability of core structural materials to withstand high peak temperatures without damage. In addition, nuclear fission reactor system 10 alternatively may be used to conduct tests, such as tests to determine effects of temperature on reactor materials. Controlling reactor core temperature by properly removing the heat from the reactor core is important for successfully conducting such tests.

Moreover, it may be desirable to achieve uniform flow rate of the heat transfer fluid through intermediate heat exchanger 150. Such uniform flow rate may otherwise avoid uneven coolant flow to the nuclear reactor core and resulting core reactivity perturbations. Further, it may be desirable to provide uniform distribution of coolant flow through the heat exchanger in order to avoid preferential flow of the coolant through the heat exchanger. Avoidance of preferential flow of the coolant can mitigate development of localized temperature "hot spots" in the heat exchanger. Such localized temperature "hot spots" might otherwise decrease the operational life of the heat exchanger. Uniform flow also acts to enhance heat exchange evenly across the heat transfer surfaces of the heat exchanger, enhancing heat exchange for a given heat exchange area. The structure and operation of intermediate heat exchanger 150 addresses these concerns.

The structure of intermediate heat exchanger 150 will now be described. Referring to FIGS. 1, 7, 8, 8A and 9, intermediate heat exchanger 150 comprises a heat exchanger body 420 affixed to interior wall surface 122 of pressure vessel 120, so that intermediate heat exchanger 150 is supported within pressure vessel 120. As an alternative, interior wall surface 122, with confines pool 125, may form a rear wall of intermediate heat exchanger 150. Heat exchanger body 420 comprises an upright generally L-shaped (in transverse cross section) rear portion 425 that defines a primary fluid exit plenum volume or exit plenum chamber 430 therein. Thus, primary fluid exit plenum chamber 430 is a part of heat exchanger body 420. Primary fluid exit plenum chamber 430 is shaped to provide uniform flow of a first heat transfer fluid (i.e., the primary heat transfer fluid) through primary fluid exit plenum chamber 430, as described in more detail hereinbelow. Formed through rear portion 425 of heat exchanger body 420, but within primary fluid exit plenum chamber 430, is a primary fluid exit port 435 that opens into primary loop coolant pipe 130. Connected to rear portion 425 is a bottom portion 440 of heat exchanger body 420 defining a bottom plenum 450 for hot secondary sodium. Bottom plenum 450, which has a bottom plenum exit side or port 455, forms a box-like structure having a top surface 460 thereon to which a plurality of upright plate-type heat transfer members 470 are integrally attached, such as by welding. Each heat transfer member 470 defines a flow channel 480 therethrough that has an inlet 490 and an outlet 500 at respective ends of flow channel 480. Inlet 490 is in fluid communication with heat transfer fluid flowing through cold leg pipe segment 200. Outlet 500 is in fluid communication with heat transfer fluid in bottom plenum 450. Moreover, it may be appreciated that the primary fluid is supplied to heat exchanger body 420 without use of a conduit or manifold. In other words, the primary fluid is supplied to heat exchanger body 420 conduit-free or manifold-free. It may be appreciated that pool 125 is also manifold-free. In addition, it may be appreciated that the inlet side of intermediate exchanger 150 may be manifold-free and the outlet side of intermediate exchanger 150 may be manifold-free, as well. This may decrease capital cost of constructing reactor 10 and/or fabrication cost of heat exchanger 150 because such a conduit or manifold is not required.

Figure 8:
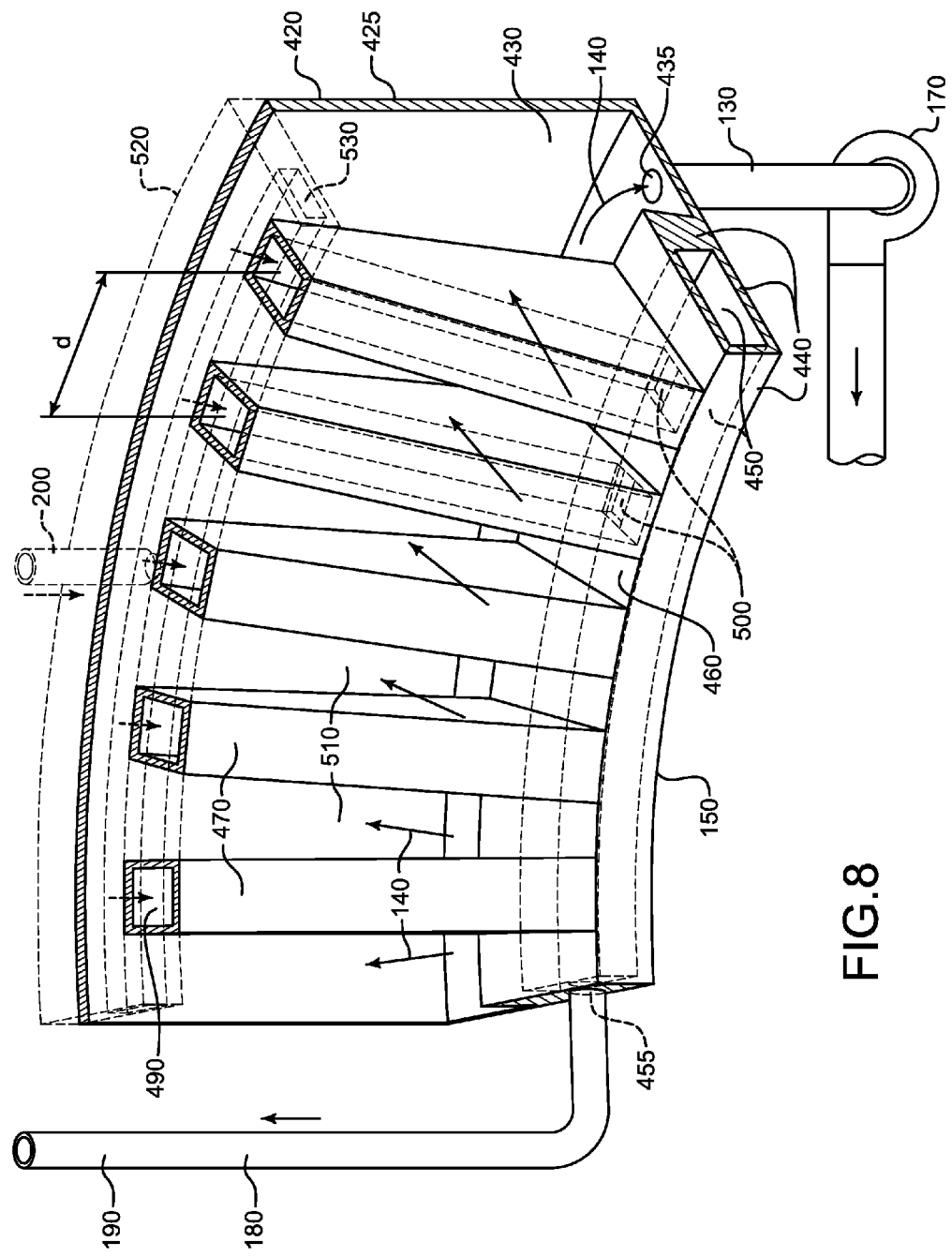
FIG. 8 is an isometric view of a heat exchanger in section and with parts shown in phantom.
Figure 8A:
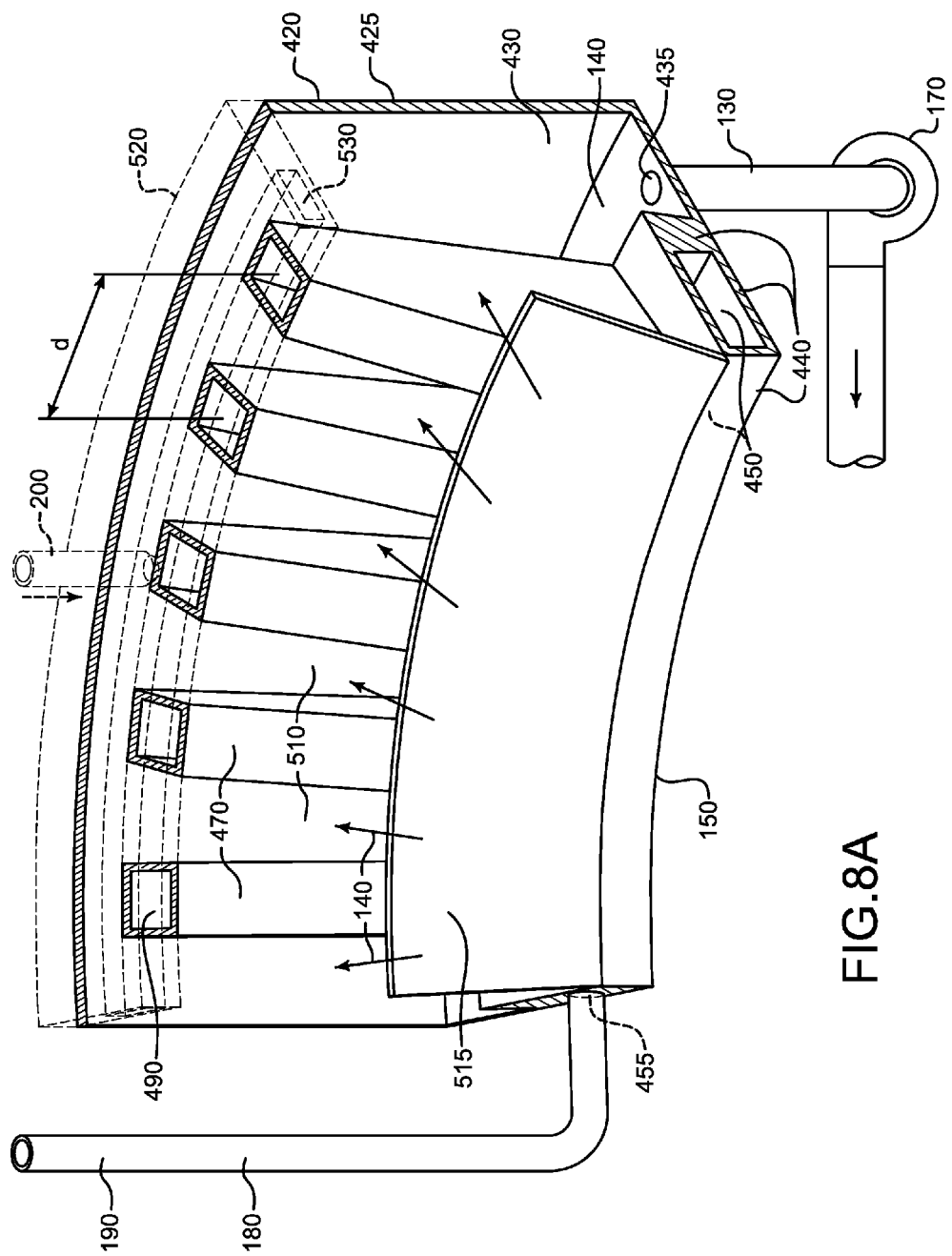
FIG. 8A is an isometric view of a heat exchanger in section and showing a guide structure.
Figure 9:
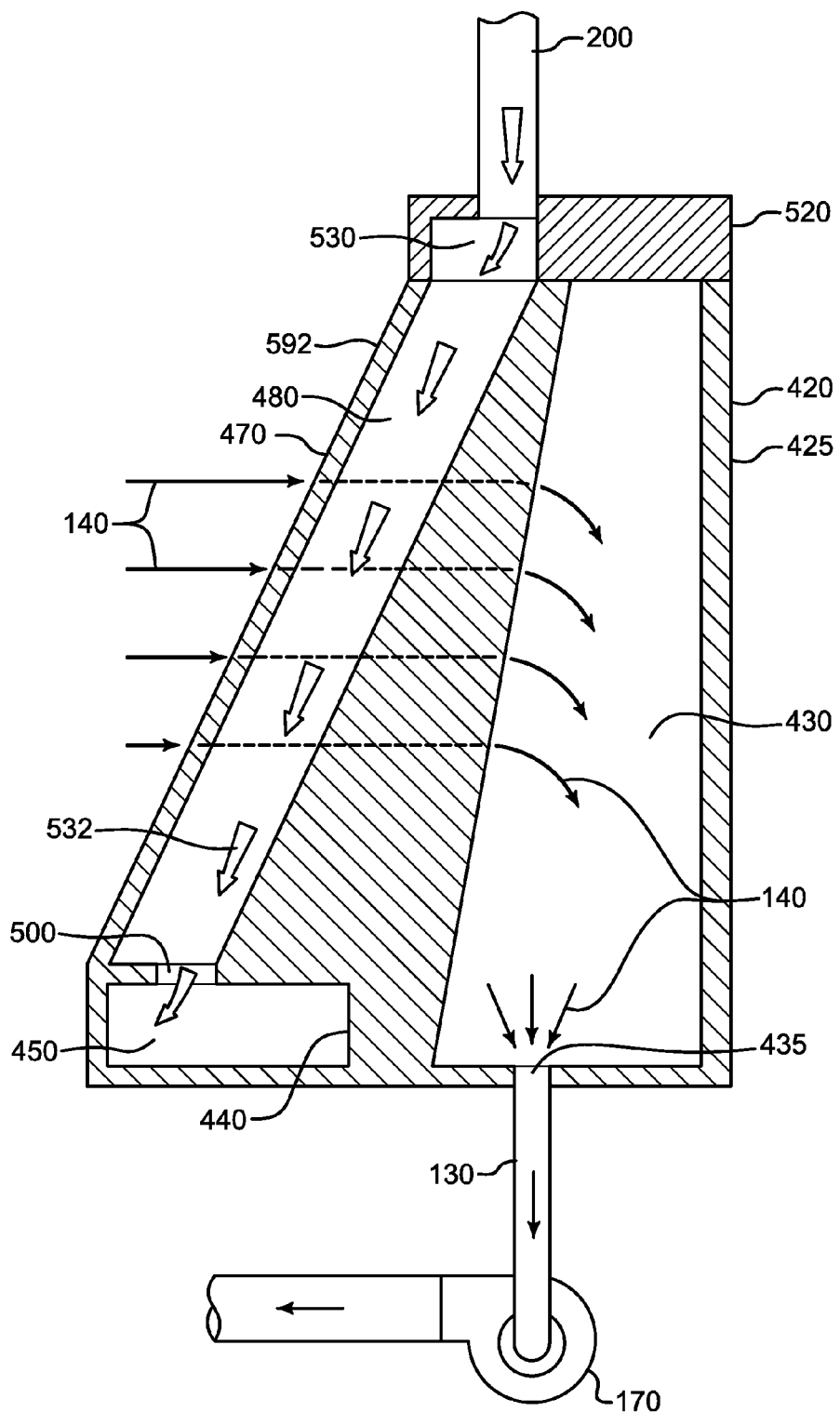
FIG. 9 is a view in vertical section of the heat exchanger, this view showing cross-flow of a primary heat transfer fluid and a secondary heat transfer fluid.

Referring to FIGS. 8, 8A and 9, intermediate heat exchanger 150 comprises a plurality of adjacent heat transfer members 470. The plurality of adjacent heat transfer members 470 are spaced-apart by a relatively small predetermined distance "d" for defining a plurality of flow passages 510 between the adjacent heat transfer members 470. The distance "d" is that distance necessary for achieving even flow distribution among flow passages 510. In other words, heat transfer members 470 are spaced-apart by distance "d" in order to evenly distribute flow of the primary heat transfer fluid through a plurality of flow passages 510. The distance "d" between adjacent heat transfer members 470 may be designed to have different values for different reactor core configurations, as required, in order to achieve the even distribution of flow of the primary heat transfer fluid through the plurality of flow passages. This is so because a particular reactor core configuration may have in-core structure that alters or interferes with the free flow of the primary heat transfer fluid as the heat transfer fluid travels toward heat exchanger 150. The distance "d" may be designed to have different values in order to compensate for this effect. In another embodiment, heat exchanger body 420 may comprise a guide structure 515 for guiding flow of the heat transfer fluid into heat exchanger 150. Guide structure 515 suitably spans heat transfer members 470 and is associated with flow passages 510 such that the heat transfer fluid is guided into flow passages 510. Heat exchanger body 420 further comprises a top portion 520 sealingly mounted on or connected to an upper portion of rear portion 425 and an upper portion of the plurality of heat transfer members 470. Top portion 520 defines a top plenum 530 therein for receiving cooled secondary sodium flowing along flow path 532 from steam generator 210. The cooled secondary sodium flowing along flow path 532 and the primary heat transfer fluid flowing along flow path 140 define a cross-flow configuration. In this cross-flow configuration, flow path 532 is substantially perpendicular (i.e., plus or minus 45°) to flow path 140 in intermediate heat exchanger 150. Top plenum 530 is in communication with inlet 490 for allowing the cooled secondary sodium to flow through inlet 490, into flow channel 470, through outlet 500 and into bottom plenum 450.

Figure 9A:
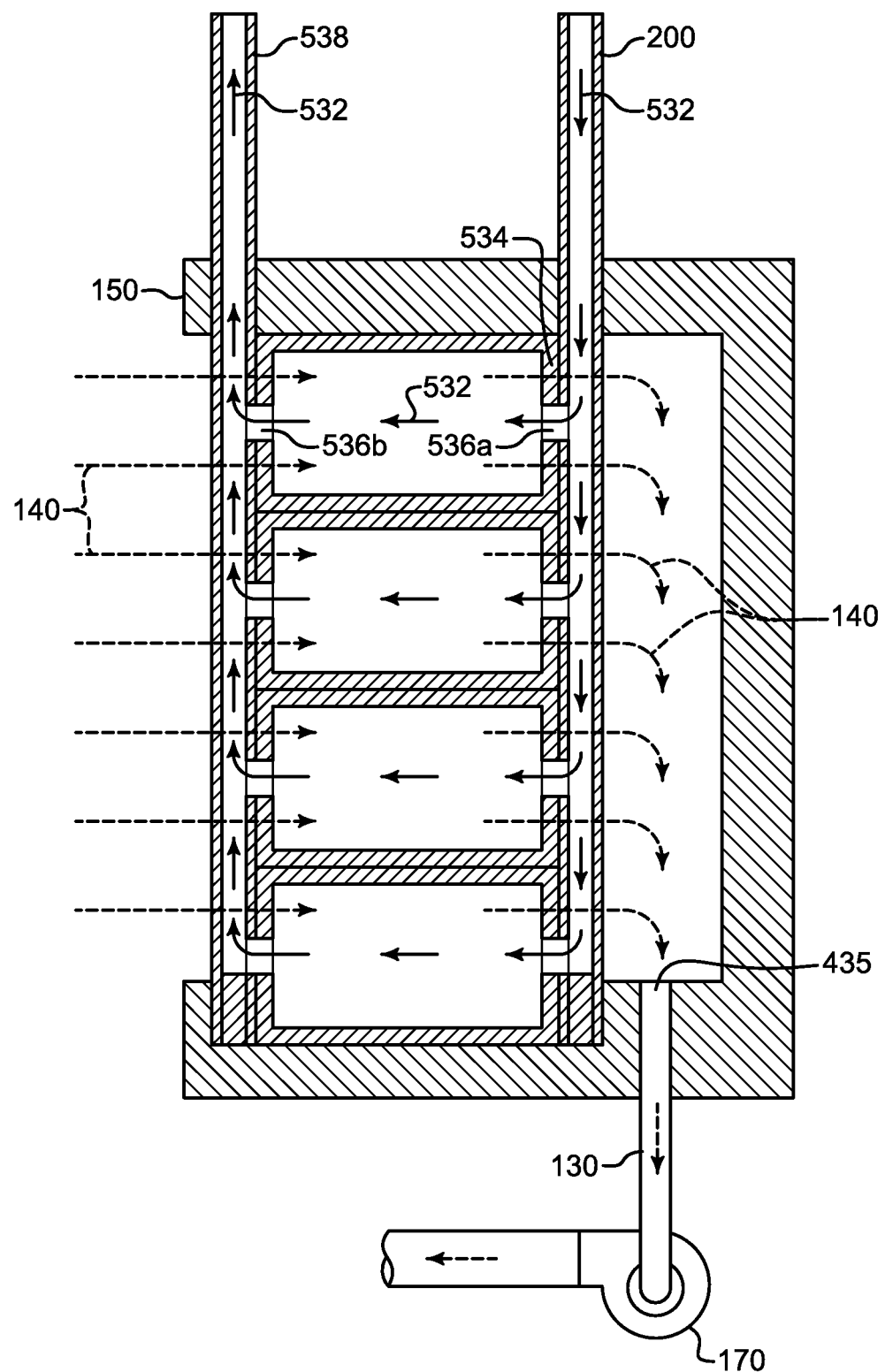
FIG. 9A is a view in vertical section of the heat exchanger, this view showing counter-flow of a primary heat transfer fluid and a secondary heat transfer fluid.
Figure 9B:
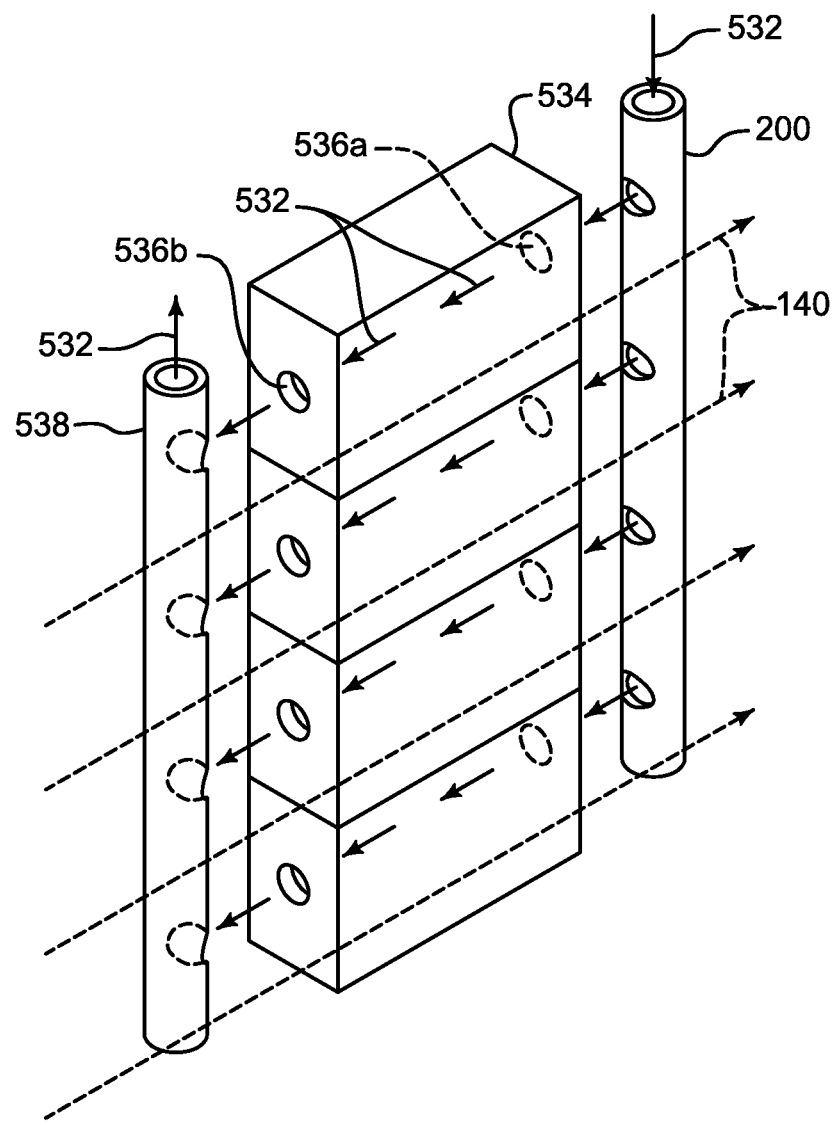
FIG. 9B is an exploded isometric illustration of the heat exchanger shown in FIG. 9A with parts removed for clarity, this view showing the counter-flow of a primary heat transfer fluid and a secondary heat transfer fluid.

Referring to FIGS. 9A and 9B, an alternative embodiment intermediate heat exchanger 150 comprises cold leg pipe segment 200 through which the cooled secondary heat transfer fluid flows along flow path 532. In this regard, cooled secondary heat transfer fluid enters a plate member 534 through an opening 536a and exits an opening 536b that are formed in plate member 534. The secondary heat transfer fluid continues along flow path 532 and enters return pipe segment 538 for returning the secondary heat transfer fluid to steam generator 210. The cooled secondary sodium flowing along flow path 532 and the primary heat transfer fluid flowing along flow path 140 define a counter-flow configuration. In this counter-flow configuration, flow path 532 is parallel, but opposite, to flow path 140 in intermediate heat exchanger 150.

Figure 9C:
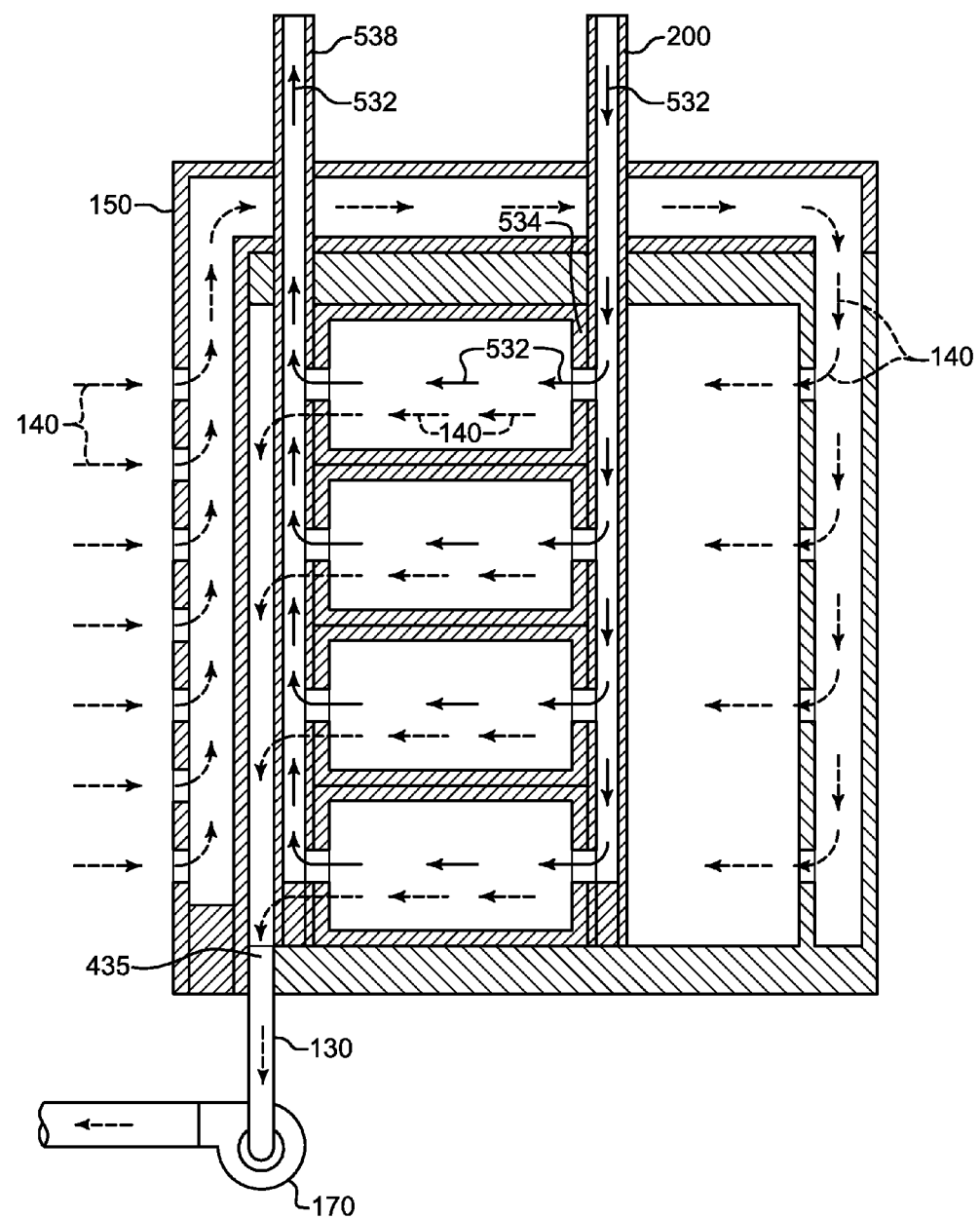
FIG. 9C is a view in vertical section of the heat exchanger, this view showing parallel-flow of a primary heat transfer fluid and a secondary heat transfer fluid.
Figure 9D:
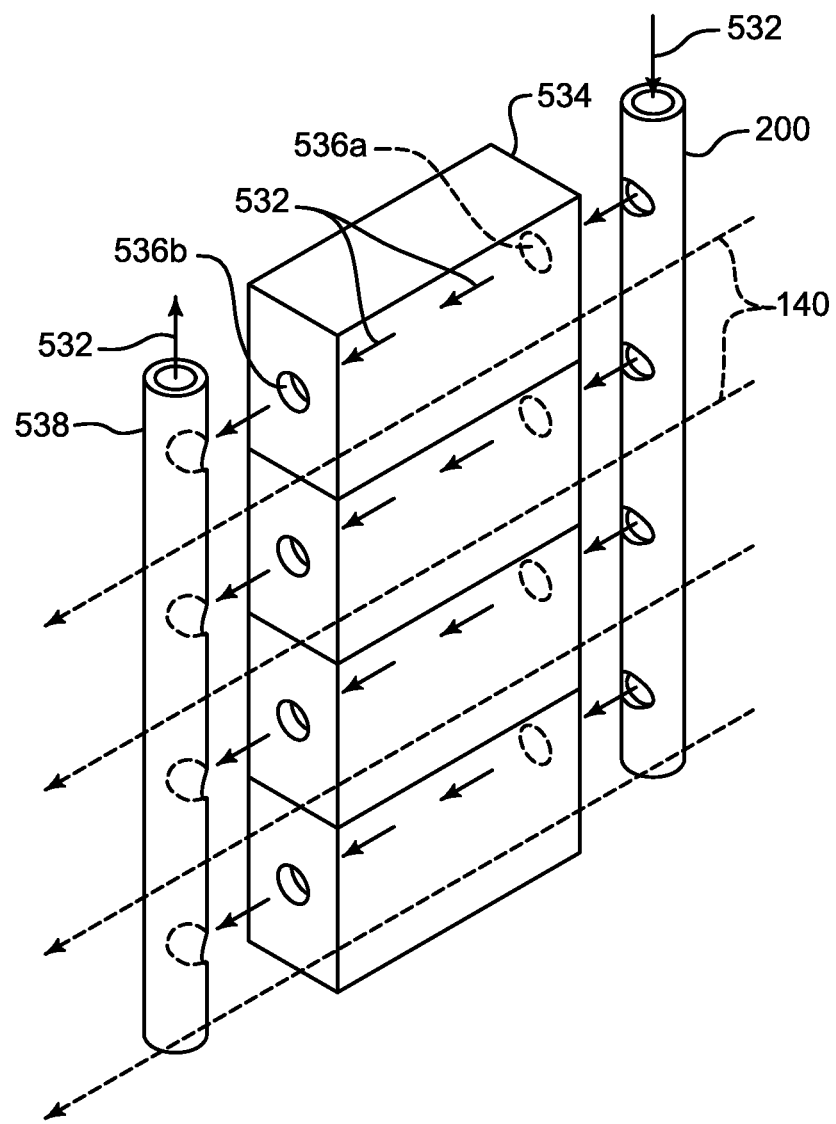
FIG. 9D is an exploded isometric illustration of the heat exchanger shown in FIG. 9C with parts removed for clarity, this view showing the parallel-flow of a primary heat transfer fluid and a secondary heat transfer fluid.
Figure 10:
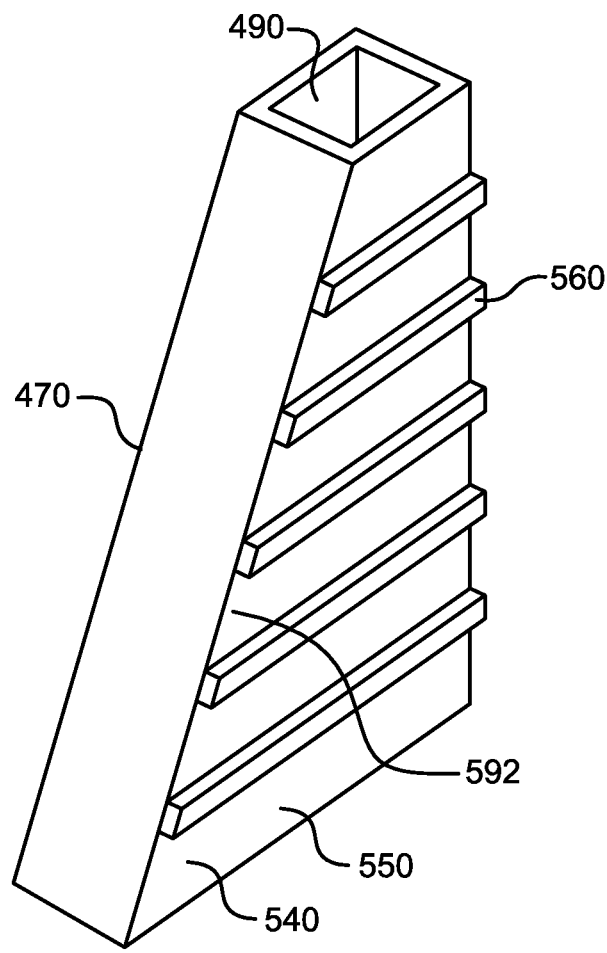
FIG. 10 is an isometric view of a heat transfer member having a plurality of fins on an exterior surface thereof.
Figure 11:
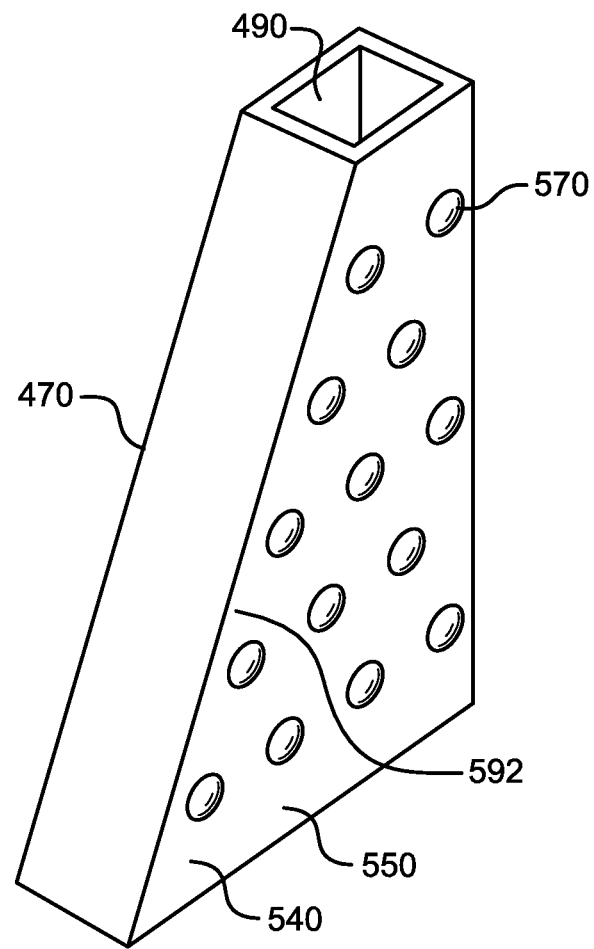
FIG. 11 is an isometric view of a heat transfer member having a plurality of nodules on an exterior surface thereof.
Figure 12:
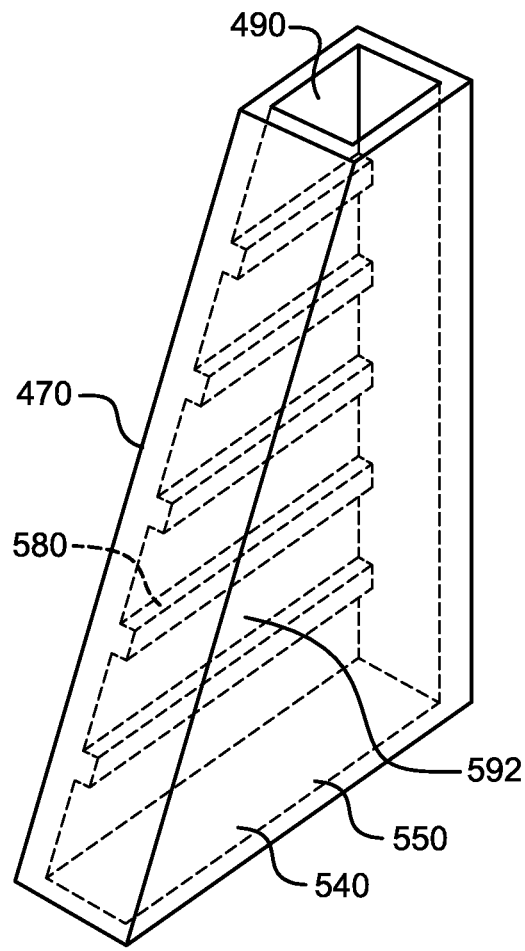
FIG. 12 is an isometric view of a heat transfer member having a plurality of fins on an interior surface thereof.

Referring to FIGS. 9C and 9D, an alternative embodiment intermediate heat exchanger 150 comprises cold leg pipe segment 200 through which the cooled secondary heat transfer fluid flows along flow path 532. In this regard, cooled secondary heat transfer fluid enters plate member 534 through an opening 536a and exits an opening 536b that are formed in plate member 534. The secondary heat transfer fluid continues along flow path 532 and enters a return pipe segment 538 for returning the secondary heat transfer fluid to steam generator 210. The cooled secondary heat transfer fluid flowing along flow path 532 and the primary heat transfer fluid flowing along flow path 140 define a parallel-flow configuration. In this parallel-flow configuration, flow path 532 is parallel and in the same direction to flow path 140 in intermediate heat exchanger 150.

Referring to FIGS. 10, 11, 12, and 13, there are shown alternative embodiments for heat transfer member 470. In this regard, at least one of plurality of heat transfer members 470 comprises a wall 540 defining an enhanced heat transfer surface 550 that accommodates flow of the primary heat transfer fluid along enhanced heat transfer surface 550. In this regard, wall 540 separates hot primary sodium (i.e., a first heat transfer fluid) from cool secondary sodium (i.e., a second heat transfer fluid). At least one of plurality of heat transfer members 470 comprises at least one integrally connected external fin or external flange 560 outwardly extending from wall 540 for forming enhanced heat transfer surface 550. External flange 560 enhances heat transfer by increasing the surface area for increased heat transfer. Alternatively, at least one of plurality of heat transfer members 470 comprises at least one nodule 570 outwardly projecting from wall 540 for forming enhanced heat transfer surface 550. Nodule 570 enhances heat transfer by increasing the surface area for increased heat transfer. As another alternative, at least one of plurality of heat transfer members 470 comprises at least one integrally connected internal fin or internal flange 580 inwardly extending from wall 540 for purposes of enhanced heat transfer. Internal flange 580 enhances heat transfer by increasing the surface area for increased heat transfer. As yet another alternative, at least one of plurality of heat transfer members 470 comprises at least one conduit 590 extending along flow channel 490 for accommodating flow of cooled heat transfer fluid through conduit 590.

Figure 13:
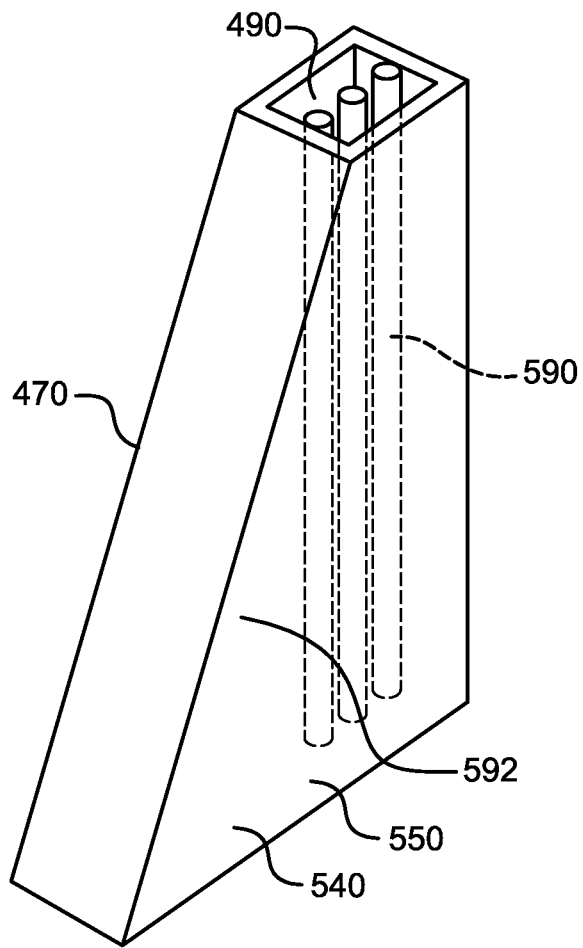
FIG. 13 is a view in an isometric view of a heat transfer member defining a flow channel therethrough and a plurality of conduits disposed along the flow channel.
Figure 13A:
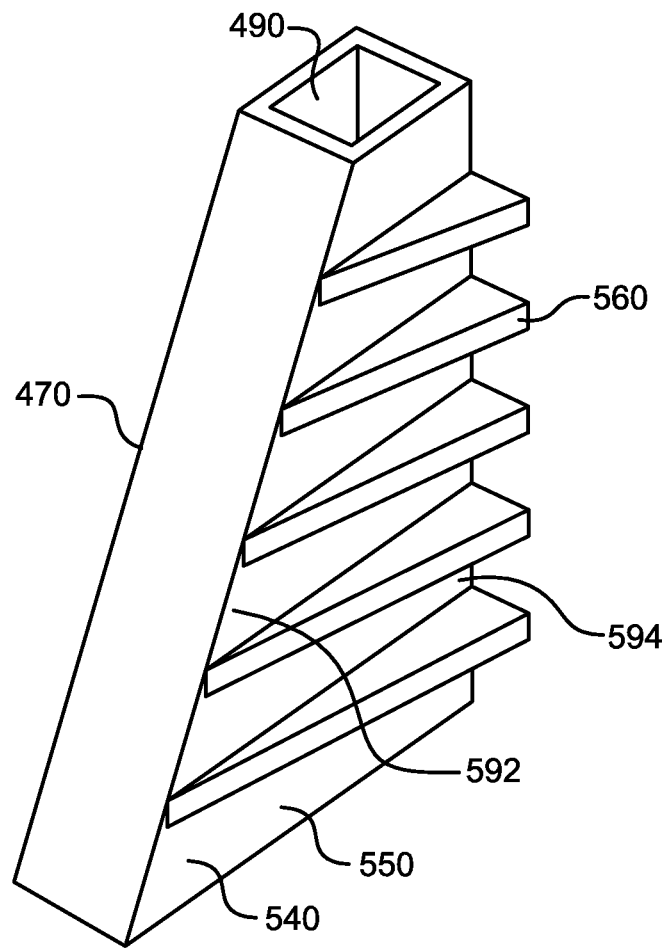
FIG. 13A is an isometric view of a heat transfer member having wedge-shaped fins on an exterior surface thereof.
Figure 13B:
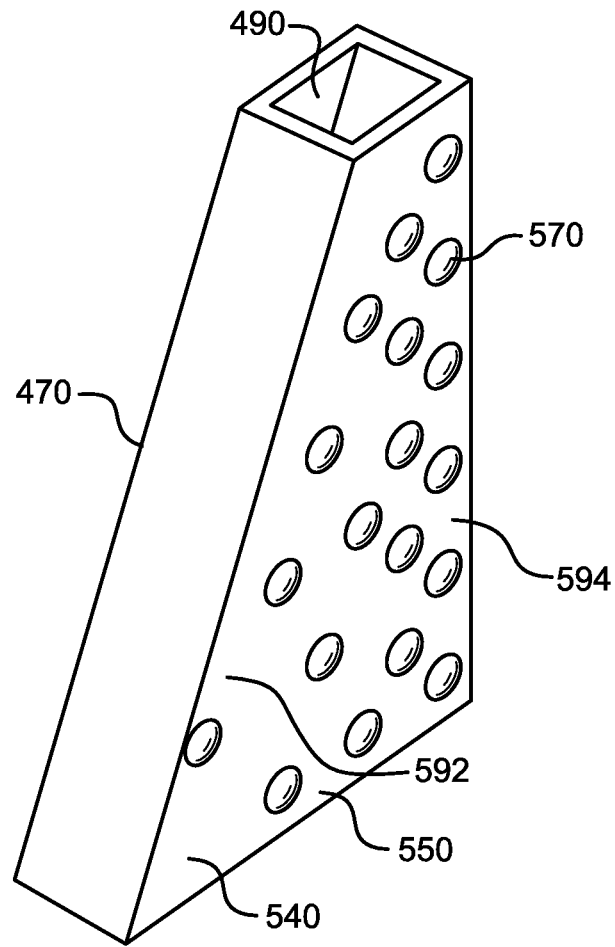
FIG. 13B is an isometric view of a heat transfer member having nodules of increasing density on an exterior surface thereof.

FIGS. 13A and 13B present further embodiments that include enhanced heat transfer surface 550. In this regard, external flange 560 may have increasing heat transfer surface area as flange 560 extends from a forward portion 592 of wall 540 to a rearward portion 594 of wall 540. As may be appreciated by a person of ordinary skill in the art of thermodynamics, a greater portion of heat transfer will occur nearer forward portion 592 of wall 540 than nearer rearward portion 594 of wall 540 because the primary heat transfer fluid flows from forward portion 592 of wall 540 to rearward portion 594 of wall 540. Thus, more heat transfer will occur nearer forward portion 592 of wall 540 and a reduced amount of heat transfer will occur nearer rearward portion 594 of wall 540. In order to compensate for the reduced heat transfer near rearward portion 594 of wall 540, the heat transfer surface area of flange 560 increases as flange 560 extends from forward portion 592 of flange 560 to rearward portion 594 of flange 560. For example, flange 560 may be wedge-shaped with a smaller end portion thereof near forward portion 592 and a wider end portion thereof near rearward portion 594. As another alternative, density of nodules 570 (i.e., number of nodules 570 per unit area) that outwardly project from wall 540 may increase from forward portion 592 to rearward portion 594 for increasing heat transfer surface area from forward portion 592 of wall 540 to rearward portion 594 of wall 540. This configuration of nodules 570 compensates for the reduced heat transfer occurring near rearward portion 594 of wall 540.

Figure 14:
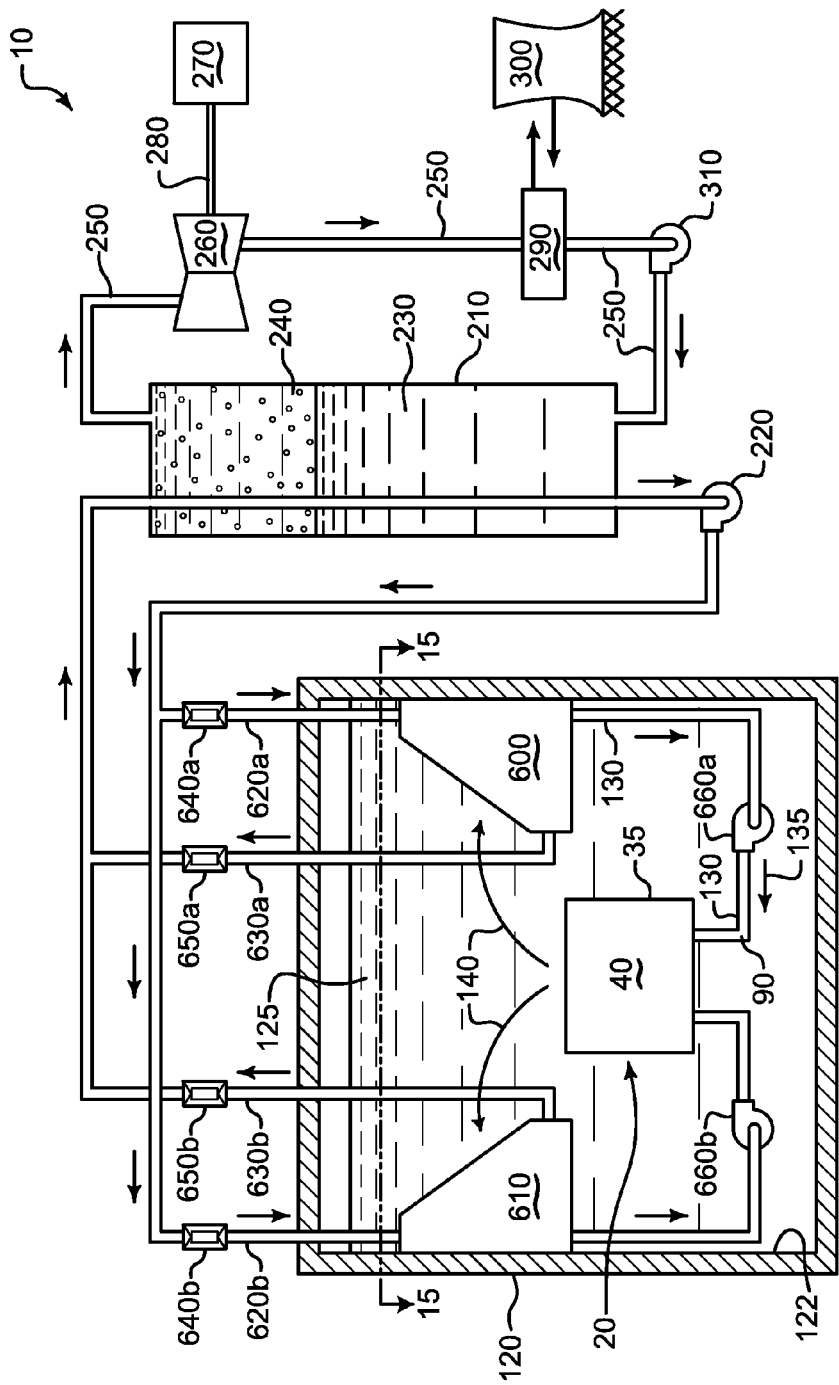
FIG. 14 is a schematic illustration of a plurality of heat exchangers disposed in a pressure vessel.
Figure 15:
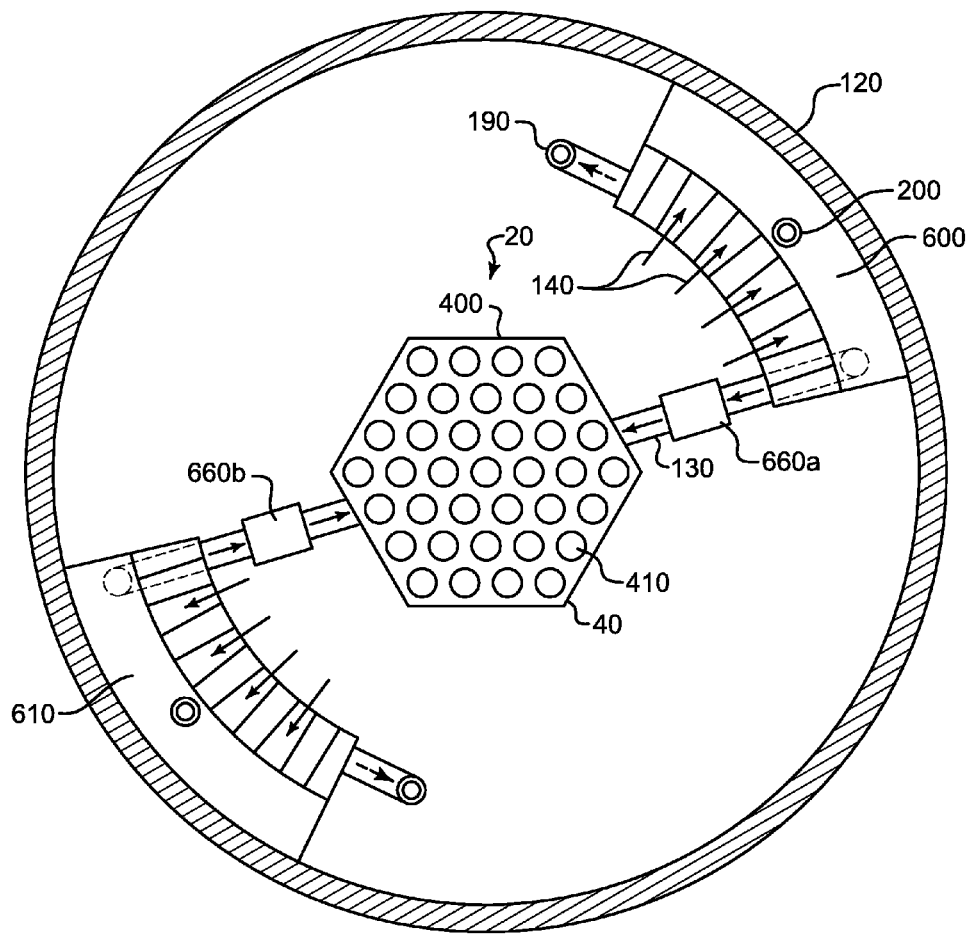
FIG. 15 is a view taken along section line 15-15 of FIG. 14.

Turning now to FIGS. 14 and 15, there is shown an alternative embodiment of nuclear fission reactor system 10, wherein there are a plurality of heat exchangers, such as a first heat exchanger 600 and a second heat exchanger 610. Each of first heat exchanger 600 and second heat exchanger 610 is coupled to steam generator 210 by a first cold leg pipe segment 620a and a second cold leg pipe segment 620b, respectively, that supply cooled heat transfer fluid to heat exchangers 600/610. In addition, each of first heat exchanger 600 and second heat exchanger 610 is coupled to steam generator 210 by a first hot leg pipe segment 630a and a second hot leg pipe segment 630b, respectively, that allow extraction of heated heat transfer fluid from heat exchangers 600/610. Moreover, if desired, there may be a first shut-off valve 640a installed in first cold leg pipe segment 620a and a second shut-off valve 640b installed in second cold leg pipe segment 620b for reasons described presently. In addition, there may be a third shut-off valve 650a installed in first hot leg pipe segment 630a and a fourth shut-off valve 650b installed in hot leg pipe segment 630b for reasons described presently. In this regard, if desired, shut-off valves 640a/650a can be closed to cease coolant flow to and from first heat exchanger 600 and thereby isolate first heat exchanger 600. Also, if desired, shut-off valves 640b/650b can be closed to cease coolant flow to and from second heat exchanger 610 and thereby isolate second heat exchanger 610. It may be desirable to isolate either first heat exchanger 600 or second heat exchanger 610 if a leak occurs in wall 540 of any of heat transfer members 470. In addition, a plurality of pumps, such as pumps 660a and 660b, are coupled to respective ones of plurality of heat exchangers 600 and 610 for pumping cooled heat transfer fluid from heat exchangers 600 and 610 to nuclear fission reactor core 20.

Figure 16:
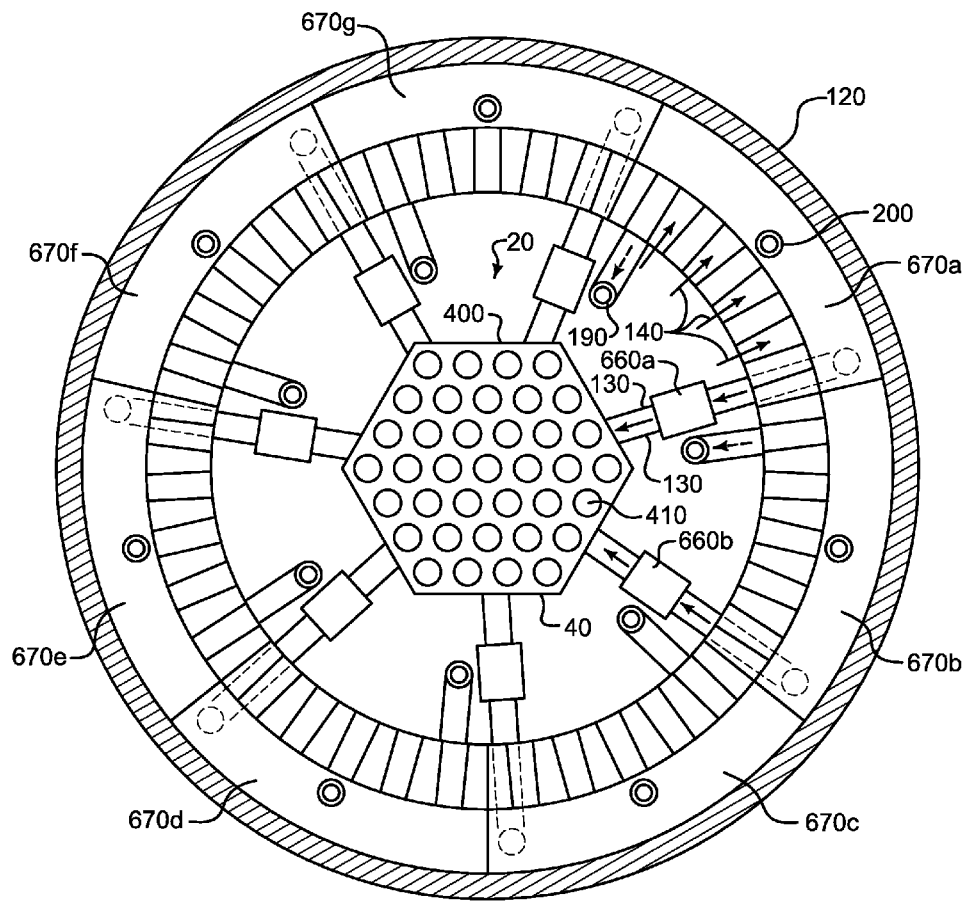
FIG. 16 is a view in horizontal section of a pressure vessel belonging to the nuclear fission reactor system, this view showing a plurality of contiguous heat exchangers disposed in the pressure vessel.

Referring to FIG. 16, there is show an embodiment, wherein a plurality of heat exchangers 670a, 670b, 670c, 670d, 670e, 670f and 670g are arranged side-by-side or contiguously around interior wall surface 122 of pressure vessel 120. This embodiment provides another configuration for using intermediate heat exchanger 150.

Referring to FIGS. 1, 6, 7, 8, 8A, 9, 10, 11, 12, and 13, operation of intermediate heat exchanger 150 will now be further described. In this regard, heat generated by fuel rods 50 in nuclear fission reactor core 20, due to the fission process, is taken-up by the primary heat transfer fluid, also referred to herein as the first heat transfer fluid. As the heat is generated, first pump 170 is operated to suction or draw the first heat transfer fluid from heat exchanger 150 and then pump the first heat transfer fluid past fuel rods 50, through flow slots 410 in upper core support plate 400 and into coolant pool 125. Continued operation of first pump 170 will then draw the first heat transfer fluid through flow passages 510 and into primary fluid exit plenum chamber 430. As the first heat transfer fluid flows through flow passages 510, the first heat transfer fluid will come into intimate contact with enhanced heat transfer surface 550. As the first heat transfer fluid flows in intimate contact with enhanced heat transfer surface 550, cooler secondary heat transfer fluid flows from steam generator 210, along cold pipe segment 200, into top plenum 530, through inlet 490, through flow channel 480, through outlet 500 and into bottom plenum 450. Thereafter, the second heat transfer fluid exits bottom plenum 450 through exit port 455 to be received by hot leg pipe segment 190 that passes through steam generator 210. The second heat transfer fluid that travels along the portion of hot leg pipe segment 190 and that passes through steam generator 210 transfers its heat to body of water 230 for generating steam 240. Second pump 220 is operated to bring the cooler secondary fluid from steam generator 210 to top plenum 520.

Still referring to FIGS. 1, 6, 7, 8, 8A, 9, 10, 11, 12, and 13, heat transfers from the first heat transfer fluid of higher temperature flowing through flow passages 510 to the second heat transfer fluid of lower temperature flowing through flow channels 480. This heat transfer occurs by conduction through wall 540 of heat transfer member 470.

Still referring to FIGS. 1, 6, 7, 8, 8A, 9, 10, 11, 12, and 13, the plurality of adjacent heat transfer members 470 are spaced-apart by the previously mentioned predetermined distance "d" in order to evenly distribute flow of the primary heat transfer fluid through plurality of flow passages 510. As previously mentioned, primary fluid exit plenum chamber 430 is shaped to provide uniform flow of a first heat transfer fluid (i.e., the primary heat transfer fluid) through primary fluid exit plenum chamber 430. In this regard, an upper portion of primary fluid exit plenum chamber 430 is disposed closer to interior wall surface 122, so that primary fluid exit plenum chamber 430 has a smaller volume than a lower portion of primary fluid exit plenum chamber 430. In other words, volume of primary fluid exit plenum chamber 430 becomes greater nearer exit port 435 than inlet 490. This shape for primary fluid exit plenum 430 provides uniform flow of the first heat transfer fluid (i.e., the primary heat transfer fluid) through primary fluid exit plenum chamber 430.

Illustrative Methods

Illustrative methods associated with exemplary embodiments of the nuclear fission reactor system and the heat exchanger will now be described.

Referring to FIGS. 17-47, illustrative methods, for use in association with a nuclear fission reactor capable of generating heat, are provided for assembling a heat exchanger.

Figure 17:
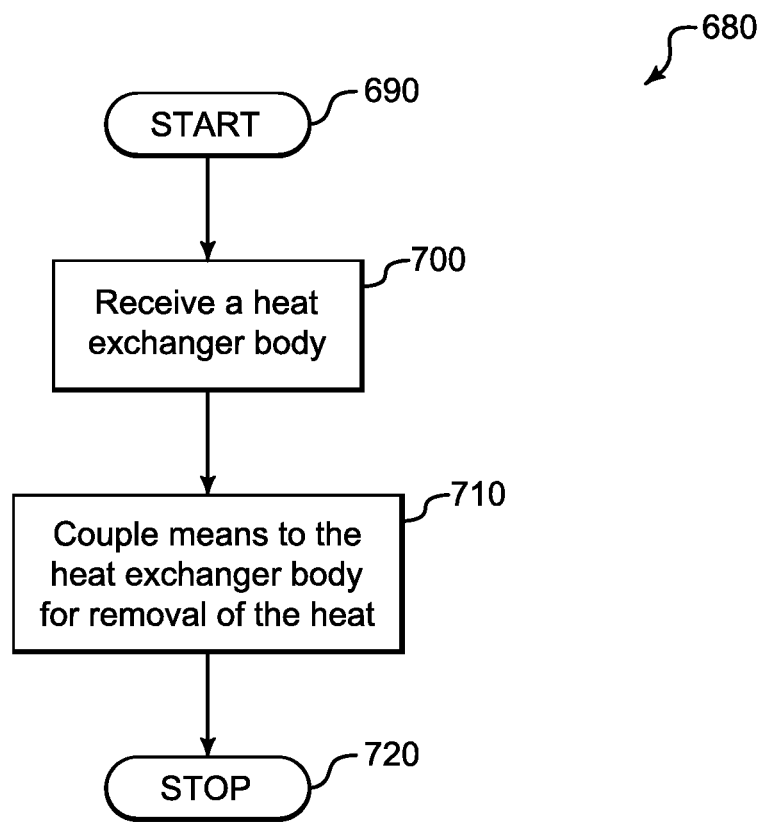
FIGS. 17-47 are flowcharts of illustrative methods, for use in association with a nuclear fission reactor, of assembling a heat exchanger.

Turning now to FIG. 17, for use in association with a pool-type nuclear fission reactor capable of generating heat, an illustrative method 680 of assembling a heat exchanger starts at a block 690. At a block 700, the method comprises receiving a heat exchanger body. At a block 710, means is coupled to the heat exchanger body for removal of the heat. The method stops at block 720.

Figure 18:
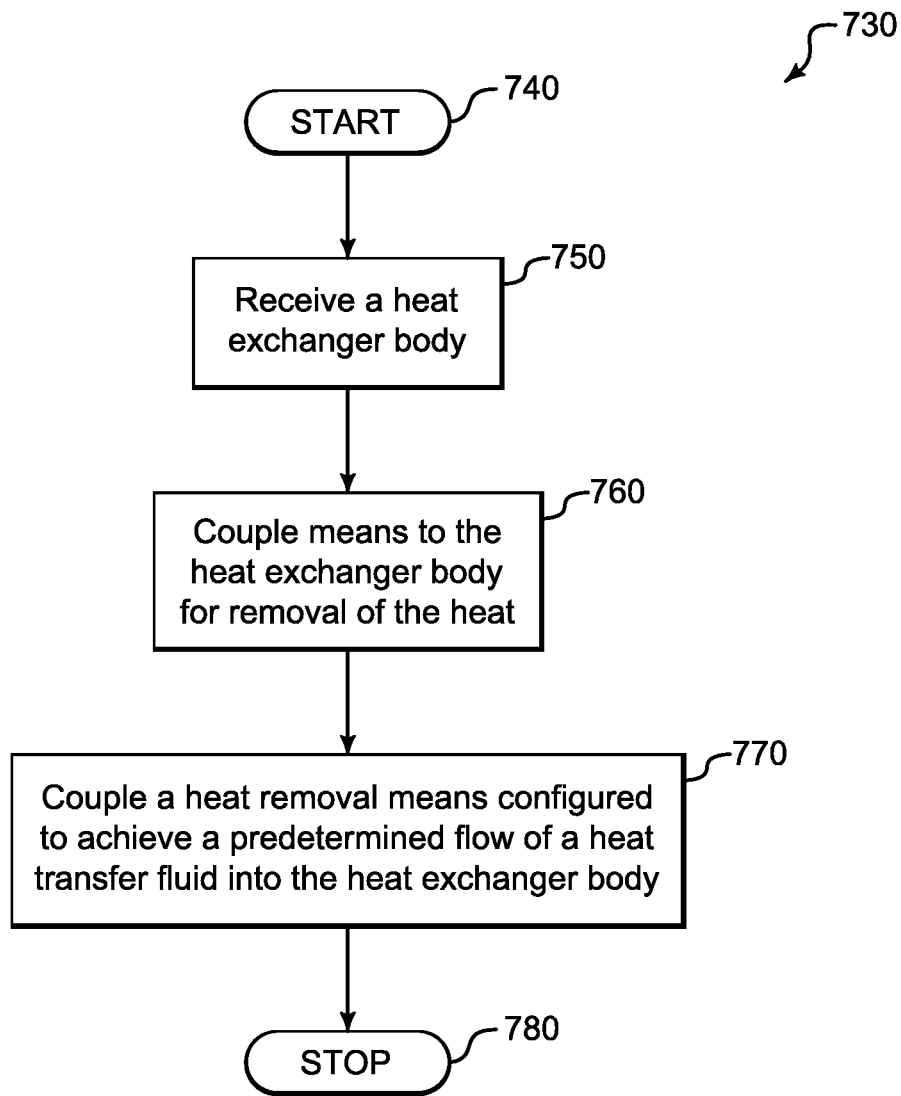

Referring to FIG. 18, for use in association with a pool-type nuclear fission reactor capable of generating heat, an illustrative method 730 of assembling a heat exchanger starts at block 740. At block 750, the method comprises receiving a heat exchanger body. At block 760, the method comprises coupling means to the heat exchanger body for removal of the heat. At a block 770, the method comprises coupling a heat removal means configured to achieve a predetermined flow of a heat transfer fluid into the heat exchanger body. The method stops at block 780.

Figure 19:
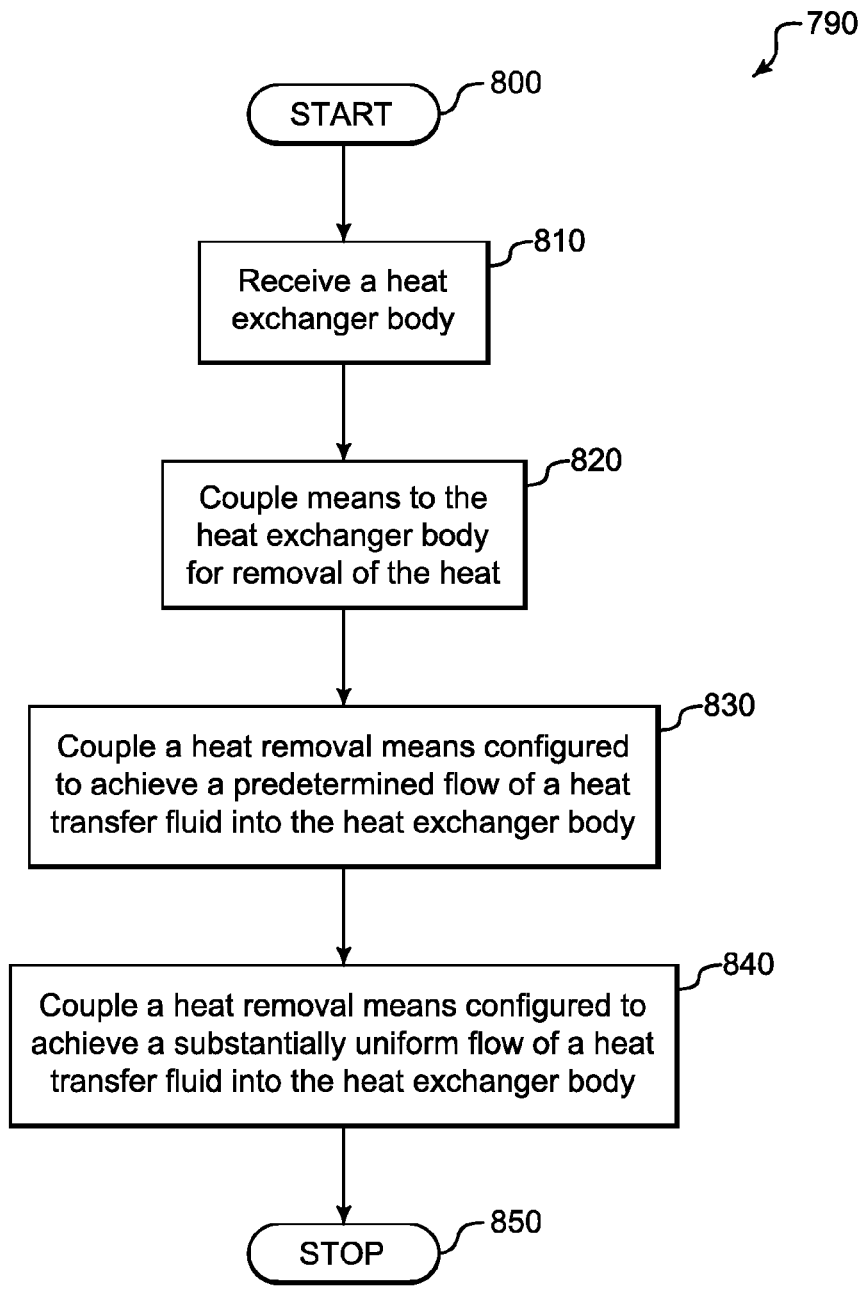

Referring to FIG. 19, for use in association with a pool-type nuclear fission reactor capable of generating heat, an illustrative method 790 of assembling a heat exchanger starts at a block 800. At a block 810, the method comprises receiving a heat exchanger body. At a block 820, means is coupled to the heat exchanger body for removal of the heat. At a block 830, a heat removal means is coupled that is configured to achieve a predetermined flow of a heat transfer fluid into the heat exchanger body. At a block 840, a heat removal means is coupled that is configured to achieve a substantially uniform flow of a heat transfer fluid into the heat exchanger body. The method stops at a block 850.

Figure 20:
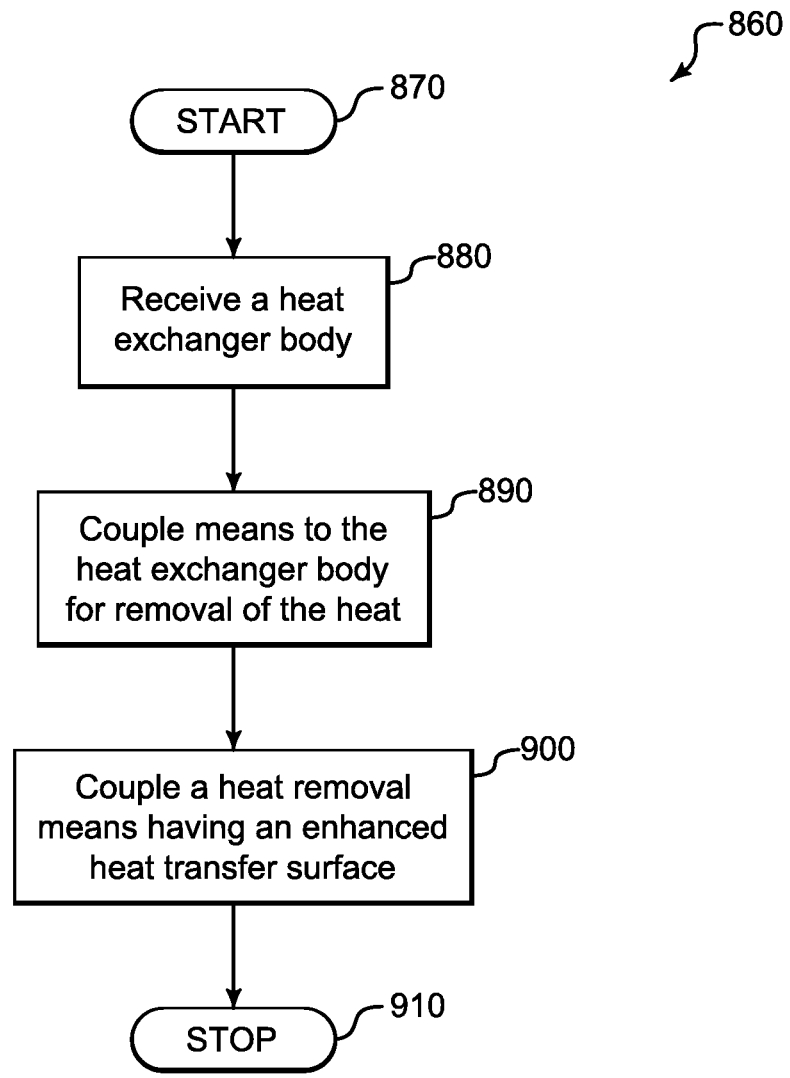

Referring to FIG. 20, for use in association with a pool-type nuclear fission reactor capable of generating heat, an illustrative method 860 of assembling a heat exchanger starts at a block 870. At a block 880, the method comprises receiving a heat exchanger body. At a block 890, means is coupled to the heat exchanger body for removal of the heat. At a block 900, a heat removal means having an enhanced heat transfer surface is coupled. The method stops at a block 910.

Figure 21:
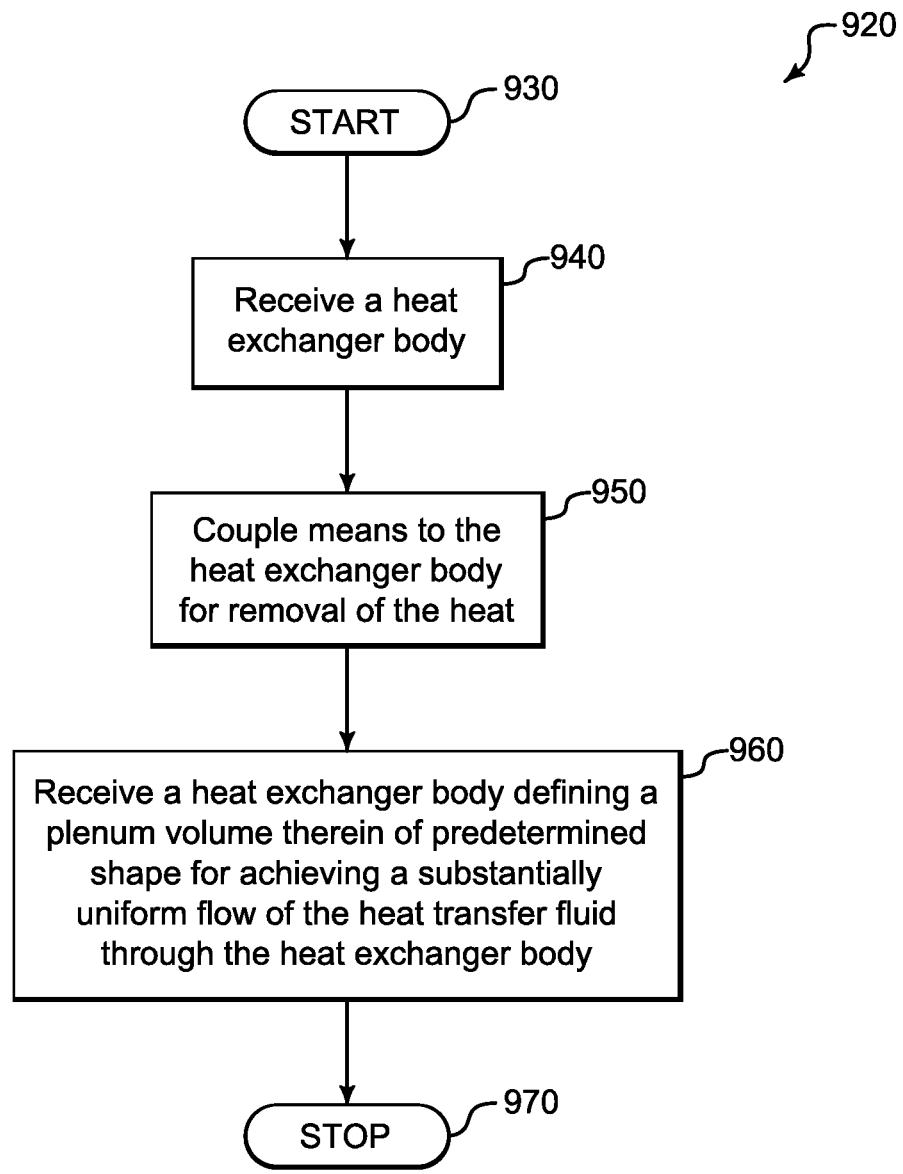
Figure 21A:
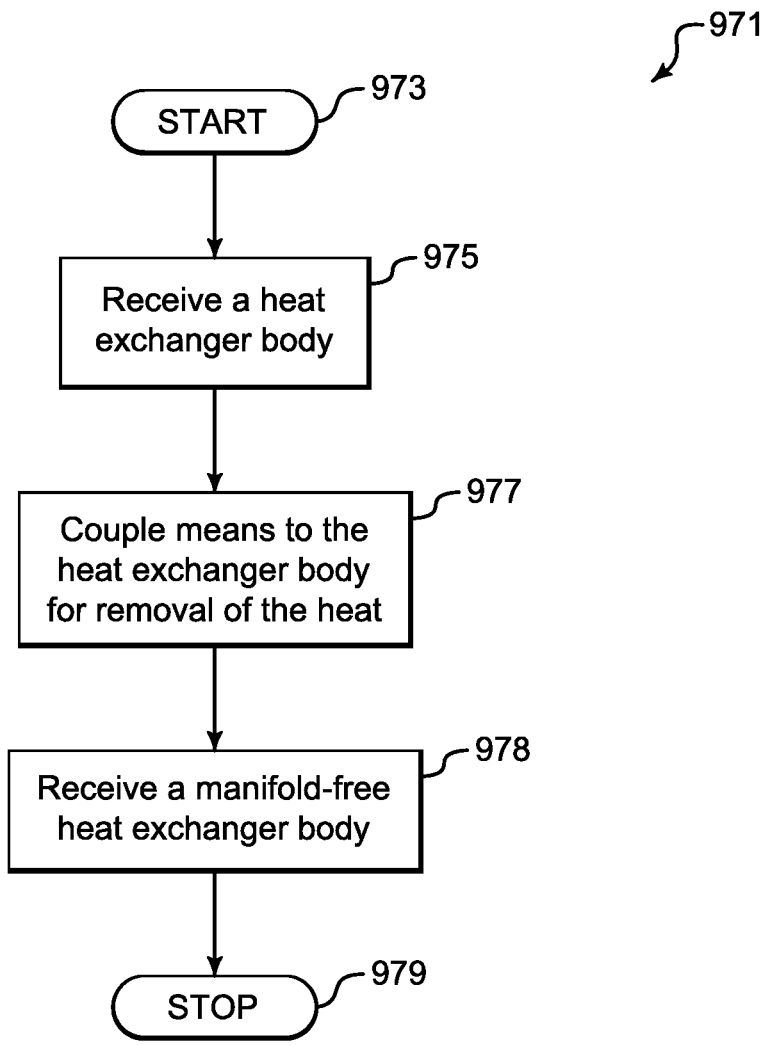

Referring to FIG. 21, for use in association with a pool-type nuclear fission reactor, an illustrative method 920 of assembling a heat exchanger starts at a block 930. At a block 940, means is coupled to the heat exchanger body for removal of the heat. At a block 950, a heat exchanger body defining a plenum volume therein of predetermined shape is received for achieving a substantially uniform flow of the heat transfer fluid through the heat exchanger body. The method stops at a block 970.

Referring to 21A, for use in association with a pool-type nuclear fission reactor capable of generating heat, an illustrative method 971, of assembling a heat exchanger starts at a block 973. At a block 975, the method comprises receiving a heat exchanger body. At a block 977, means are coupled to the heat exchanger body for removal of the heat. At a block 978, a manifold-free heat exchanger body is received. The method stops at a block 979.

Figure 22:
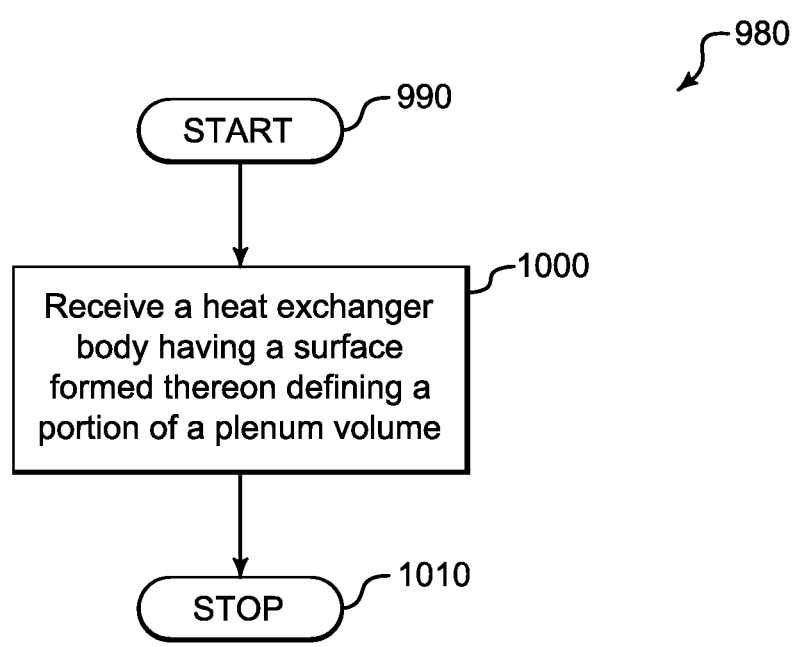

Referring to FIG. 22, for use in association with a pool-type nuclear fission reactor capable of generating heat, an illustrative method 980, of assembling a heat exchanger starts at a block 990. At a block 1000, the method comprises receiving a heat exchanger body having a surface formed thereon defining a portion of a plenum volume. The method stops at a block 1010.

Figure 22A:
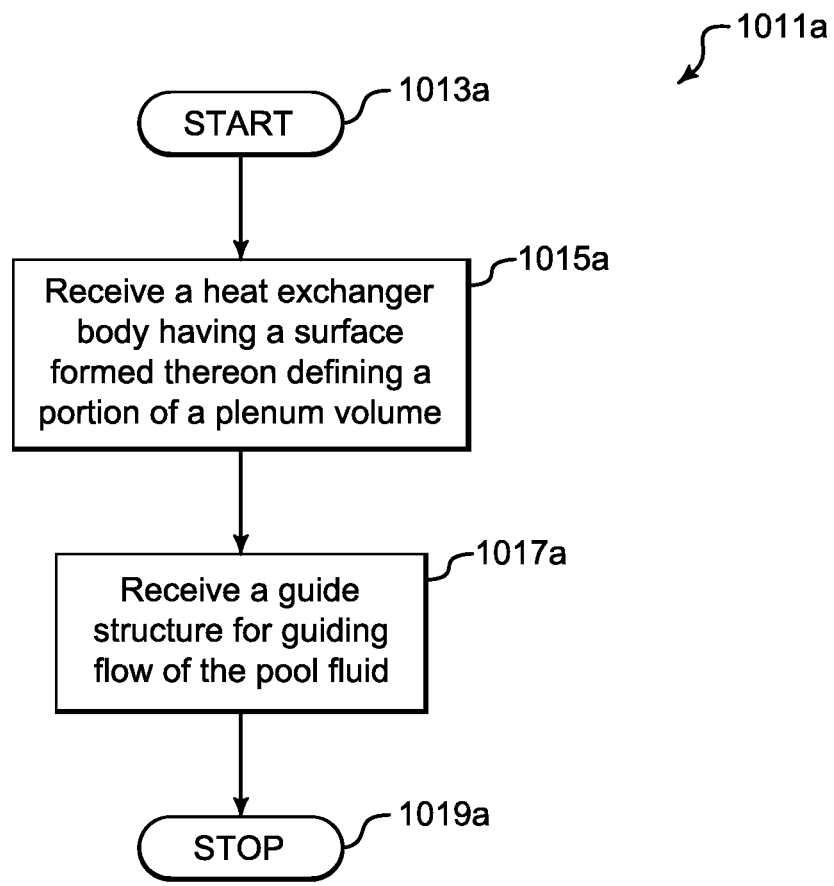

Referring to FIG. 22A, for use in association with a pool-type nuclear fission reactor capable of generating heat, an illustrative method 1011*a*, of assembling a heat exchanger starts at a block 1013*a*. At a block 1015*a*, the method comprises receiving a heat exchanger body having a surface formed thereon defining a portion of a plenum volume. At a block 1017*a*, a guide structure for guiding flow of the pool fluid is received. The method stops at a block 1019*a*.

Figure 22B:
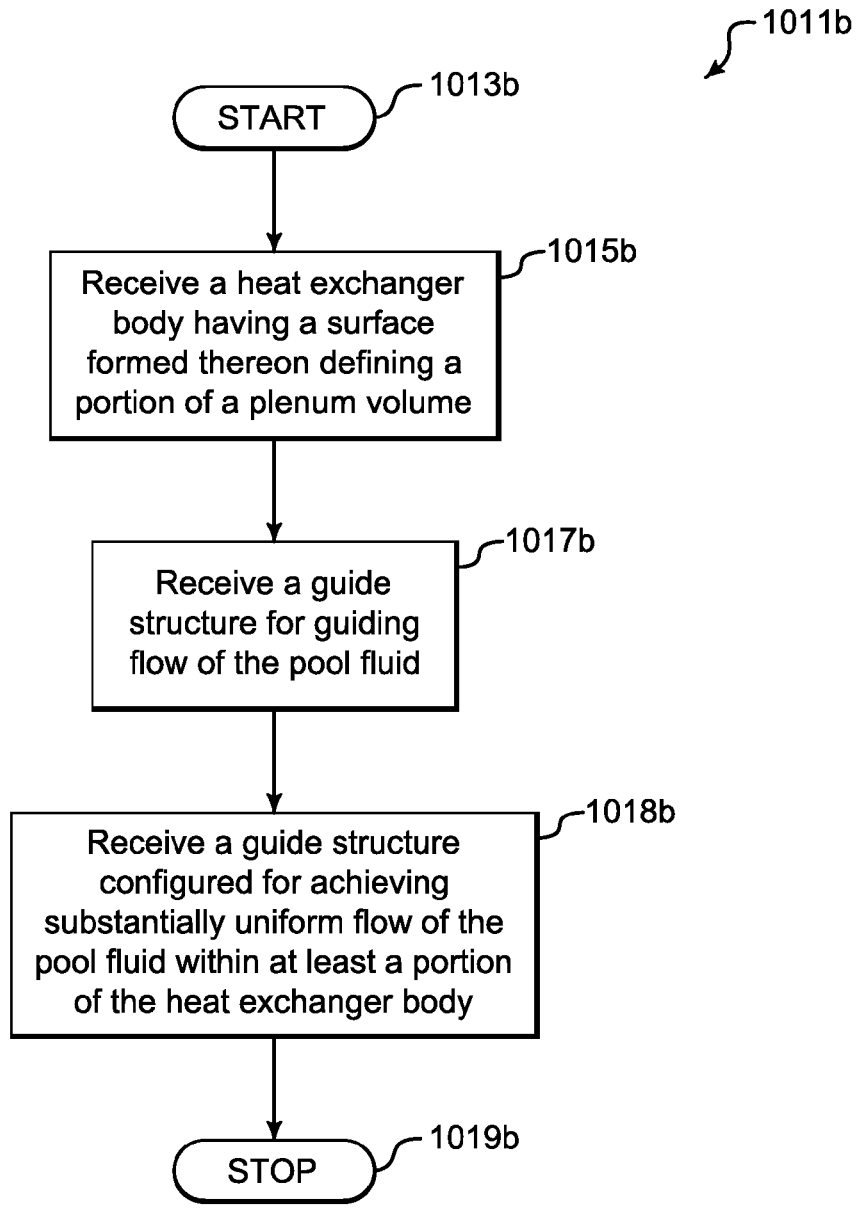

Referring to FIG. 22B, for use in association with a pool-type nuclear fission reactor capable of generating heat, an illustrative method 1011*b*, of assembling a heat exchanger starts at a block 1013*b*. At a block 1015*b*, the method comprises receiving a heat exchanger body having a surface formed thereon defining a portion of a plenum volume. At a block 1017*b*, a guide structure for guiding flow of the pool fluid is received. At a block 1018*b*, a guide structure configured for achieving substantially uniform flow of the pool fluid within at least a portion of the heat exchanger body is received. The method stops at a block 1019*b*.

Figure 22C:
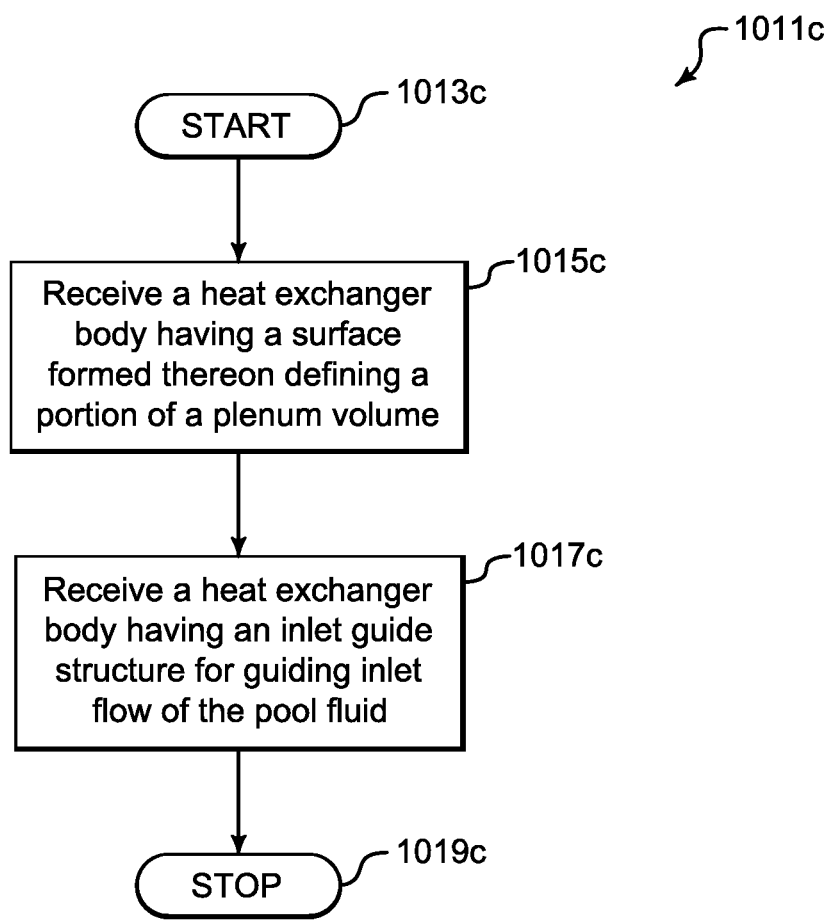

Referring to FIG. 22C, for use in association with a pool-type nuclear fission reactor capable of generating heat, an illustrative method 1011*c*, of assembling a heat exchanger starts at a block 1013*c*. At a block 1015*c*, the method comprises receiving a heat exchanger body having a surface formed thereon defining a portion of a plenum volume. At a block 1017*c*, a heat exchanger body having an inlet guide structure for guiding inlet flow of the pool fluid is received. The method stops at a block 1019*c*.

Figure 22D:
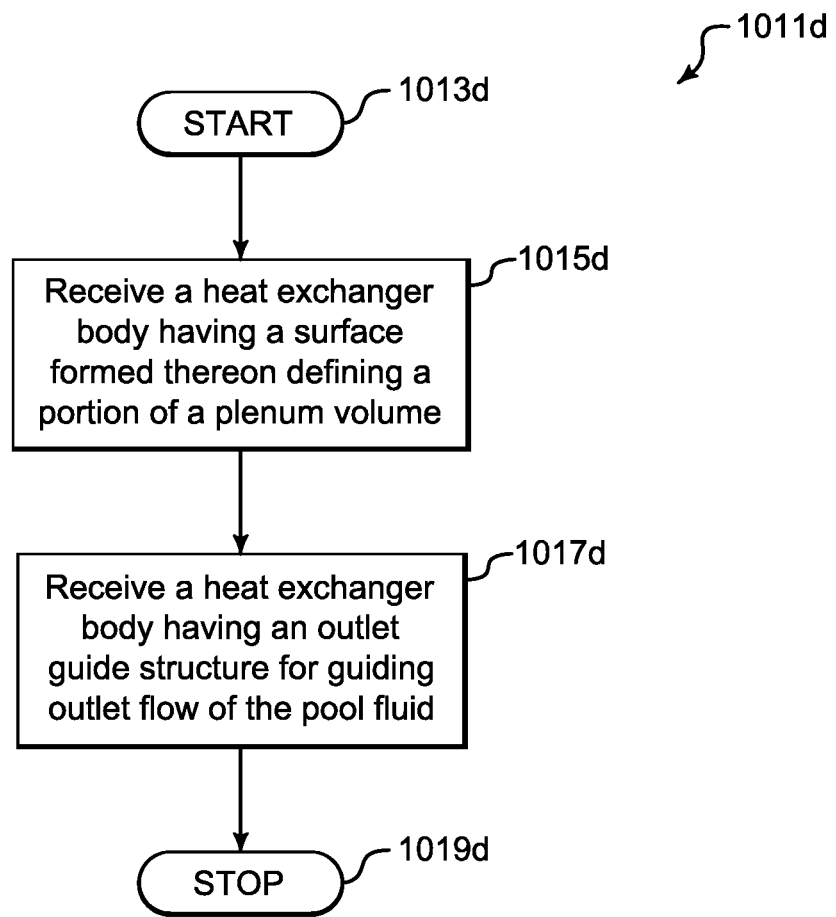

Referring to FIG. 22D, for use in association with a pool-type nuclear fission reactor capable of generating heat, an illustrative method 1011*d*, of assembling a heat exchanger starts at a block 1013*d*. At a block 1015*d*, the method comprises receiving a heat exchanger body having a surface formed thereon defining a portion of a plenum volume. At a block 1017*d*, a heat exchanger body having an outlet guide structure for guiding outlet flow of the pool fluid is received. The method stops at a block 1019*d*.

Figure 22E:
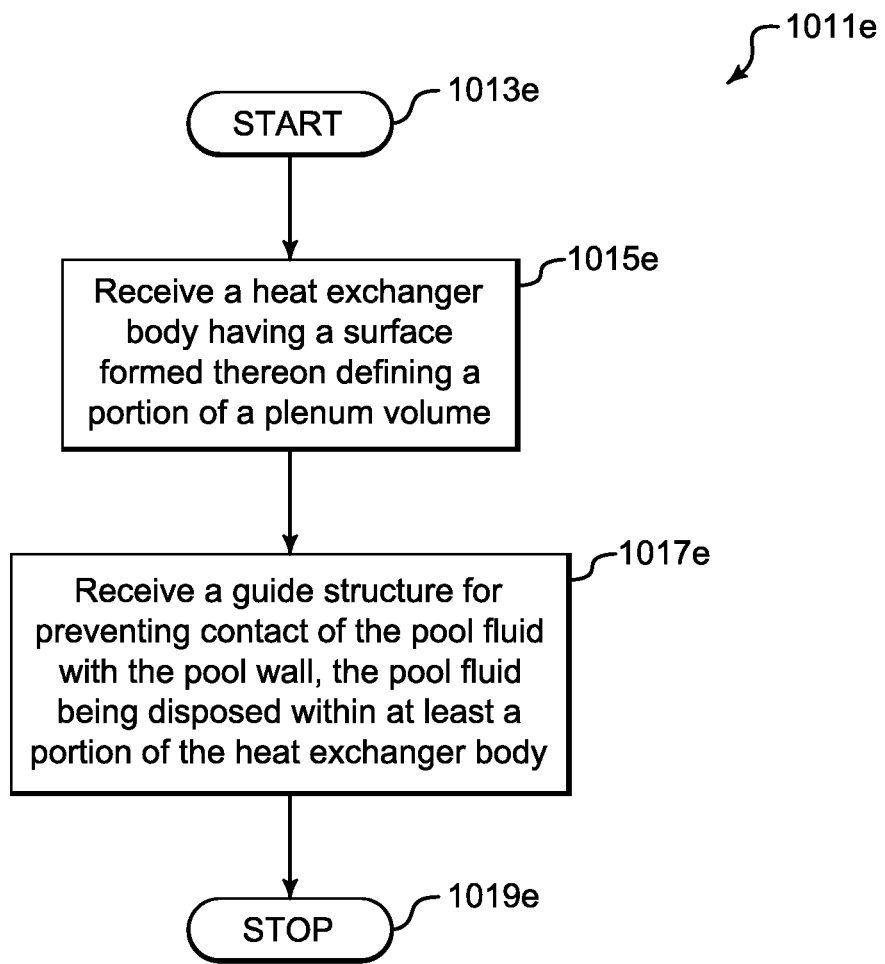

Referring to FIG. 22E, for use in association with a pool-type nuclear fission reactor capable of generating heat, an illustrative method 1011*e*, of assembling a heat exchanger starts at a block 1013*e*. At a block 1015*e*, the method comprises receiving a heat exchanger body having a surface formed thereon defining a portion of a plenum volume. At a block 1017*e*, a guide structure for preventing contact of the pool fluid with the pool wall is received, the pool fluid being disposed within at least a portion of the heat exchanger body. The method stops at a block 1019*e*.

Figure 23:
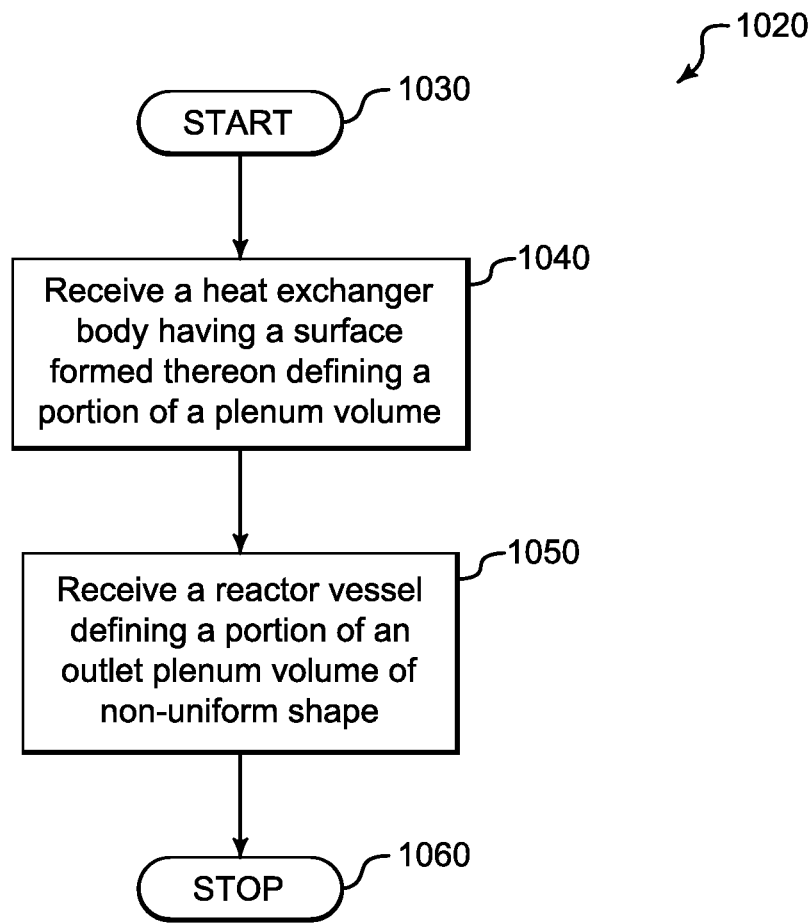

Referring to FIG. 23, for use in association with a pool-type nuclear fission reactor capable of generating heat, an illustrative method 1020 of assembling a heat exchanger starts at a block 1030. At a block 1040, the method comprises receiving a heat exchanger body having a surface formed thereon defining a portion of a plenum volume. At a block 1050, a reactor vessel defining a portion of an outlet plenum volume of non-uniform shape is received. The method stops at a block 1060.

Figure 24:
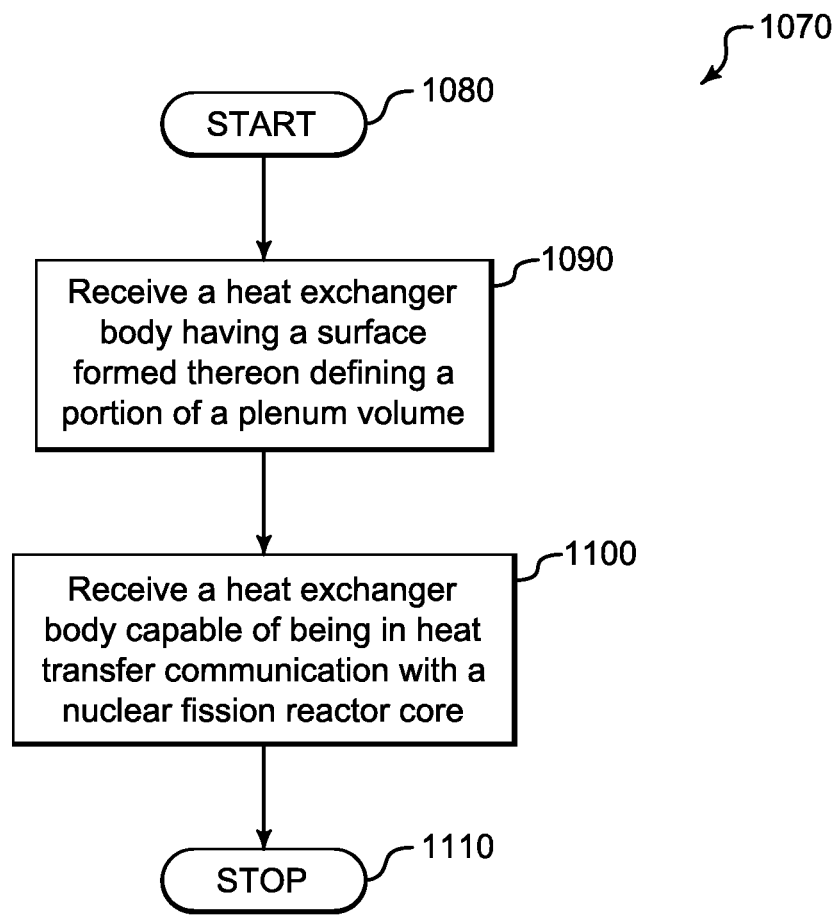

Referring to FIG. 24, for use in association with a pool-type nuclear fission reactor capable of generating heat, an illustrative method 1070 of assembling a heat exchanger starts at block 1080. At a block 1090, the method comprises receiving a heat exchanger body having a surface formed thereon defining a portion of a plenum volume. At a block 1100, a heat exchanger body is received that is capable of being in heat transfer communication with a nuclear fission reactor core. The method stops at a block 1110.

Figure 25:
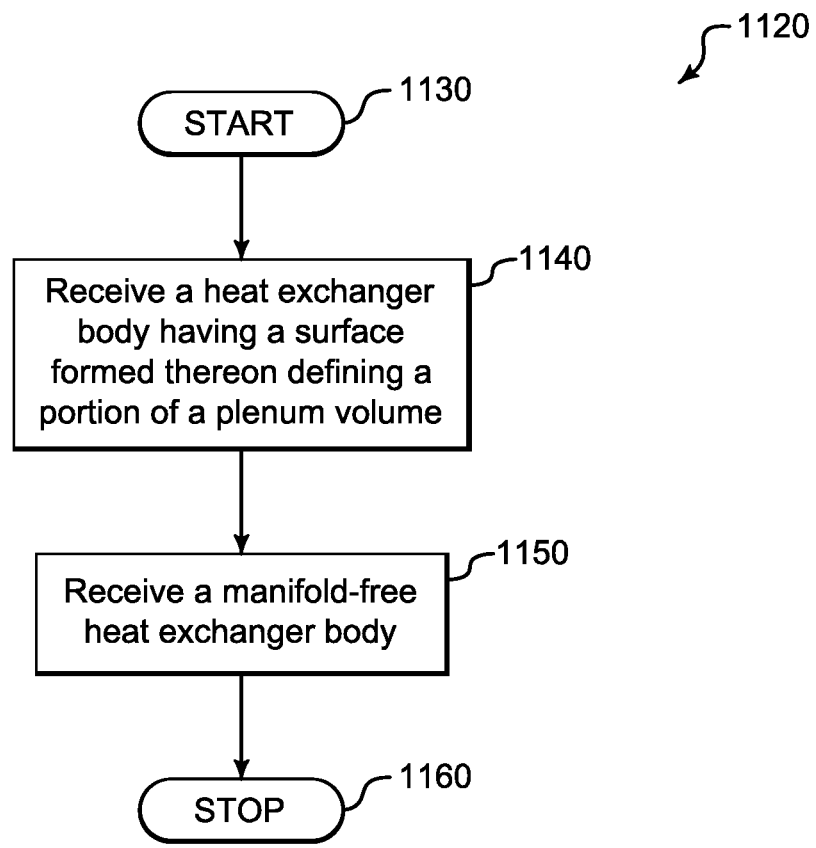

Referring to FIG. 25, for use in association with a pool-type nuclear fission reactor capable of generating heat, an illustrative method 1120 of assembling a heat exchanger starts at a block 1130. At a block 1140, the method comprises receiving a heat exchanger body having a surface formed thereon defining a portion of a plenum volume. At a block 1150, the method comprises receiving a manifold-free heat exchanger body. The method stops at a block 1160.

Figure 26:
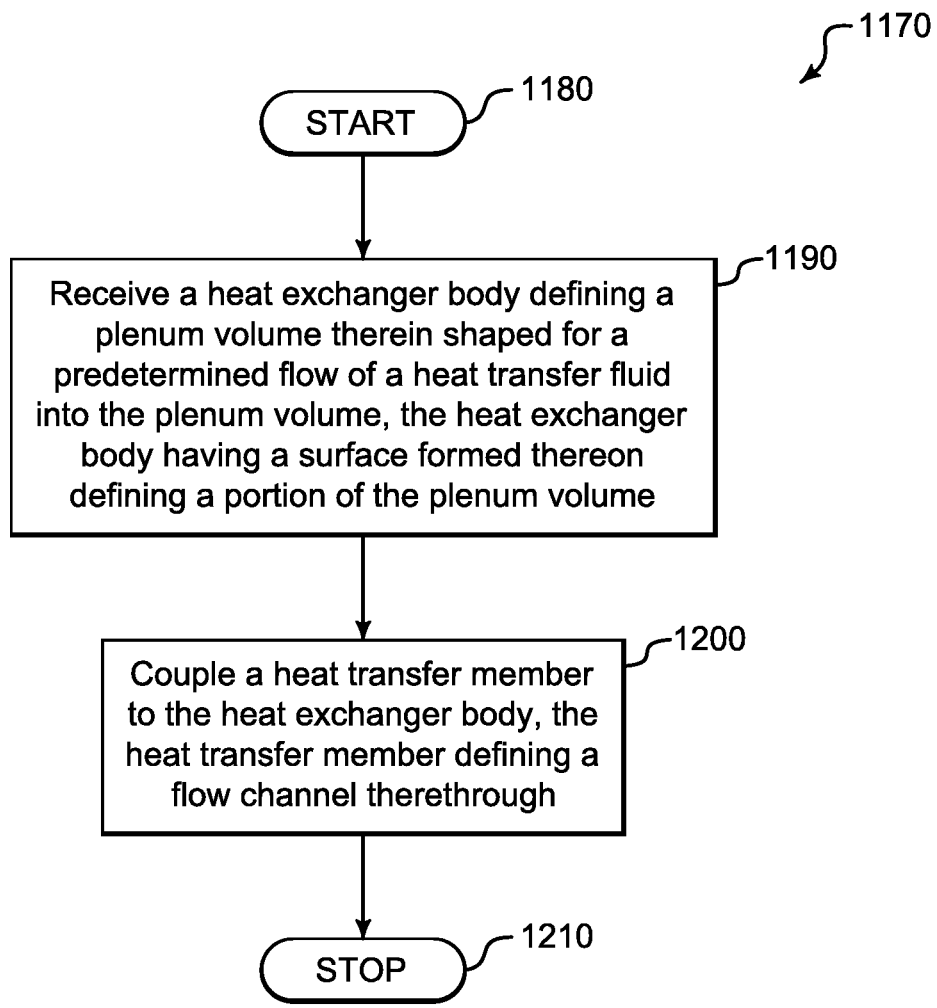

Referring to FIG. 26, for use in association with a pool-type nuclear fission reactor capable of generating heat, an illustrative method 1170 of assembling a heat exchanger starts at a block 1180. At a block 1190, the method comprises receiving a heat exchanger body defining a plenum volume therein shaped for a predetermined flow of a heat transfer fluid into the plenum volume, the heat exchanger body having a surface formed thereon defining a portion of the plenum volume. At a block 1200, a heat transfer member is coupled to the heat exchanger body, the heat transfer member defining a flow channel therethrough. The method stops at a block 1210.

Figure 27:
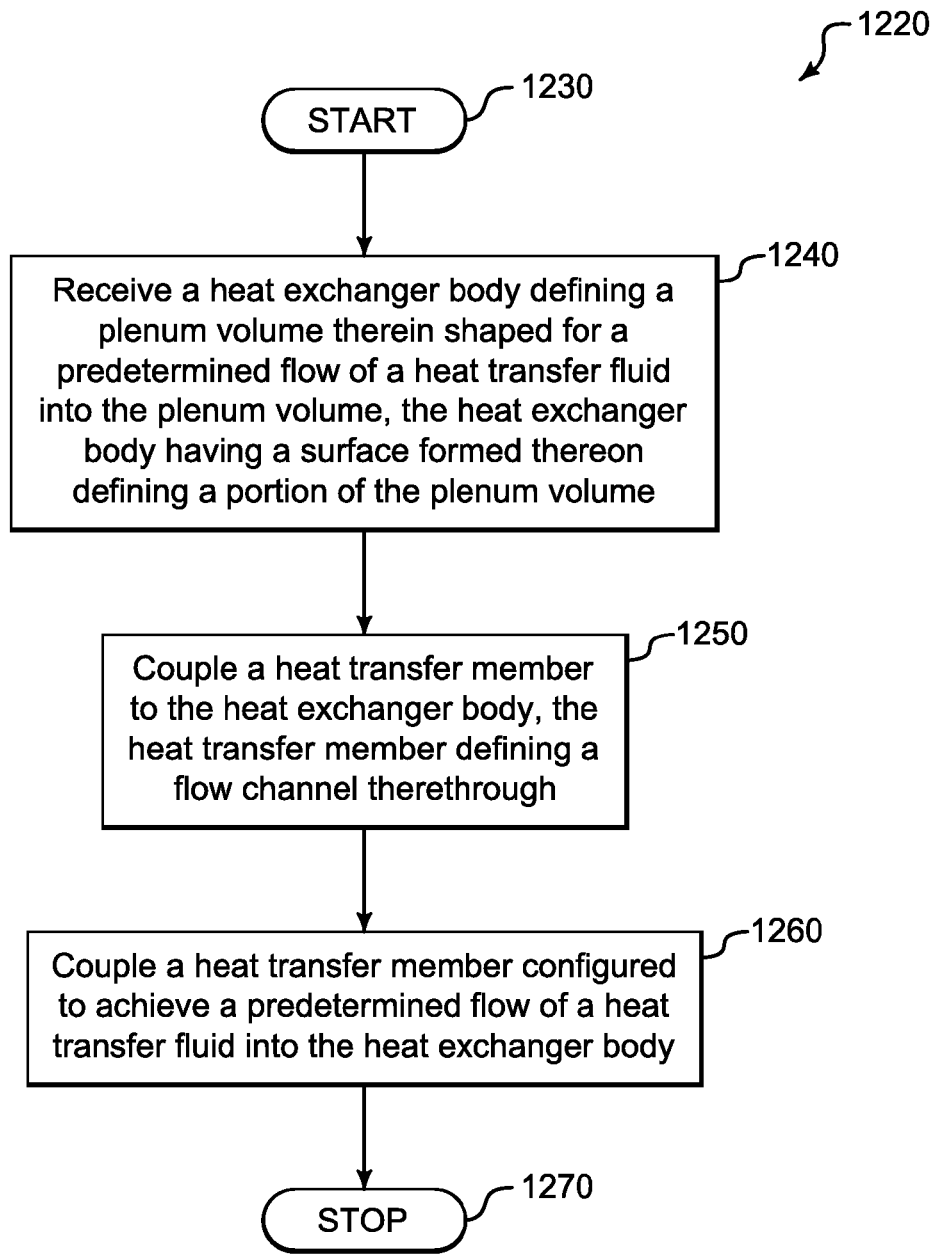

Referring to FIG. 27, for use in association with a pool-type nuclear fission reactor, an illustrative method 1220 of assembling a heat exchanger starts at a block 1230. At a block 1240, the method comprises receiving a heat exchanger body defining a plenum volume therein shaped for a predetermined flow of a heat transfer fluid into the plenum volume, the heat exchanger body having a surface formed thereon defining a portion of the plenum volume. At a block 1250, a heat transfer member is coupled to the heat exchanger body, the heat transfer member defining a flow channel therethrough. At a block 1260, a heat transfer member is coupled that is configured to achieve a predetermined flow of a heat transfer fluid into the heat exchanger body. The method stops at a block 1270.

Figure 28:
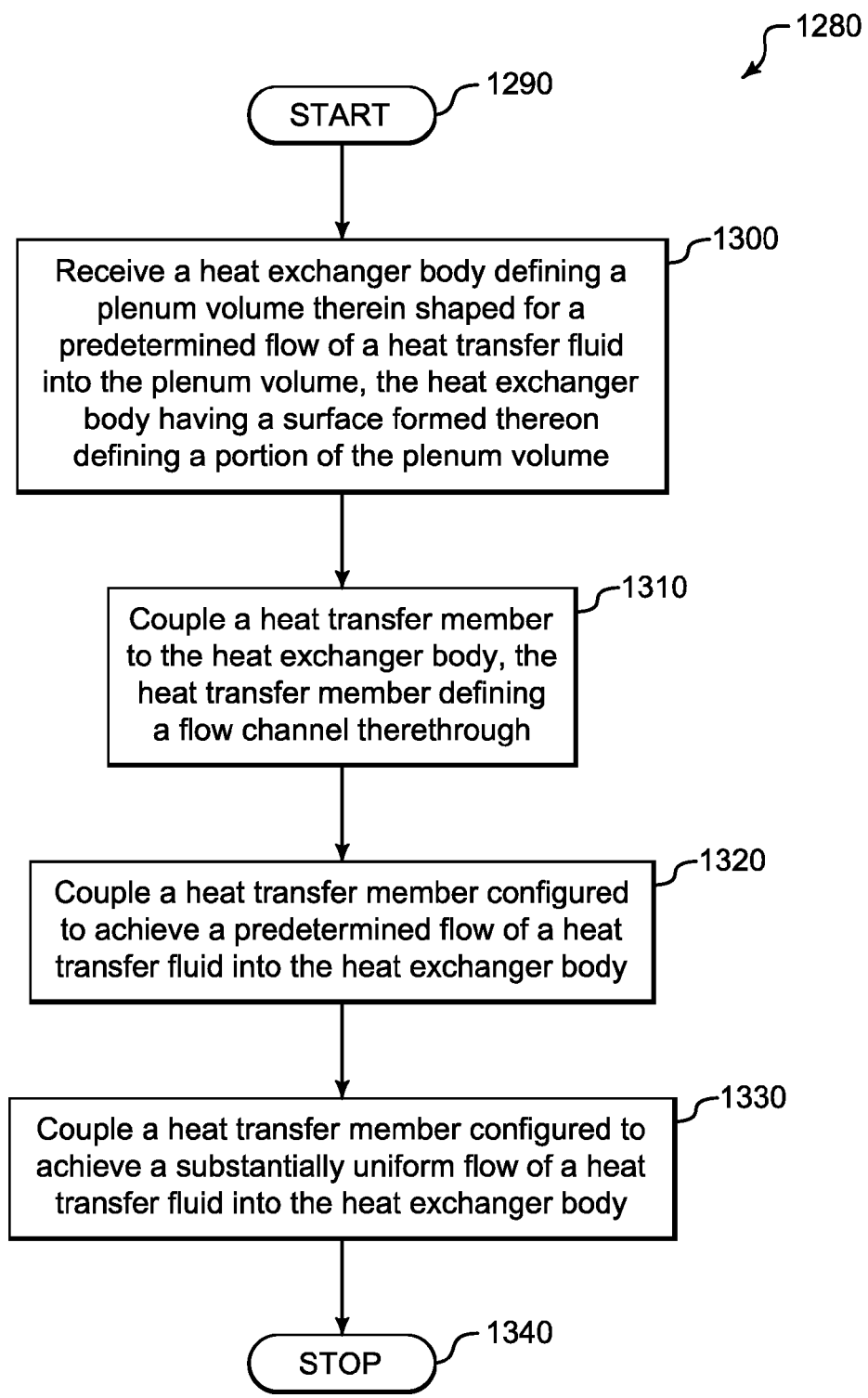

Referring to FIG. 28, for use in association with a pool-type nuclear fission reactor capable of generating heat, an illustrative method 1280 of assembling a heat exchanger starts at a block 1290. At a block 1300, the method comprises receiving a heat exchanger body defining a plenum volume therein shaped for a predetermined flow of a heat transfer fluid into the plenum volume, the heat exchanger body having a surface formed thereon defining a portion of the plenum volume. At a block 1310, a heat transfer member is coupled to the heat exchanger body, the heat transfer member defining a flow channel therethrough. At a block 1320, a heat transfer member is coupled that is configured to achieve a predetermined flow of a heat transfer fluid into the heat exchanger body. At a block 1330, a heat transfer member is coupled that is configured to achieve a substantially uniform flow of a heat transfer fluid into the heat exchanger body. The method stops at a block 1340.

Figure 29:
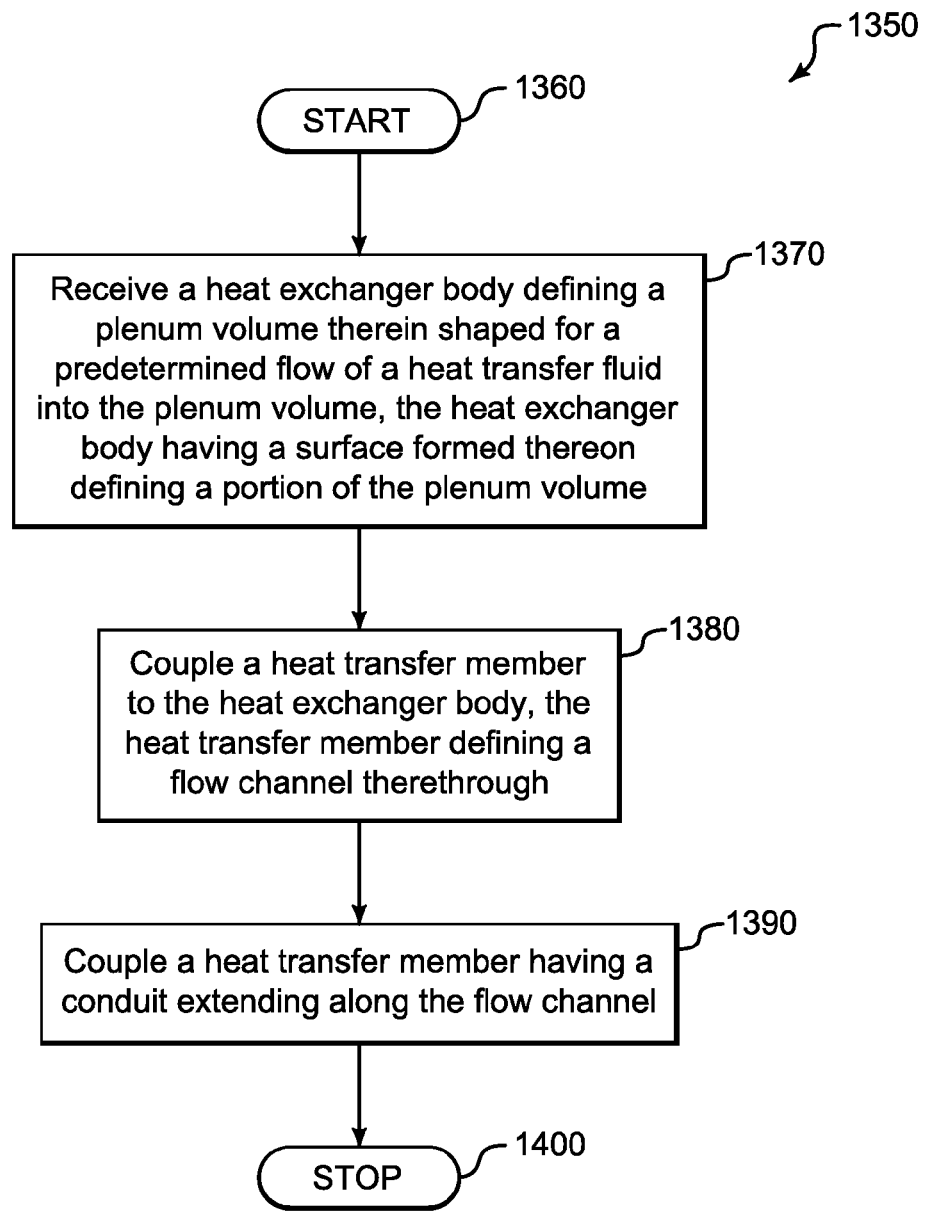

Referring to FIG. 29, for use in association with a pool-type nuclear fission reactor, an illustrative method 1350 of assembling a heat exchanger starts at a block 1360. At a block 1370, the method comprises receiving a heat exchanger body defining a plenum volume therein shaped for a predetermined flow of a heat transfer fluid into the plenum volume, the heat exchanger body having a surface formed thereon defining a portion of the plenum volume. At a block 1380, a heat transfer member is coupled to the heat exchanger body, the heat transfer member defining a flow channel therethrough. At a block 1390, a heat transfer member is coupled having a conduit extending along the flow channel. The method stops at a block 1400.

Figure 30:
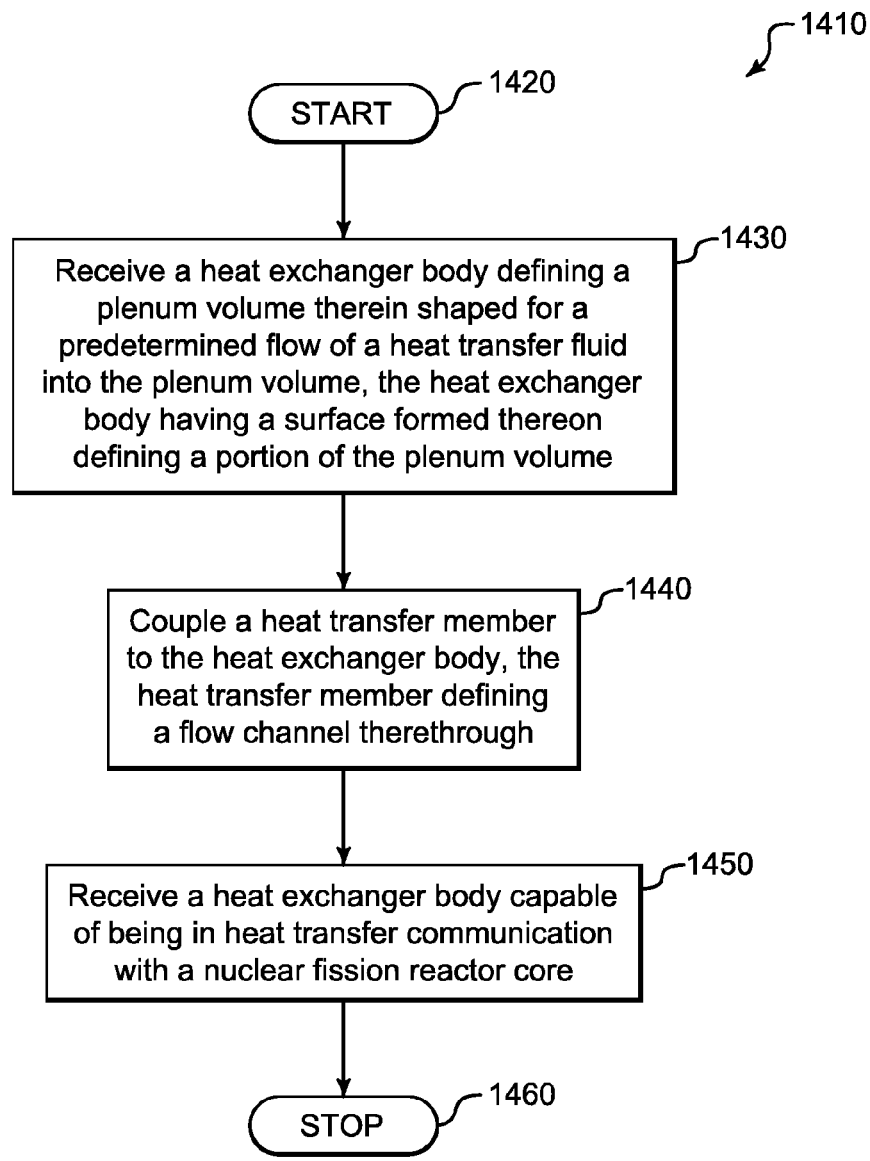

Referring to FIG. 30, for use in association with a pool-type nuclear fission reactor capable of generating heat, an illustrative method 1410 of assembling a heat exchanger starts at a block 1420. At a block 1430, the method comprises receiving a heat exchanger body defining a plenum volume therein shaped for a predetermined flow of a heat transfer fluid into the plenum volume, the heat exchanger body having a surface formed thereon defining a portion of the plenum volume. At a block 1440, a heat transfer member is coupled to the heat exchanger body, the heat transfer member defining a flow channel therethrough. At a block 1450, a heat exchanger body is received that is capable of being in heat transfer communication with a nuclear fission reactor core. The method stops at a block 1460.

Figure 31:
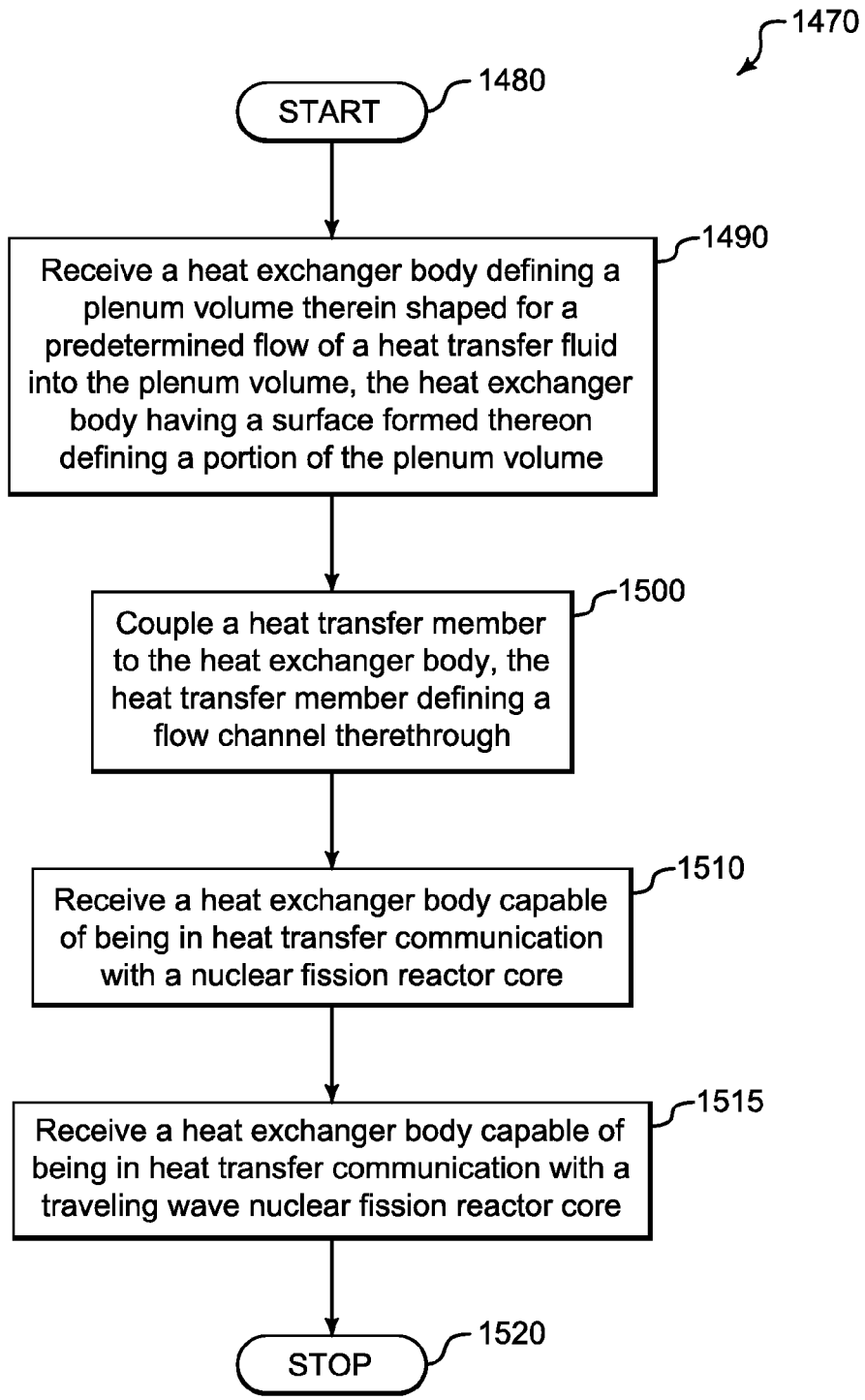

Referring to FIG. 31, for use in association with a pool-type nuclear fission reactor, an illustrative method 1470 of assembling a heat exchanger starts at a block 1480. At a block 1490, the method comprises receiving a heat exchanger body defining a plenum volume therein shaped for a predetermined flow of a heat transfer fluid into the plenum volume, the heat exchanger body having a surface formed thereon defining a portion of the plenum volume. At a block 1500, a heat transfer member is coupled to the heat exchanger body, the heat transfer member defining a flow channel therethrough. At a block 1510, a heat exchanger body is received that is capable of being in heat transfer communication with a traveling wave nuclear fission reactor core. At a block 1515, a heat exchanger body capable of being in heat transfer communication with a traveling wave nuclear fission reactor core is received. The method stops at a block 1520.

Figure 32:
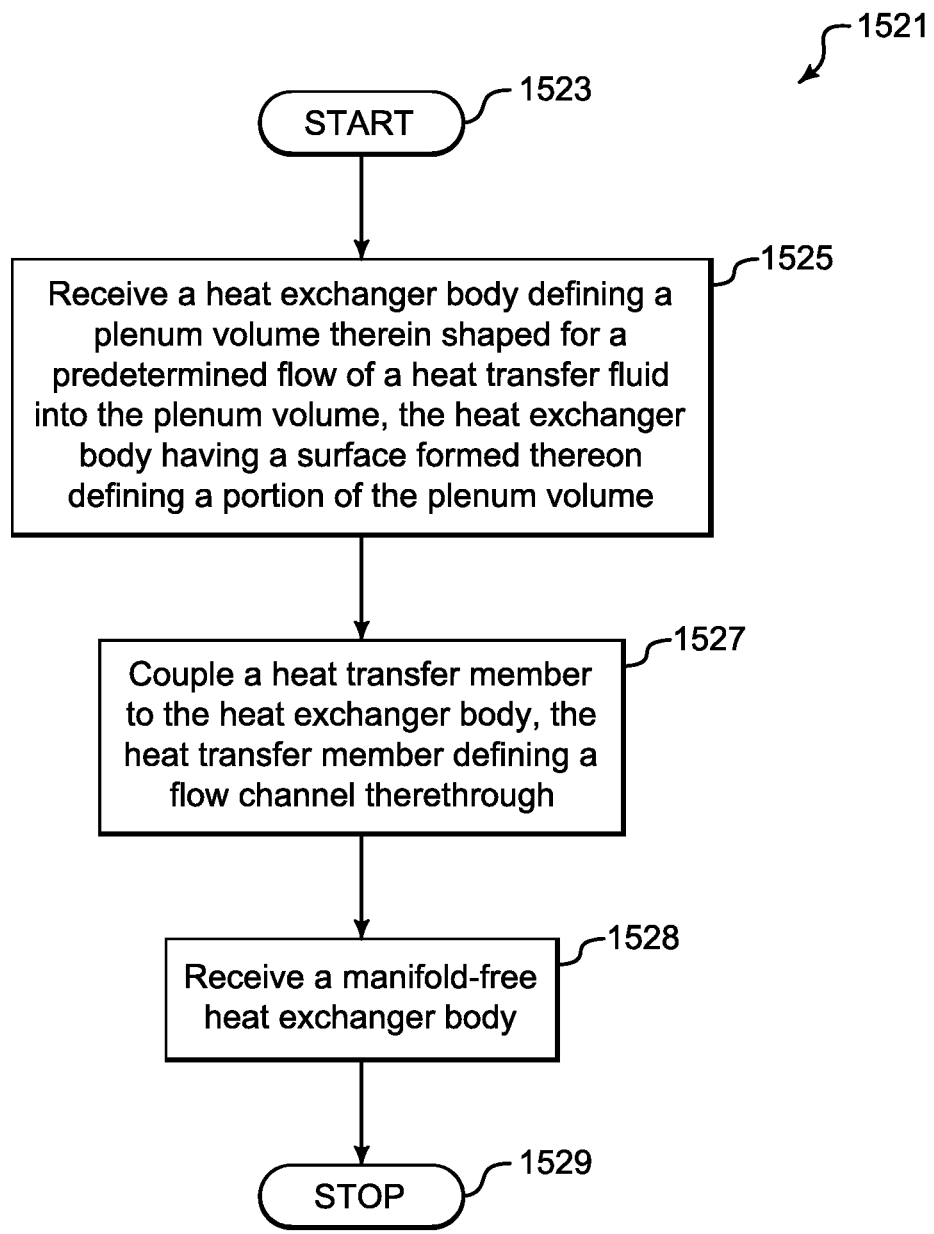

Referring to FIG. 32, for use in association with a pool-type nuclear fission reactor, an illustrative method 1521 of assembling a heat exchanger starts at a block 1523. At a block 1525, the method comprises receiving a heat exchanger body defining a plenum volume therein shaped for a predetermined flow of a heat transfer fluid into the plenum volume, the heat exchanger body having a surface formed thereon defining a portion of the plenum volume. At a block 1527, a heat transfer member is coupled to the heat exchanger body, the heat transfer member defining a flow channel therethrough. At a block 1528, a manifold-free heat exchanger body is received. The method stops at a block 1529.

Figure 33:
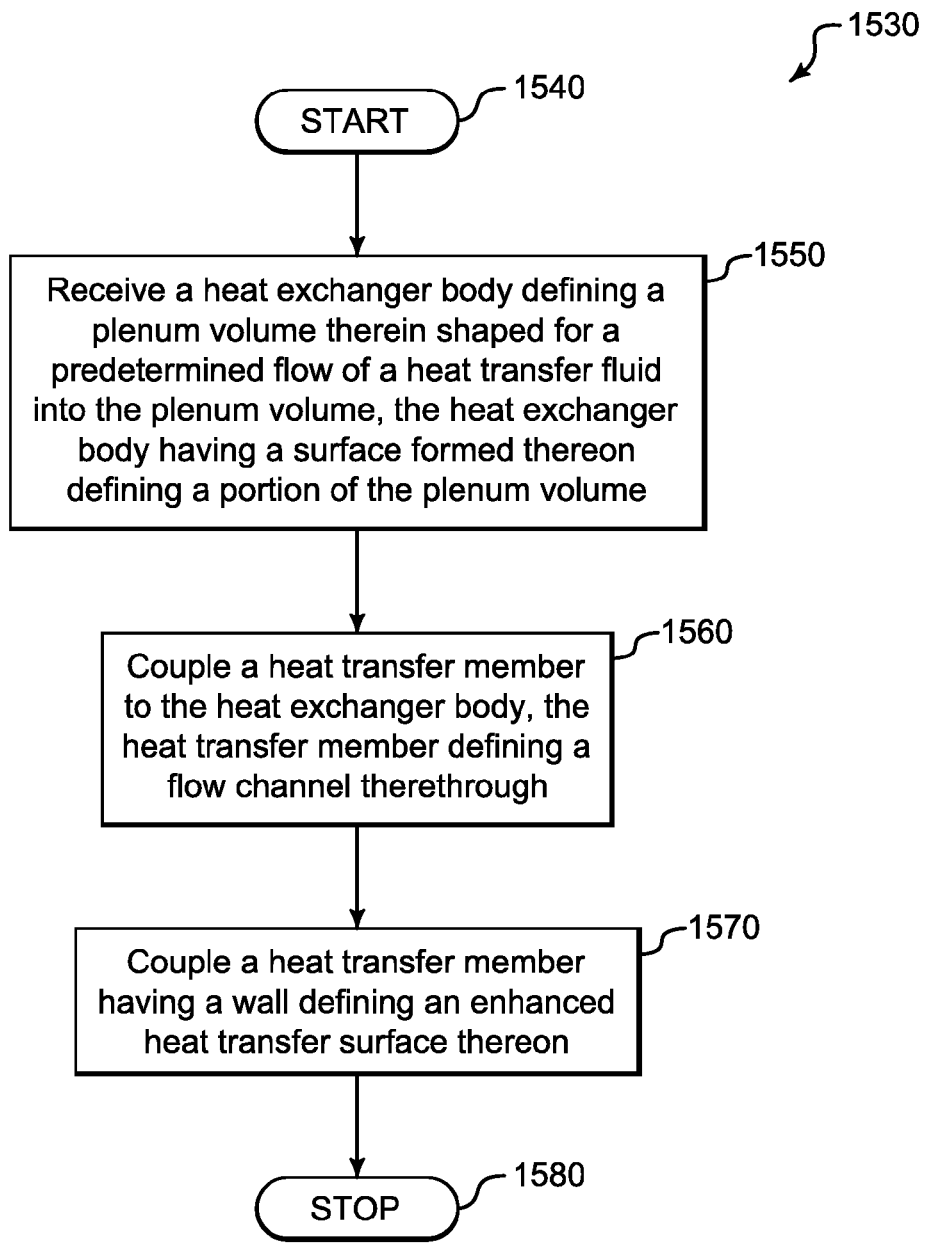

Referring to FIG. 33, for use in association with a pool-type nuclear fission reactor capable of generating heat, an illustrative method 1530 of assembling a heat exchanger starts at a block 1540. At a block 1550, the method comprises receiving a heat exchanger body defining a plenum volume therein shaped for a predetermined flow of a heat transfer fluid into the plenum volume, the heat exchanger body having a surface formed thereon defining a portion of the plenum volume. At a block 1560, a heat transfer member is coupled to the heat exchanger body, the heat transfer member defining a flow channel therethrough. At a block 1570, a heat transfer member is coupled having a wall defining an enhanced heat transfer surface thereon. The method stops at a block 1580.

Figure 34:
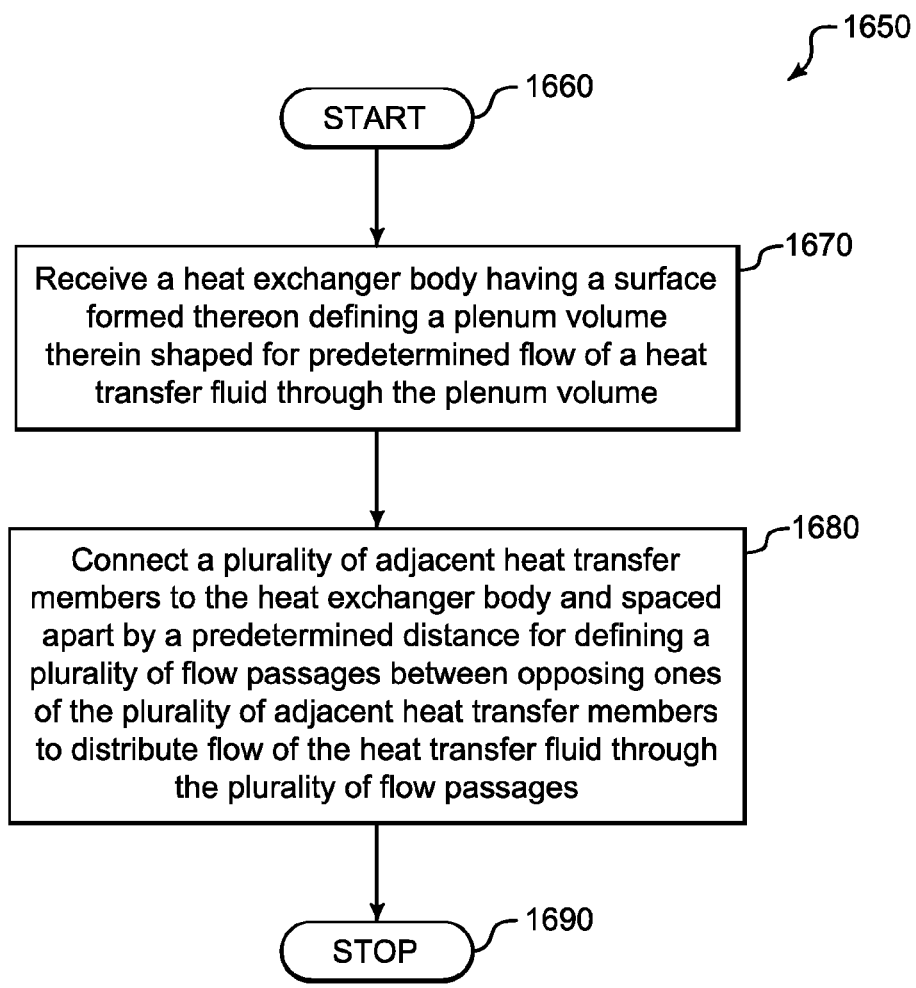

Referring to FIG. 34, for use in association with a pool-type nuclear fission reactor capable of generating heat, an illustrative method 1650 of assembling a heat exchanger starts at a block 1660. At a block 1670, the method comprises receiving a heat exchanger body defining a plenum volume therein shaped for a predetermined flow of a heat transfer fluid into the plenum volume, the heat exchanger body having a surface formed thereon defining a portion of the plenum volume. At a block 1680, a plurality of adjacent heat transfer members are connected to the heat exchanger body and spaced apart by a predetermined distance for defining a plurality of flow passages between opposing ones of the plurality of adjacent heat transfer members to distribute flow of the heat transfer fluid through the plurality of flow passages. The method stops at a block 1690.

Figure 35:
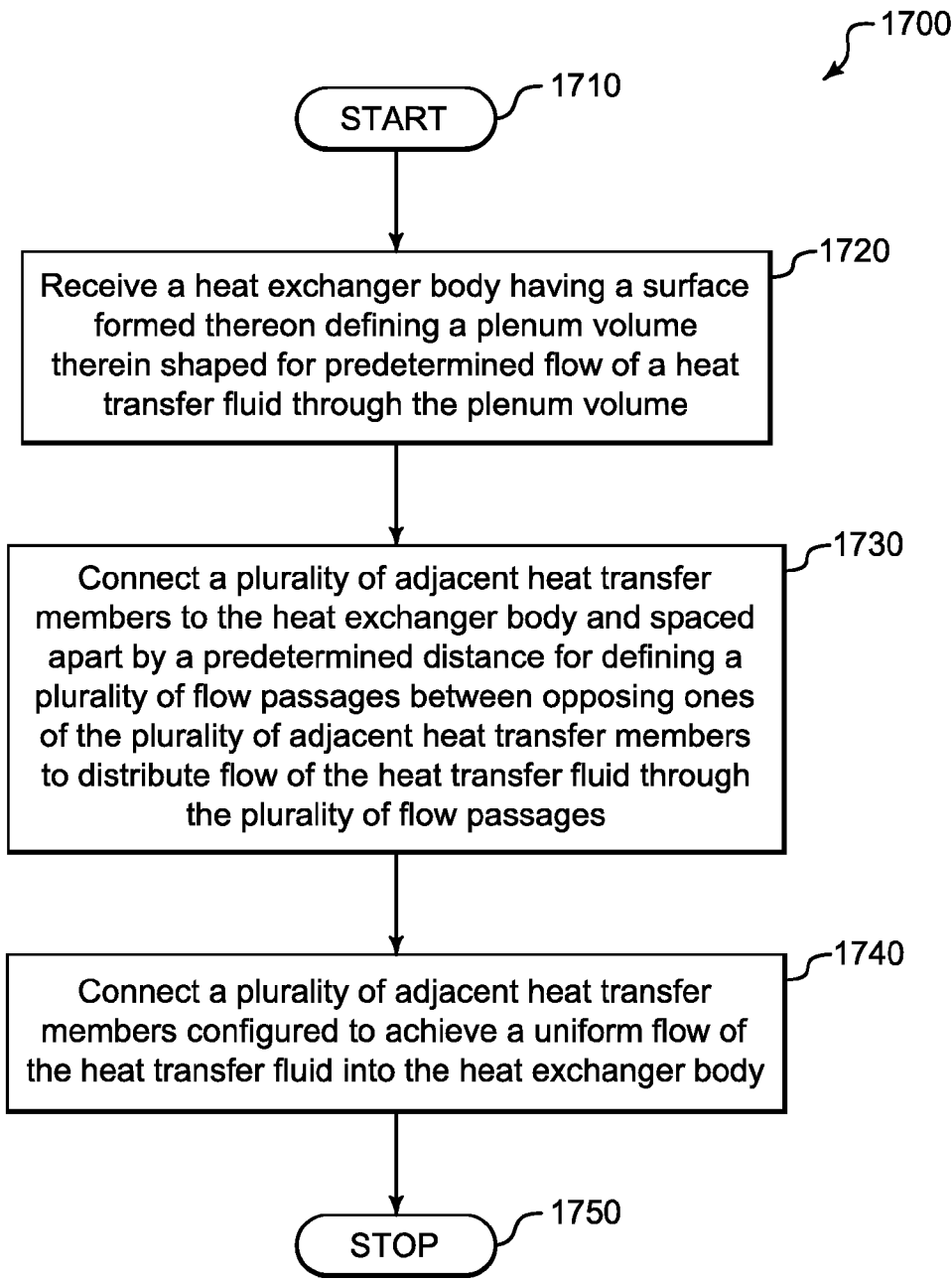

Referring to FIG. 35, for use in association with a pool-type nuclear fission reactor capable of generating heat, an illustrative method 1700 of assembling a heat exchanger starts at a block 1710. At a block 1720, the method comprises receiving a heat exchanger body defining a plenum volume therein shaped for a predetermined flow of a heat transfer fluid into the plenum volume, the heat exchanger body having a surface formed thereon defining a portion of the plenum volume. At a block 1730, a plurality of adjacent heat transfer members are connected to the heat exchanger body and spaced apart by a predetermined distance for defining a plurality of flow passages between opposing ones of the plurality of adjacent heat transfer members to distribute flow of the heat transfer fluid through the plurality of flow passages. At a block 1740, a plurality of adjacent heat transfer members configured to achieve a uniform flow of the heat transfer fluid into the heat exchanger body are connected. The method stops at a block 1750.

Figure 36:
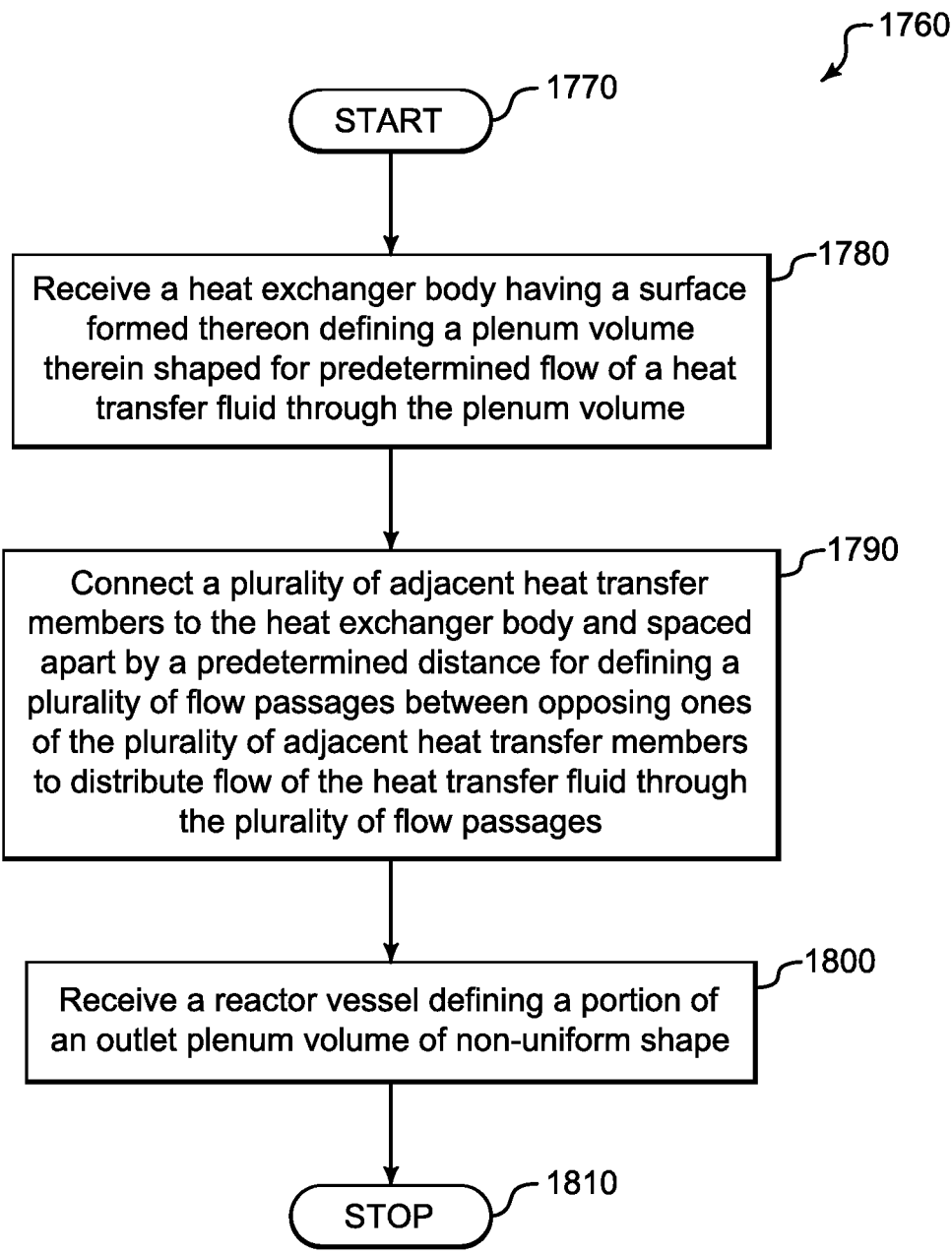

Referring to FIG. 36, for use in association with a pool-type nuclear fission reactor capable of generating heat, an illustrative method 1760 of assembling a heat exchanger starts at a block 1770. At a block 1780, the method comprises receiving a heat exchanger body defining a plenum volume therein shaped for a predetermined flow of a heat transfer fluid into the plenum volume, the heat exchanger body having a surface formed thereon defining a portion of the plenum volume. At a block 1790, a plurality of adjacent heat transfer members are connected to the heat exchanger body and spaced apart by a predetermined distance for defining a plurality of flow passages between opposing ones of the plurality of adjacent heat transfer members to distribute flow of the heat transfer fluid through the plurality of flow passages. At a block 1800, a reactor vessel is received defining a portion of an outlet plenum volume of non-uniform shape. The method stops at a block 1810.

Figure 37:
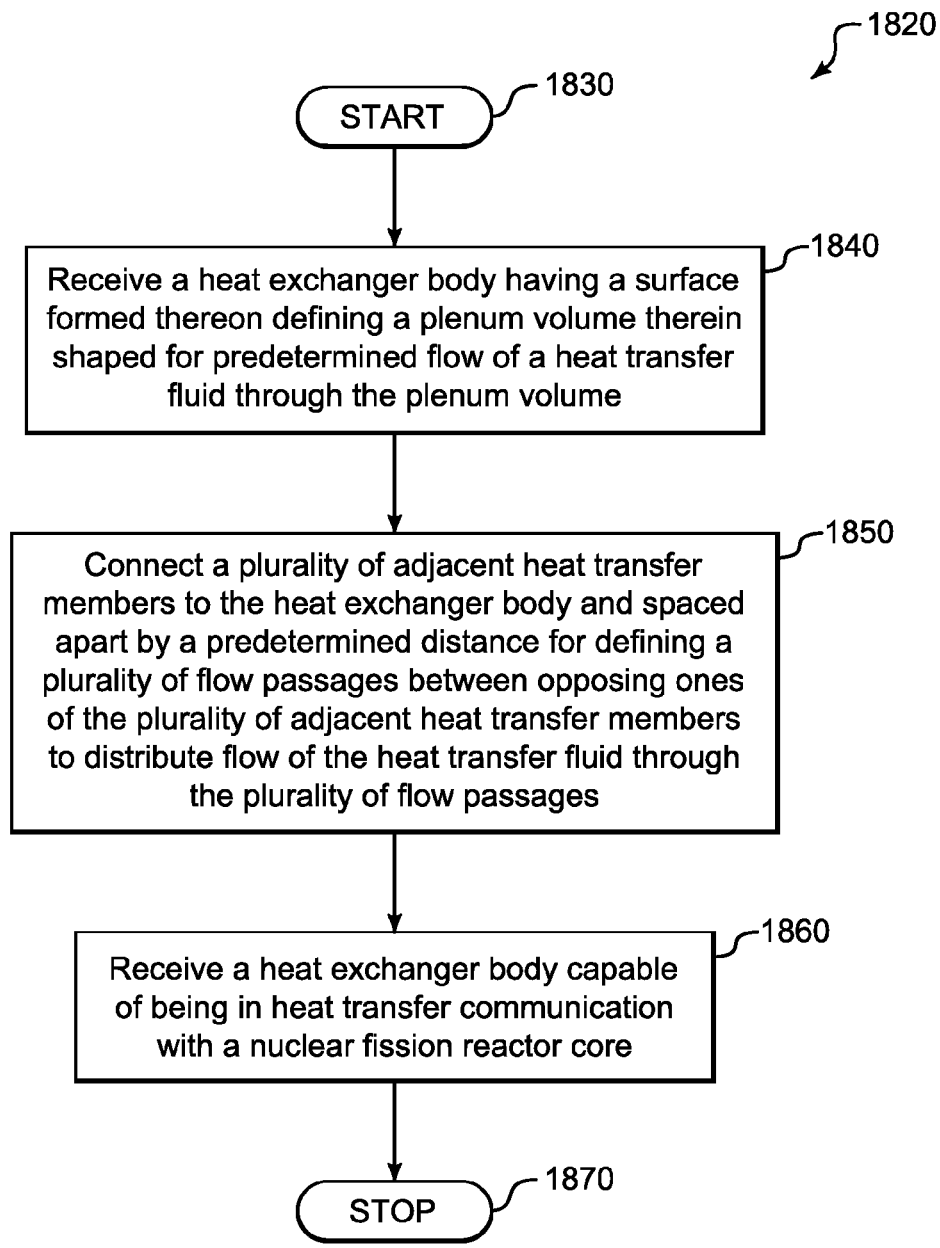

Referring to FIG. 37, for use in association with a pool-type nuclear fission reactor capable of generating heat, an illustrative method 1820 of assembling a heat exchanger starts at a block 1830. At a block 1840, the method comprises receiving a heat exchanger body defining a plenum volume therein shaped for a predetermined flow of a heat transfer fluid into the plenum volume, the heat exchanger body having a surface formed thereon defining a portion of the plenum volume. At a block 1850, a plurality of adjacent heat transfer members are connected to the heat exchanger body and spaced apart by a predetermined distance for defining a plurality of flow passages between opposing ones of the plurality of adjacent heat transfer members to distribute flow of the heat transfer fluid through the plurality of flow passages. At a block 1860, a heat exchanger body is received that is capable of being in heat transfer communication with a nuclear fission reactor core. The method stops at a block 1870.

Figure 38:
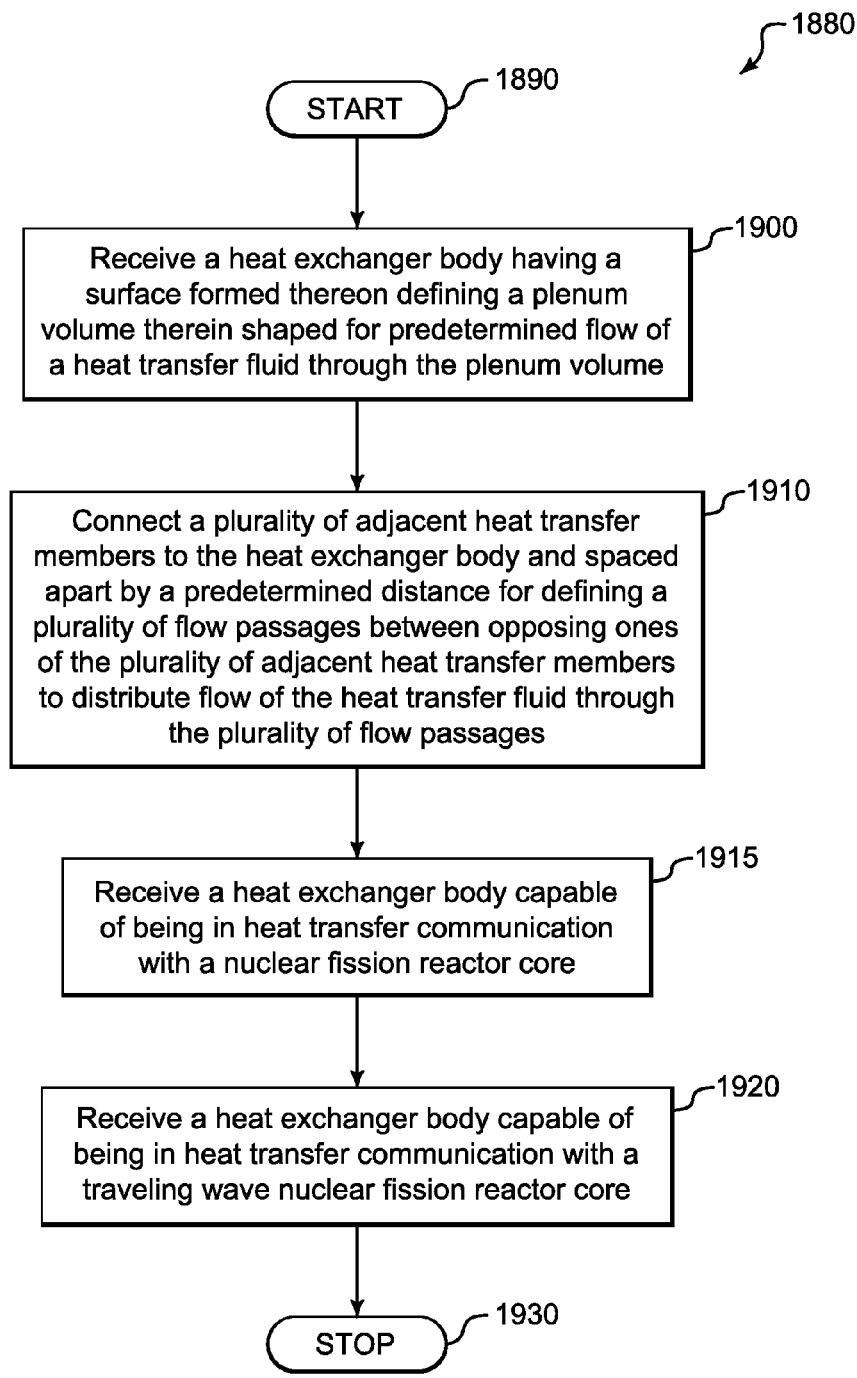

Referring to FIG. 38, for use in association with a pool-type nuclear fission reactor capable of generating heat, an illustrative method 1880 of assembling a heat exchanger starts at a block 1890. At a block 1900, the method comprises receiving a heat exchanger body defining a plenum volume therein shaped for a predetermined flow of a heat transfer fluid into the plenum volume, the heat exchanger body having a surface formed thereon defining a portion of the plenum volume. At a block 1910, a plurality of adjacent heat transfer members are connected to the heat exchanger body and spaced apart by a predetermined distance for defining a plurality of flow passages between opposing ones of the plurality of adjacent heat transfer members to distribute flow of the heat transfer fluid through the plurality of flow passages. At a block 1915, a heat exchanger body capable of being in heat transfer communication with a nuclear fission reactor core is received. At a block 1920, a heat exchanger body is received that is capable of being in heat transfer communication with a traveling wave nuclear fission reactor core. The method stops at a block 1930.

Figure 39:
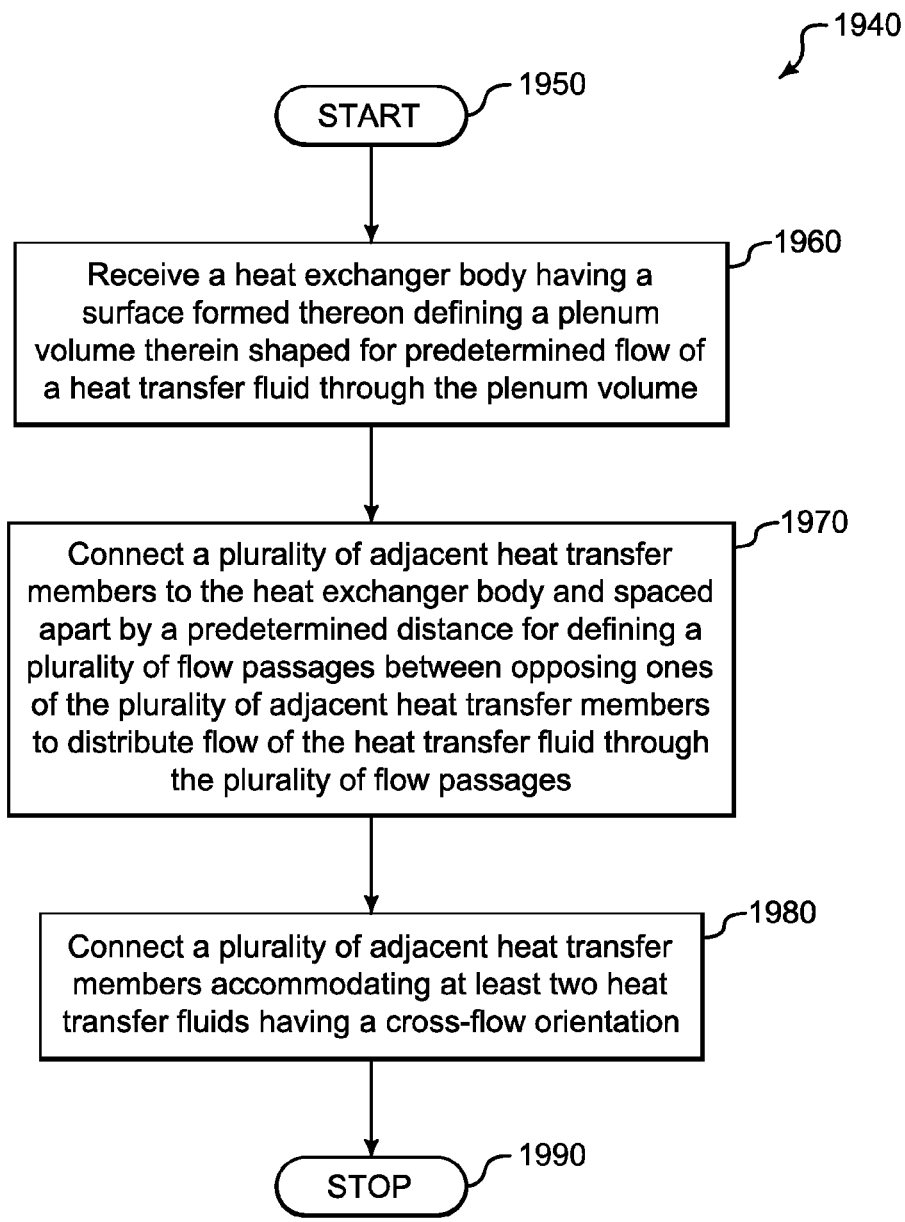

Referring to FIG. 39, for use in association with a pool-type nuclear fission reactor capable of generating heat, an illustrative method 1940 of assembling a heat exchanger starts at a block 1950. At a block 1960, the method comprises receiving a heat exchanger body defining a plenum volume therein shaped for a predetermined flow of a heat transfer fluid into the plenum volume, the heat exchanger body having a surface formed thereon defining a portion of the plenum volume. At a block 1970, a plurality of adjacent heat transfer members are connected to the heat exchanger body and spaced apart by a predetermined distance for defining a plurality of flow passages between opposing ones of the plurality of adjacent heat transfer members to distribute flow of the heat transfer fluid through the plurality of flow passages. At a block 1980, at least two heat transfer fluids having a cross-flow orientation are accommodated. The method stops at a block 1990.

Figure 40:
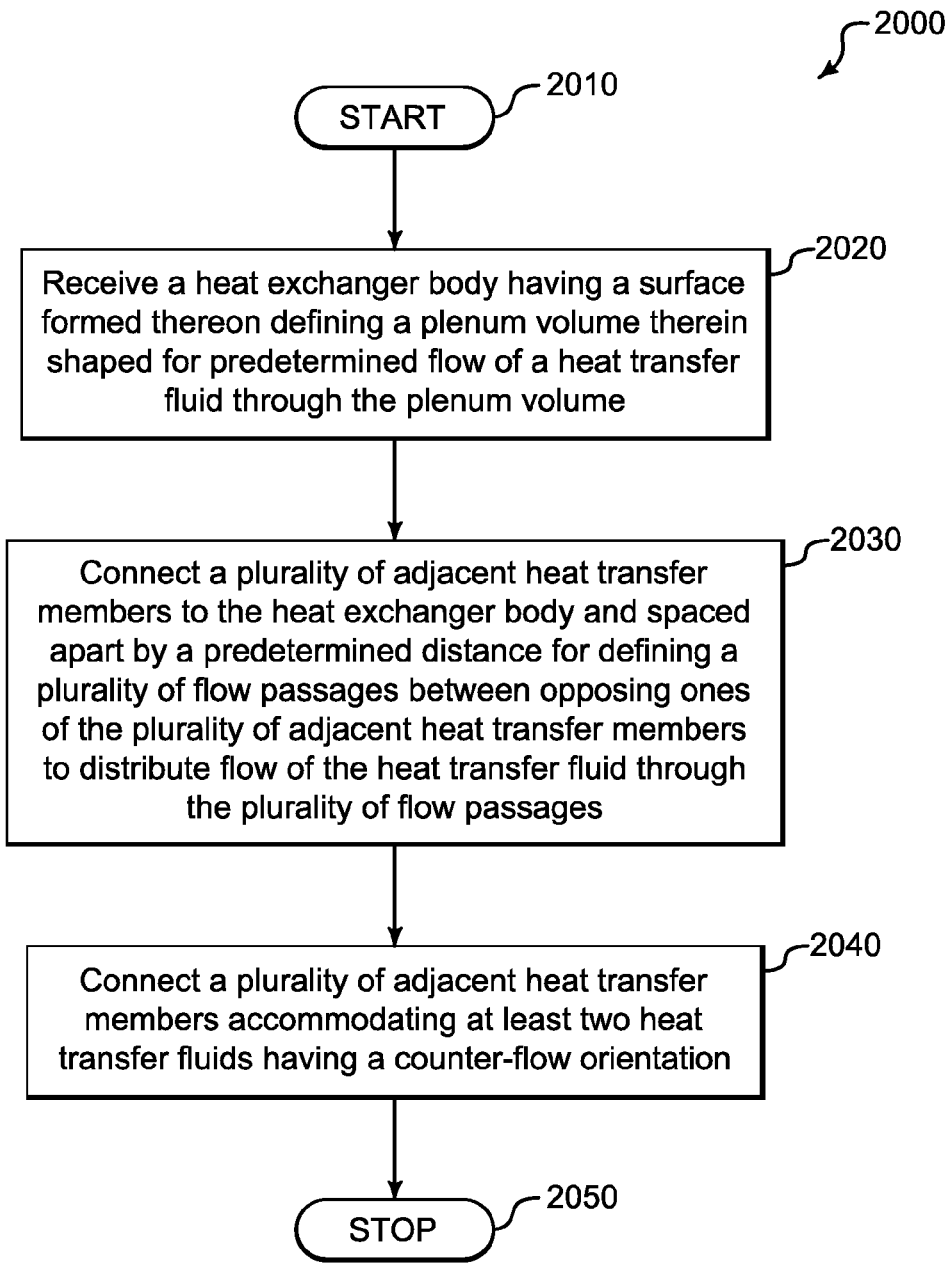

Referring to FIG. 40, for use in association with a pool-type nuclear fission reactor capable of generating heat, an illustrative method 2000 of assembling a heat exchanger starts at a block 2010. At a block 2020, the method comprises receiving a heat exchanger body defining a plenum volume therein shaped for a predetermined flow of a heat transfer fluid into the plenum volume, the heat exchanger body having a surface formed thereon defining a portion of the plenum volume. At a block 2030, a plurality of adjacent heat transfer members are connected to the heat exchanger body and spaced apart by a predetermined distance for defining a plurality of flow passages between opposing ones of the plurality of adjacent heat transfer members to distribute flow of the heat transfer fluid through the plurality of flow passages. At a block 2040, at least two heat transfer fluids having a counter-flow orientation are accommodated. The method stops at a block 2050.

Figure 41:
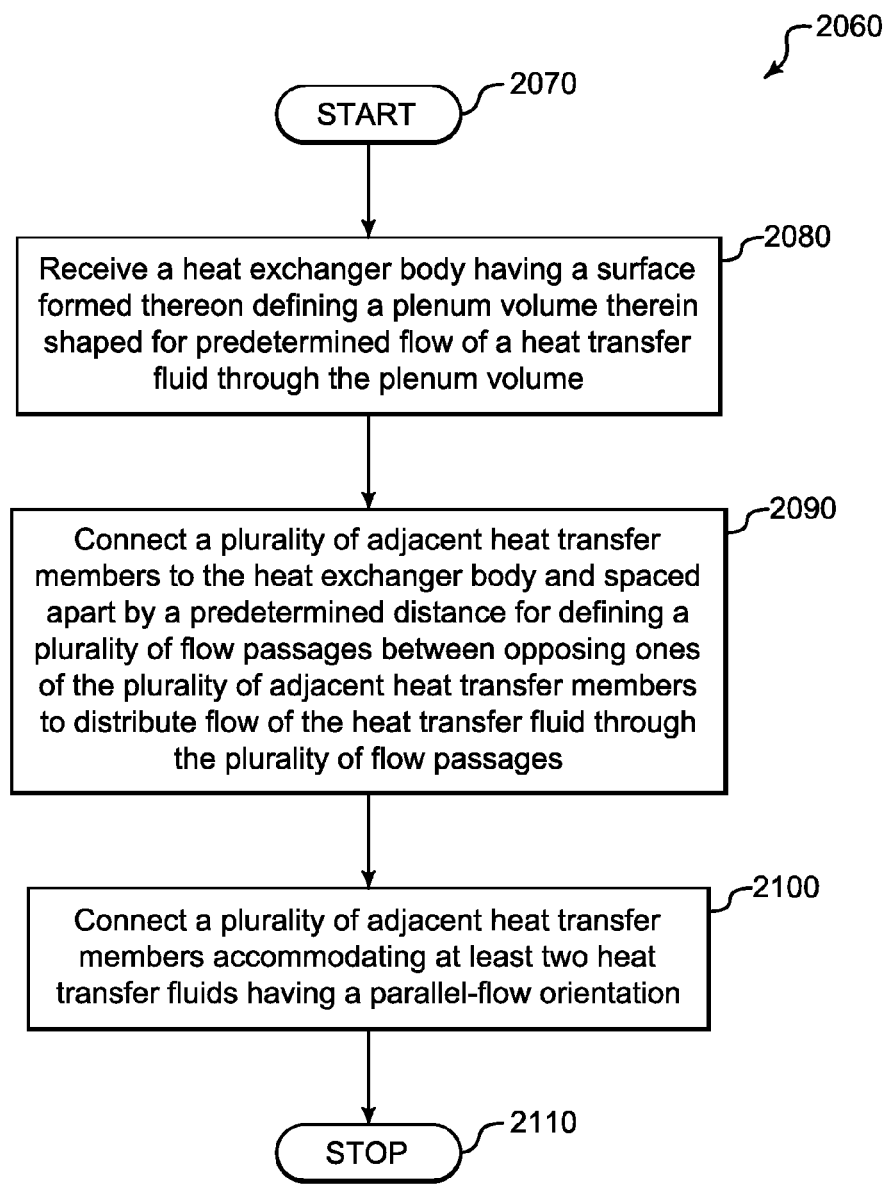

Referring to FIG. 41, for use in association with a pool-type nuclear fission reactor capable of generating heat, an illustrative method 2060 of assembling a heat exchanger starts at a block 2070. At a block 2080, the method comprises receiving a heat exchanger body defining a plenum volume therein shaped for a predetermined flow of a heat transfer fluid into the plenum volume, the heat exchanger body having a surface formed thereon defining a portion of the plenum volume. At a block 2090, a plurality of adjacent heat transfer members are connected to the heat exchanger body and spaced apart by a predetermined distance for defining a plurality of flow passages between opposing ones of the plurality of adjacent heat transfer members to distribute flow of the heat transfer fluid through the plurality of flow passages. At a block 2100, at least two heat transfer fluids having a parallel-flow orientation are accommodated. The method stops at a block 2110.

Figure 42:
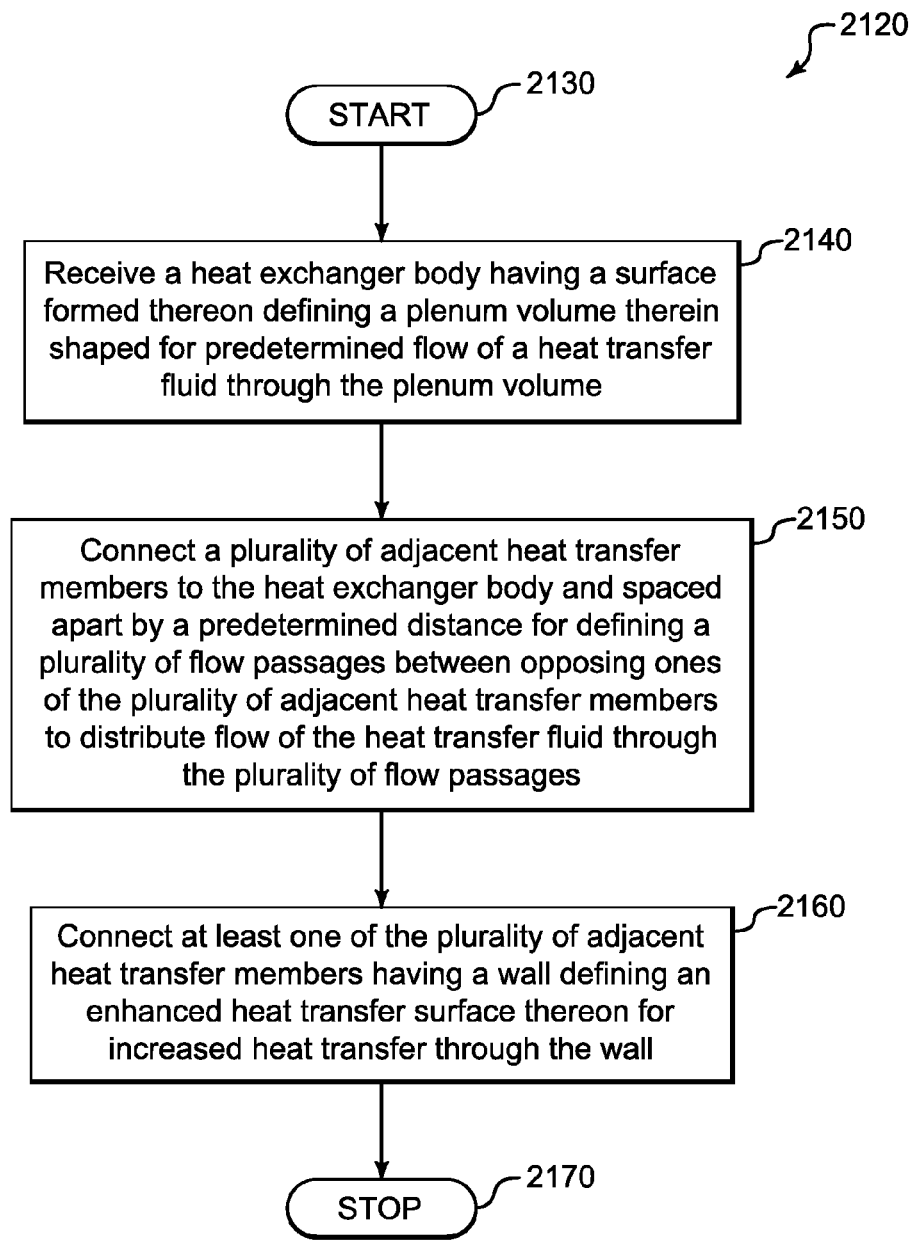

Referring to FIG. 42, for use in association with a pool-type nuclear fission reactor capable of generating heat, an illustrative method 2120 of assembling a heat exchanger starts at a block 2130. At a block 2140, the method comprises receiving a heat exchanger body defining a plenum volume therein shaped for a predetermined flow of a heat transfer fluid into the plenum volume, the heat exchanger body having a surface formed thereon defining a portion of the plenum volume. At a block 2150, a plurality of adjacent heat transfer members are connected to the heat exchanger body and spaced apart by a predetermined distance for defining a plurality of flow passages between opposing ones of the plurality of adjacent heat transfer members to distribute flow of the heat transfer fluid through the plurality of flow passages. At a block 2160, at least one of the plurality of adjacent heat transfer members is coupled having a wall defining an enhanced heat transfer surface thereon for increased heat transfer through the wall. The method stops at a block 2170.

Figure 43:
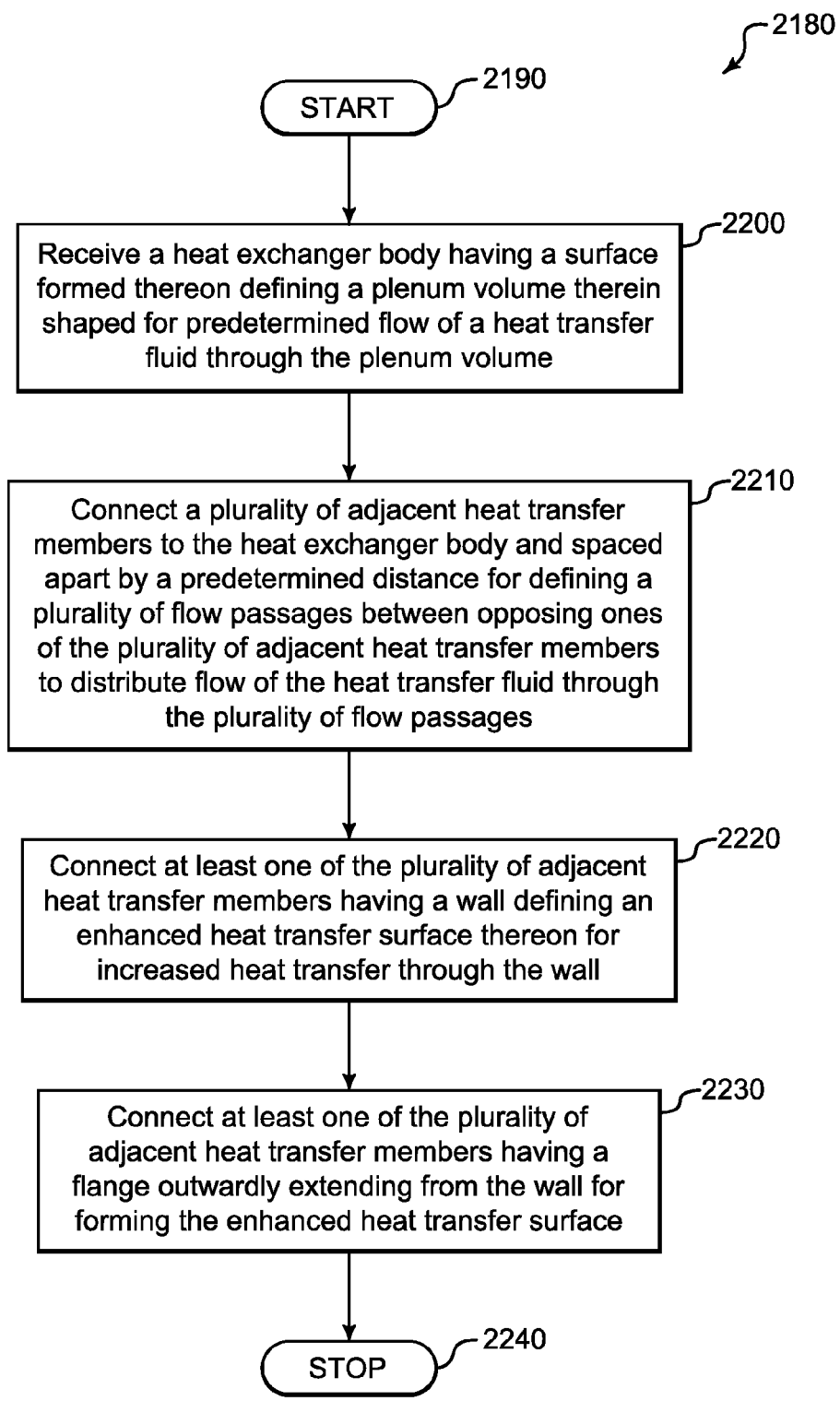

Referring to FIG. 43, for use in association with a pool-type nuclear fission reactor capable of generating heat, an illustrative method 2180 of assembling a heat exchanger starts at a block 2190. At a block 2200, the method comprises receiving a heat exchanger body defining a plenum volume therein shaped for a predetermined flow of a heat transfer fluid into the plenum volume, the heat exchanger body having a surface formed thereon defining a portion of the plenum volume. At a block 2210, a plurality of adjacent heat transfer members are connected to the heat exchanger body and spaced apart by a predetermined distance for defining a plurality of flow passages between opposing ones of the plurality of adjacent heat transfer members to distribute flow of the heat transfer fluid through the plurality of flow passages. At a block 2220, at least one of the plurality of adjacent heat transfer members is coupled having a wall defining an enhanced heat transfer surface thereon for increased heat transfer through the wall. At a block 2230, at least one of the plurality of adjacent heat transfer members is coupled having a flange outwardly extending from the wall for forming the enhanced heat transfer surface. The method stops at a block 2240.

Figure 44:
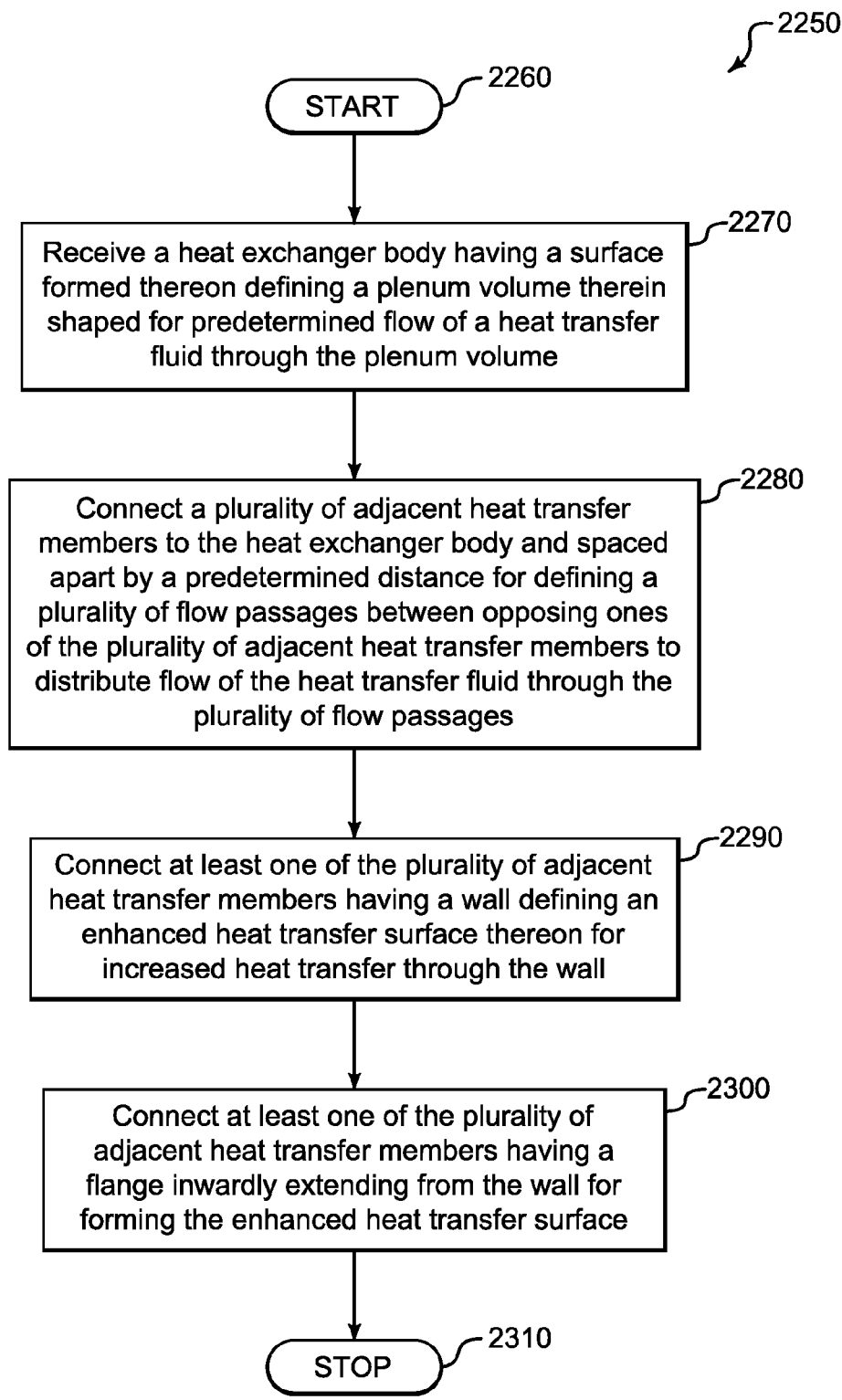

Referring to FIG. 44, for use in association with a pool-type nuclear fission reactor capable of generating heat, an illustrative method 2250 of assembling a heat exchanger starts at a block 2260. At a block 2270, the method comprises receiving a heat exchanger body defining a plenum volume therein shaped for a predetermined flow of a heat transfer fluid into the plenum volume, the heat exchanger body having a surface formed thereon defining a portion of the plenum volume. At a block 2280, a plurality of adjacent heat transfer members are connected to the heat exchanger body and spaced apart by a predetermined distance for defining a plurality of flow passages between opposing ones of the plurality of adjacent heat transfer members to distribute flow of the heat transfer fluid through the plurality of flow passages. At a block 2290, at least one of the plurality of adjacent heat transfer members is coupled having a wall defining an enhanced heat transfer surface thereon for increased heat transfer through the wall. At a block 2300, at least one of the plurality of adjacent heat transfer members is coupled having a flange inwardly extending from the wall for forming the enhanced heat transfer surface. The method stops at a block 2310.

Figure 45:
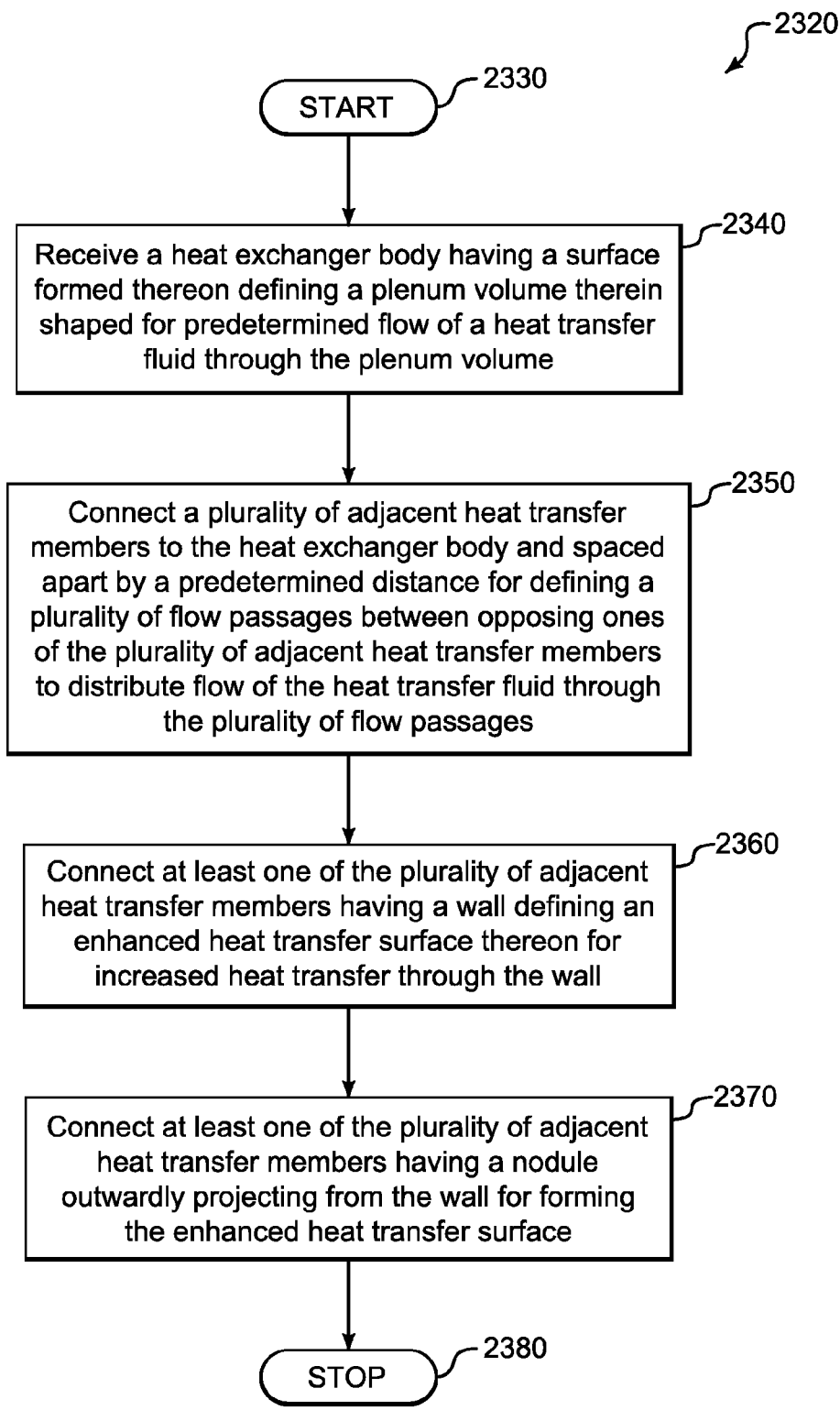

Referring to FIG. 45, for use in association with a pool-type nuclear fission reactor capable of generating heat, an illustrative method 2320 of assembling a heat exchanger starts at a block 2330. At a block 2340, the method comprises receiving a heat exchanger body defining a plenum volume therein shaped for a predetermined flow of a heat transfer fluid into the plenum volume, the heat exchanger body having a surface formed thereon defining a portion of the plenum volume. At a block 2350, a plurality of adjacent heat transfer members are connected to the heat exchanger body and spaced apart by a predetermined distance for defining a plurality of flow passages between opposing ones of the plurality of adjacent heat transfer members to distribute flow of the heat transfer fluid through the plurality of flow passages. At a block 2360, at least one of the plurality of adjacent heat transfer members is coupled having a wall defining an enhanced heat transfer surface thereon for increased heat transfer through the wall. At a block 2370, at least one of the plurality of adjacent heat transfer members is coupled having a nodule outwardly projecting from the wall for forming the enhanced heat transfer surface. The method stops at a block 2380.

Figure 46:
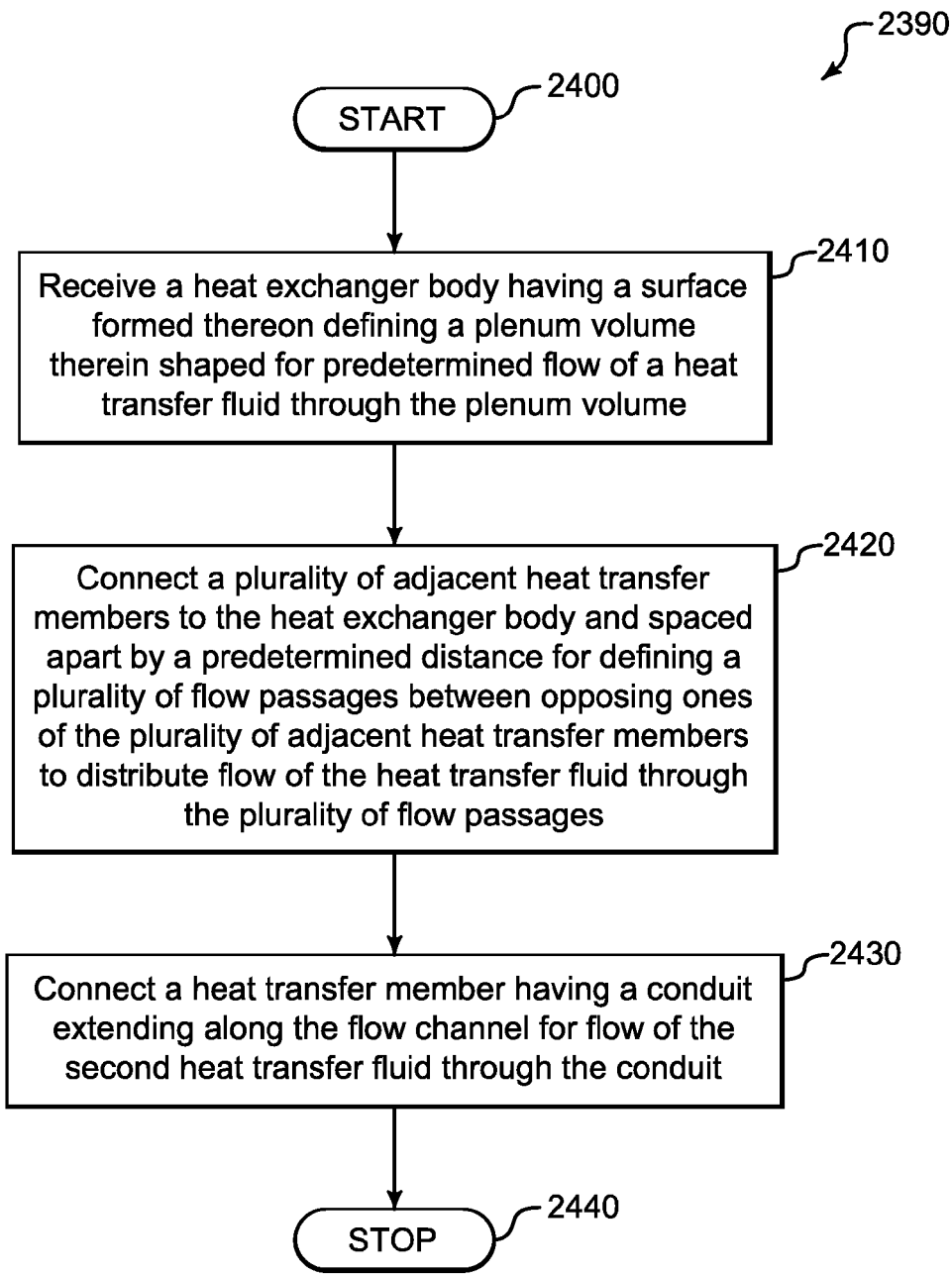

Referring to FIG. 46, for use in association with a pool-type nuclear fission reactor capable of generating heat, an illustrative method 2390 of assembling a heat exchanger starts at a block 2400. At a block 2410, the method comprises receiving a heat exchanger body defining a plenum volume therein shaped for a predetermined flow of a heat transfer fluid into the plenum volume, the heat exchanger body having a surface formed thereon defining a portion of the plenum volume. At a block 2420, a plurality of adjacent heat transfer members are connected to the heat exchanger body and spaced apart by a predetermined distance for defining a plurality of flow passages between opposing ones of the plurality of adjacent heat transfer members to distribute flow of the heat transfer fluid through the plurality of flow passages. At a block 2430, a heat transfer member is coupled having a conduit extending along a flow channel for flow of the second heat transfer fluid through the conduit. The method stops at a block 2440.

Figure 47:
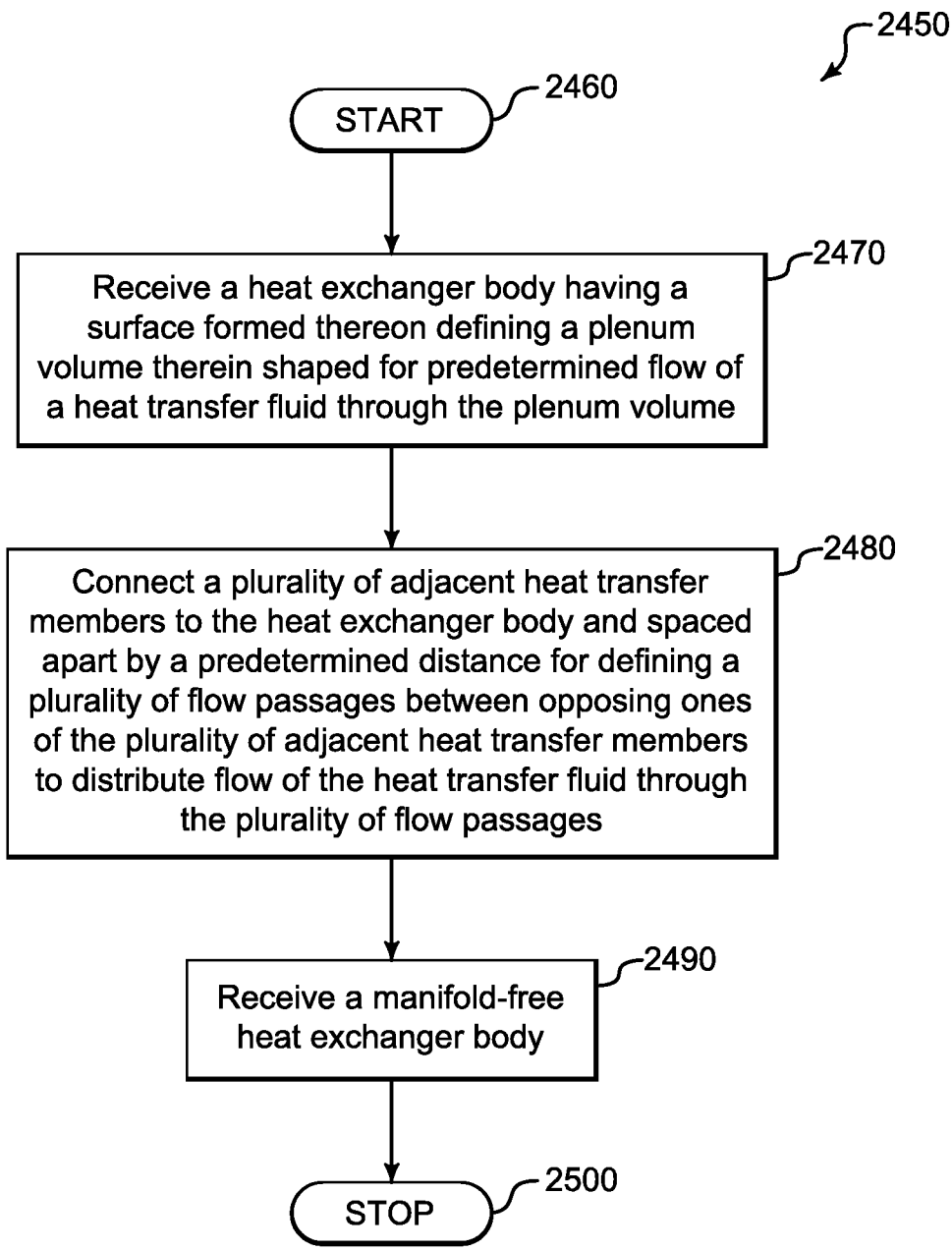

Referring to FIG. 47, for use in association with a pool-type nuclear fission reactor capable of generating heat, an illustrative method 2450 of assembling a heat exchanger starts at a block 2460. At a block 2470, the method comprises receiving a heat exchanger body defining a plenum volume therein shaped for a predetermined flow of a heat transfer fluid into the plenum volume, the heat exchanger body having a surface formed thereon defining a portion of the plenum volume. At a block 2480, a plurality of adjacent heat transfer members are connected to the heat exchanger body and spaced apart by a predetermined distance for defining a plurality of flow passages between opposing ones of the plurality of adjacent heat transfer members to distribute flow of the heat transfer fluid through the plurality of flow passages. At a block 2490, a manifold-free heat exchanger body is received. The method stops at a block 2500.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

Moreover, those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Therefore, what are provided are a heat exchanger, methods therefor and a nuclear fission reactor system.

While various aspects and embodiments have been disclosed herein, other aspects and embodiments will be apparent to those skilled in the art. For example, with reference to FIG. 14, shut-off valves 640a/640b/650a/650b may each be coupled to respective ones of a plurality of thermocouples (not shown) disposed in pipes 620a/620b/630a/630b. A controller could selectively and progressively open and close the shut-off valves depending on the temperature of the heat transfer fluid entering and leaving heat exchangers 600/610. That is, the amount heat transfer that is desired within the heat exchangers as a function of temperature sensed by the thermocouples could be preprogrammed into and stored in the controller. The temperatures within the heat exchangers could be detected by the controller via the thermocouples and the controller could then operate the shut-off valves by progressively opening and closing the shut-off valves to bring the heat transfer occurring within the heat exchangers into substantial agreement with the preprogrammed value stored within the controller. In this manner, heat exchangers 600/610 could be selectively operated to provide precise amounts of heat transfer within the heat exchangers by allowing the controller to automatically adjust the valves.

Moreover, the various aspects and embodiments disclosed herein are for purposes of illustration and are not intended to be limiting, with the true scope and spirit being indicated by the following claims. In addition, the corresponding structures, materials, acts, and equivalents of all means or step plus function elements in the claims below are intended to include any structure, material, or acts for performing the functions in combination with other claimed elements as specifically claimed.

What is claimed is:

1. A method of fabricating a heat exchanger, the method comprising:
    defining an inlet for liquid sodium primary coolant, the inlet for receiving the liquid sodium primary coolant from a pool of liquid sodium proximate a plurality of fission modules of a reactor core and directing the liquid sodium primary coolant to a heat exchanger body;
    defining an outlet for the liquid sodium primary coolant, the outlet for directing the liquid sodium primary coolant from the heat exchanger body to the pool of liquid sodium;
    defining in the heat exchanger body a plenum chamber for flow of the primary coolant, defining the plenum chamber including defining an upper portion of the plenum chamber to have a volume and a cross-sectional area less than a volume and cross-sectional area of a lower portion of the plenum chamber, the inlet for the liquid sodium primary coolant being located in the upper portion, the outlet for the liquid sodium primary coolant being located in the lower portion, the upper portion and the lower portion defining the entire volume of the heat exchanger body;
    defining an inlet for secondary coolant in a heat transfer member, the inlet for the secondary coolant being located in the upper portion of the heat exchanger body;
    defining an outlet for secondary coolant in the heat transfer member, the outlet for the secondary coolant being located in the lower portion of the heat exchanger body;
    defining a flow channel for secondary coolant through the heat transfer member, the flow channel connecting the inlet for secondary coolant to the outlet for secondary coolant;
    disposing the heat transfer member in the heat exchanger body sealingly from primary coolant; and
    affixing an outer surface defining the upper and lower portions of the heat exchanger body to a portion of an interior surface of a vessel wall of a reactor vessel.

2. The method of claim 1, further comprising increasing surface area of the heat transfer member.

3. The method of claim 1, further comprising positioning the heat exchanger body and the heat transfer member to accommodate a flow orientation chosen from a cross-flow orientation, a counter-flow orientation, and a parallel-flow orientation.

4. The method of claim 1, further comprising disposing the lower portion of the plenum chamber of the heat exchanger body in the pool of liquid sodium.

5. A method of fabricating a heat exchanger, the method comprising:

defining an inlet for primary coolant, the inlet for receiving the primary coolant from a plurality of fission modules of a reactor core and directing the primary coolant to a heat exchanger body;

defining an outlet for primary coolant, the outlet for directing the primary coolant from the heat exchanger body to the plurality of fission modules;

defining in the heat exchanger body a plenum chamber for flow of the primary coolant, defining the plenum chamber including defining an upper portion of the plenum chamber to have a volume and a cross-sectional area less than a volume and cross-sectional area of a lower portion of the plenum chamber, the inlet for the primary coolant being located in the upper portion, the outlet for primary coolant being located in the lower portion, the upper portion and the lower portion defining the entire volume of the heat exchanger body;

defining an inlet for secondary coolant in each of a plurality of heat transfer members, the inlet for the secondary coolant being located in an upper portion of the upper portion of the plenum chamber of the heat exchanger body;

defining an outlet for secondary coolant in each of the plurality of heat transfer members, the outlet for the secondary coolant being located in a lower portion of the lower portion of the plenum chamber of the heat exchanger body;

defining a flow channel for secondary coolant through each of the plurality of heat transfer members, each flow channel connecting each flow channel's respective inlet for secondary coolant to the respective outlet for secondary coolant;

disposing the plurality of heat transfer members in the heat exchanger body sealingly from primary coolant, adjacent ones of the plurality of heat transfer members being spaced apart and defining therebetween a plurality of flow channels for primary coolant through the plenum chamber; and affixing an outer surface defining the upper and lower portions of the heat exchanger body to a portion of an interior surface of a vessel wall of a reactor vessel.

6. The method of claim 5, further comprising increasing surface area of the plurality of heat transfer members.

7. The method of claim 5, further comprising positioning the heat exchanger body and the plurality of heat transfer members to accommodate a flow orientation chosen from a cross-flow orientation, a counter-flow orientation, and a parallel-flow orientation.

\* \* \* \* \*